(12) United States Patent  
Kanzaki et al.

(10) Patent No.: US 9,176,484 B2  
(45) Date of Patent: Nov. 3, 2015

(54) ELECTRONIC CONTROL APPARATUS AND CONTROL CHARACTERISTIC ADJUSTMENT METHOD FOR THE SAME HAVING A LABEL RESISTOR FOR CALIBRATING A DEVICE-VARIABILITY VARIATION

(71) Applicants: Shozo Kanzaki, Chiyoda-ku (JP); Fumiaki Arimai, Chiyoda-ku (JP); Hiroyoshi Nishizaki, Chiyoda-ku (JP)

(72) Inventors: Shozo Kanzaki, Chiyoda-ku (JP); Fumiaki Arimai, Chiyoda-ku (JP); Hiroyoshi Nishizaki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 427 days.

(21) Appl. No.: 13/861,029

(22) Filed: Apr. 11, 2013

(65) Prior Publication Data  
US 2014/0135948 A1 May 15, 2014

(30) Foreign Application Priority Data  
Nov. 15, 2012 (JP) .................................. 2012-250893

(51) Int. Cl.  
*G05B 13/04* (2006.01)  
*G05B 19/042* (2006.01)

(52) U.S. Cl.  
CPC .......... *G05B 13/041* (2013.01); *G05B 19/0426* (2013.01); *G05B 2219/21065* (2013.01); *G05B 2219/23215* (2013.01); *G05B 2219/25098* (2013.01); *G05B 2219/25265* (2013.01); *G05B 2219/25296* (2013.01)

(58) Field of Classification Search  
None  
See application file for complete search history.

(56) References Cited

U.S. PATENT DOCUMENTS

| 6,352,632 B1 * | 3/2002 | Inagaki et al. ................. 204/425 |
| 2010/0206280 A1 * | 8/2010 | Nomura et al. ................ 123/672 |

FOREIGN PATENT DOCUMENTS

| EP | 1026384 A1 | 8/2000 |
| EP | 1026384 B1 | 6/2004 |
| JP | 11-281617 A | 10/1999 |
| JP | 2000-220508 A | 8/2000 |

\* cited by examiner

*Primary Examiner* — Mohammad Ali  
*Assistant Examiner* — Bernard G Lindsay  
(74) *Attorney, Agent, or Firm* — Sughrue Mion, PLLC; Richard C. Turner

(57) ABSTRACT

A standard characteristic which is an average characteristic of multiple samples is approximated in a polygonal-line fashion by first to third lines. The coordinate-point positions of the first and second lines at comparison adjustment points are stored as standard data in a data memory of an electronic control apparatus. An actual-product characteristic as a calibration target is approximated in a polygonal-line fashion by first to third lines. The resistance value of a label resistor is adjusted to a value corresponding to ratios of monitoring outputs. The electronic control apparatus reads the resistance values of one or two label resistors, combines them with the stored standard characteristic, and interpolates a third line portion, thereby restoring and generating the actual-product characteristic.

17 Claims, 24 Drawing Sheets

STANDARD

INDIVIDUAL

INCORPORATION

ADJUSTMENT

FIG. 4A

| B9 | B8 | B7 | B6 | B5 | B4 | B3 | B2 | B1 | B0 |
|---|---|---|---|---|---|---|---|---|---|
| VACANT | 256 | 128 | 64 | 32 | 16 | 8 | 4 | 2 | 1 |

| GRADIENT COEFFICIENT | | | | VACANT | ADJUSTMENT COEFFICIENT | | | | |
|---|---|---|---|---|---|---|---|---|---|
| 1.04 | 1.03 | 1.02 | 1.01 | 1.00 | 0.99 | 0.98 | 0.97 | ADJUSTMENT COEFFICIENT | |
| (8) 111 | (7) 110 | (6) 101 | (5) 100 | (4) 011 | (3) 010 | (2) 001 | (1) 000 | 00001~11110 | CORRECTION CONSTANT |
| 512 | 448 | 320 | 256 | 192 | 128 | 64 | 0 | 1~3 | 0.95 |
| 512 | 448 | 320 | 256 | 192 | 128 | 64 | 0 | 4~6 | 0.96 |
| 512 | 448 | 320 | 256 | 192 | 128 | 64 | 0 | 7~9 | 0.97 |
| 512 | 448 | 320 | 256 | 192 | 128 | 64 | 0 | 10~12 | 0.98 |
| 512 | 448 | 320 | 256 | 192 | 128 | 64 | 0 | 13~15 | 0.99 |
| 512 | 448 | 320 | 256 | 192 | 128 | 64 | 0 | 16~18 | 1.00 |
| 512 | 448 | 320 | 256 | 192 | 128 | 64 | 0 | 19~21 | 1.01 |
| 512 | 448 | 320 | 256 | 192 | 128 | 64 | 0 | 22~24 | 1.02 |
| 512 | 448 | 320 | 256 | 192 | 128 | 64 | 0 | 25~27 | 1.03 |
| 512 | 448 | 320 | 256 | 192 | 128 | 64 | 0 | 28~30 | 1.04 |

FIG. 4B

| B6 | B5 | B4 | B3 | B2 | B1 | B0 |
|---|---|---|---|---|---|---|
| 64 | 32 | 16 | 8 | 4 | 2 | 1 |

| ALLOCATION OF RANKS 1~126 | | | ADJUSTMENT ADDITION VALUE | | | | | | |
|---|---|---|---|---|---|---|---|---|---|
| | CORRECTION CONSTANT | ROUGH | +6 | +4 | +2 | 0 | −2 | −4 | −6 |
| | ROUGH | FINE | +3 | +2 | +1 | 0 | −1 | −2 | −3 |
| ADJUSTMENT FACTOR | 1.08 | 1.04 | 1·2 | 3·4 | 5·6 | 7·8 | 9·10 | 11·12 | 13·14 |
| | 1.06 | 1.03 | 27·28 | 25·26 | 23·24 | 21·22 | 19·20 | 17·18 | 15·16 |
| | 1.04 | 1.02 | 29·30 | 31·32 | 33·34 | 35·36 | 37·38 | 39·40 | 41·42 |
| | 1.02 | 1.01 | 55·56 | 53·54 | 51·52 | 49·50 | 47·48 | 45·46 | 43·44 |
| | 1.00 | 1.00 | 57·58 | 59·60 | 61·62 | 63·64 | 65·66 | 67·68 | 69·70 |
| | 0.98 | 0.99 | 83·84 | 81·82 | 79·80 | 77·78 | 75·76 | 73·74 | 71·72 |
| | 0.96 | 0.98 | 85·86 | 87·88 | 89·90 | 91·92 | 93·94 | 95·96 | 97·98 |
| | 0.94 | 0.97 | 111·112 | 109·110 | 107·108 | 105·106 | 103·104 | 101·102 | 99·100 |
| | 0.92 | 0.96 | 113·114 | 115·116 | 117·118 | 119·120 | 121·122 | 123·124 | 125·126 |

● ODD-NUMBER RANKS 1~125 ARE FOR FINE ADJUSTMENT (B0=1)
● EVEN-NUMBER RANKS 2~126 ARE FOR ROUGH ADJUSTMENT (B0=0)
● MINIMUM UNIT OF ADJUSTMENT ADDITION VALUE IS DEFINED IN DATA MEMORY

F I G. 5
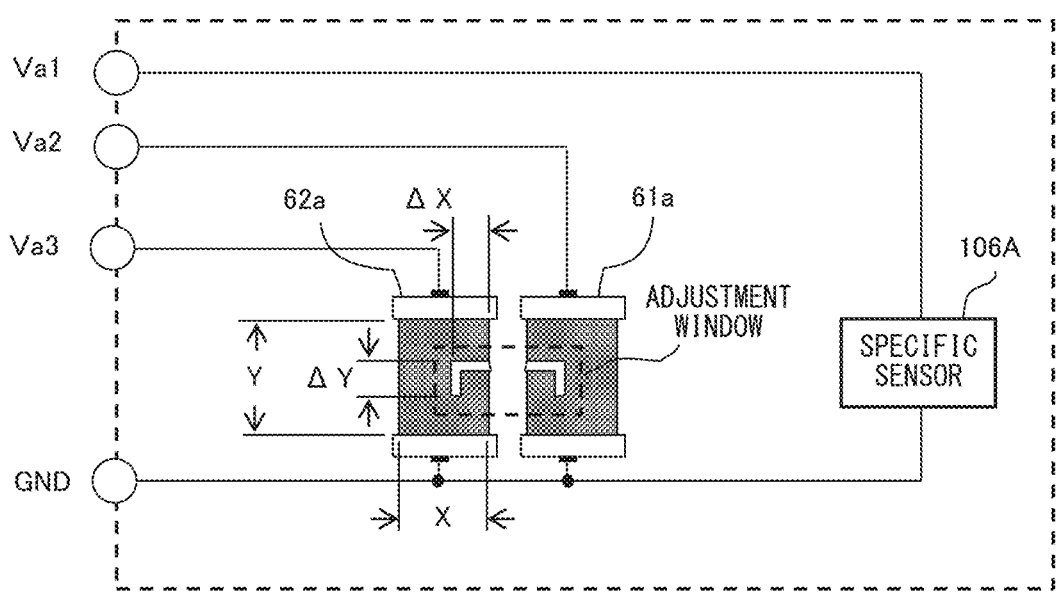

F I G. 7
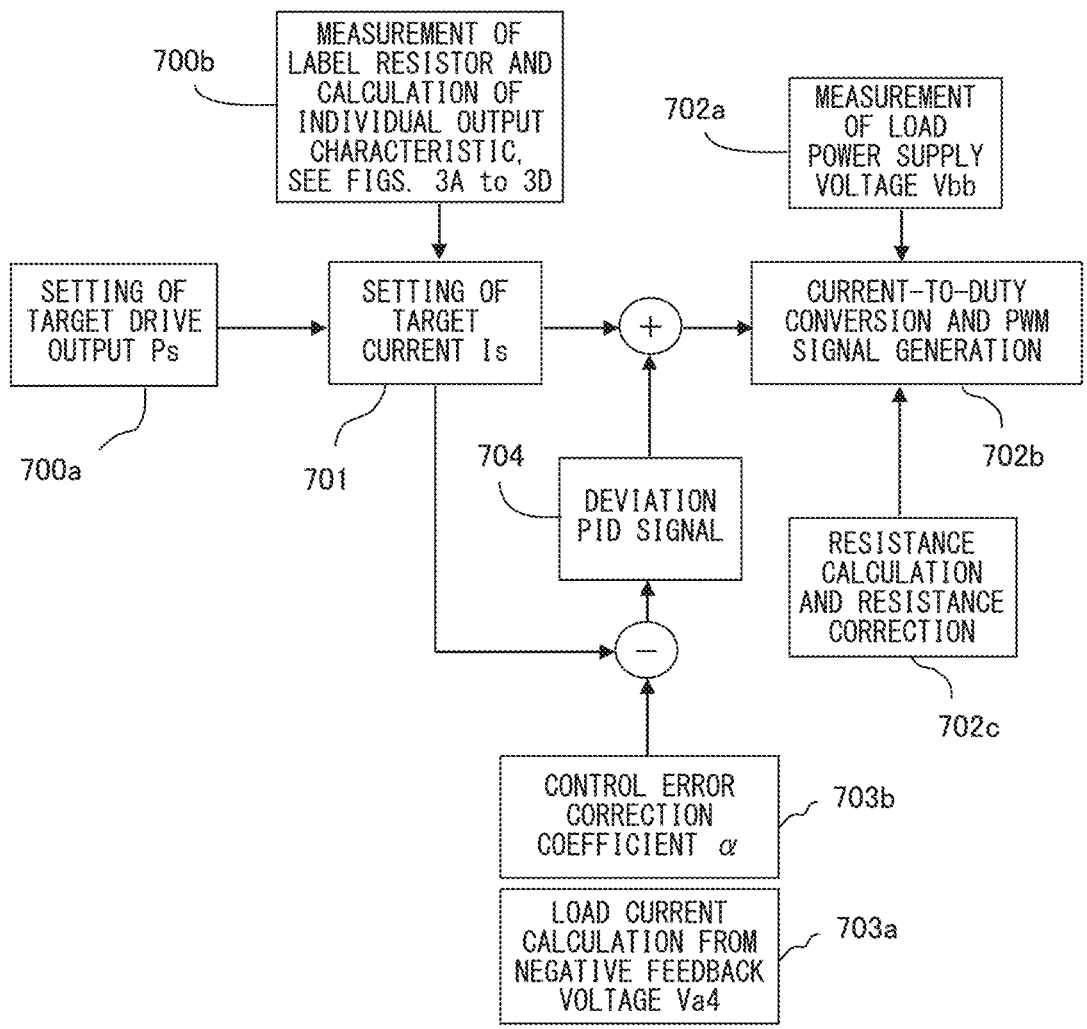

F I G. 9
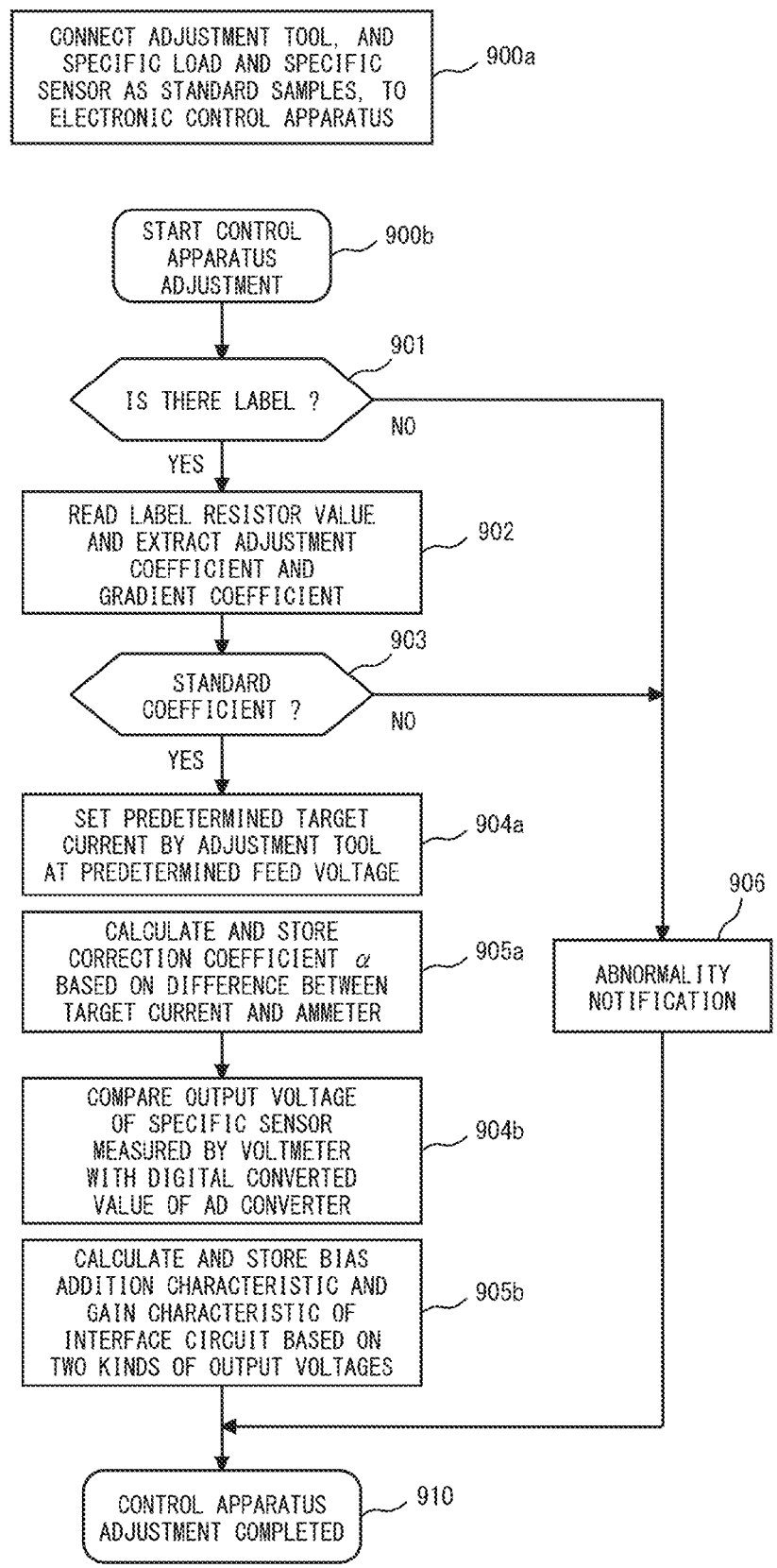

F I G. 1 1
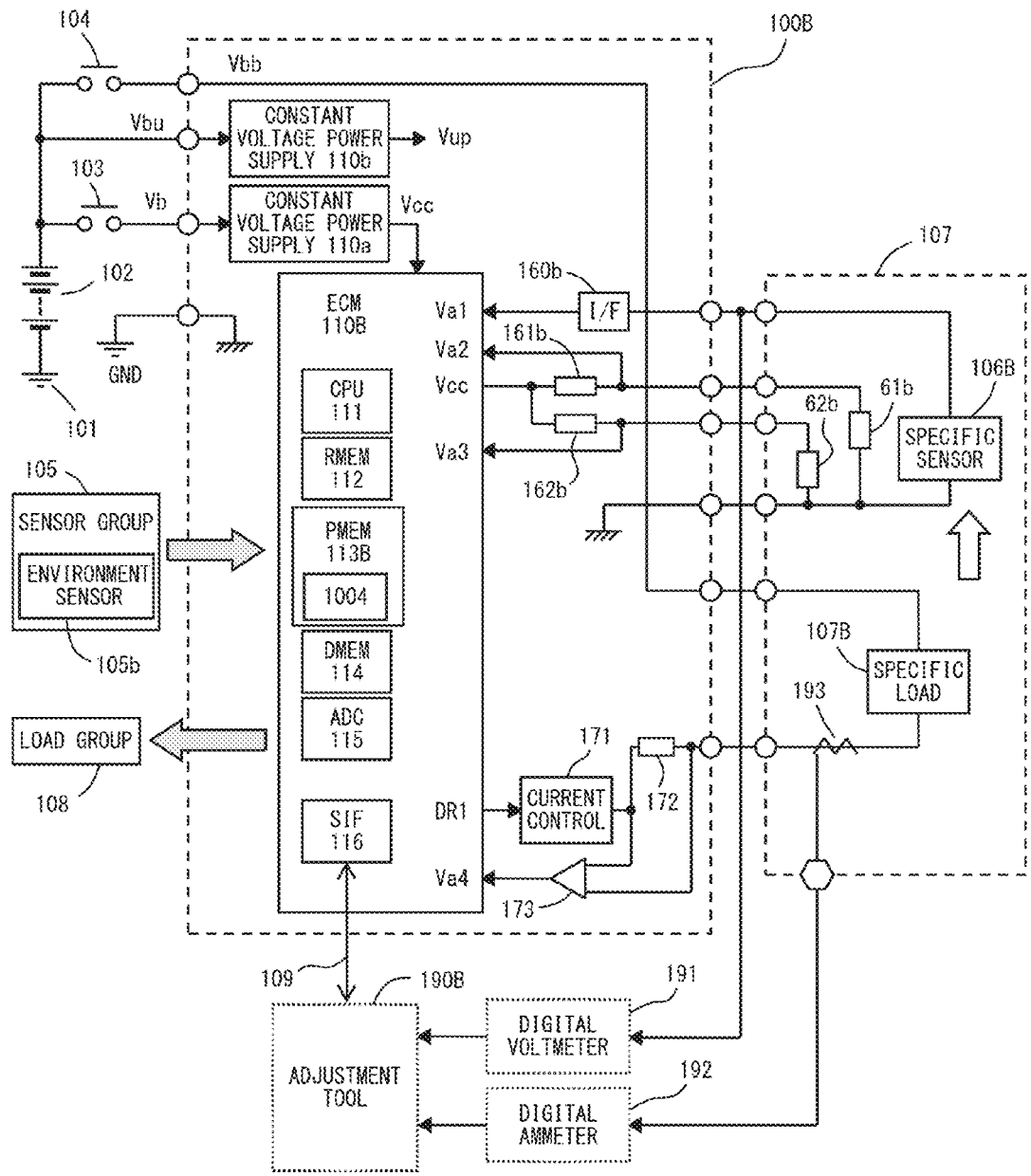

FIG. 14A
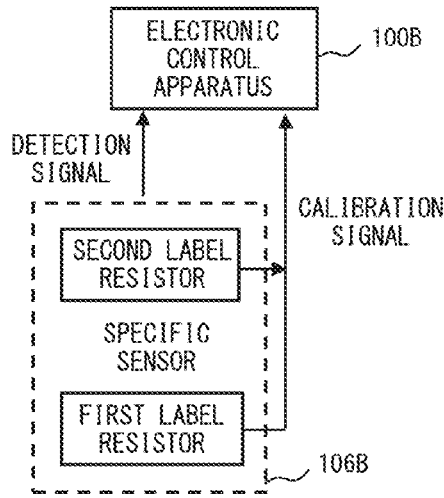
FIG. 14B
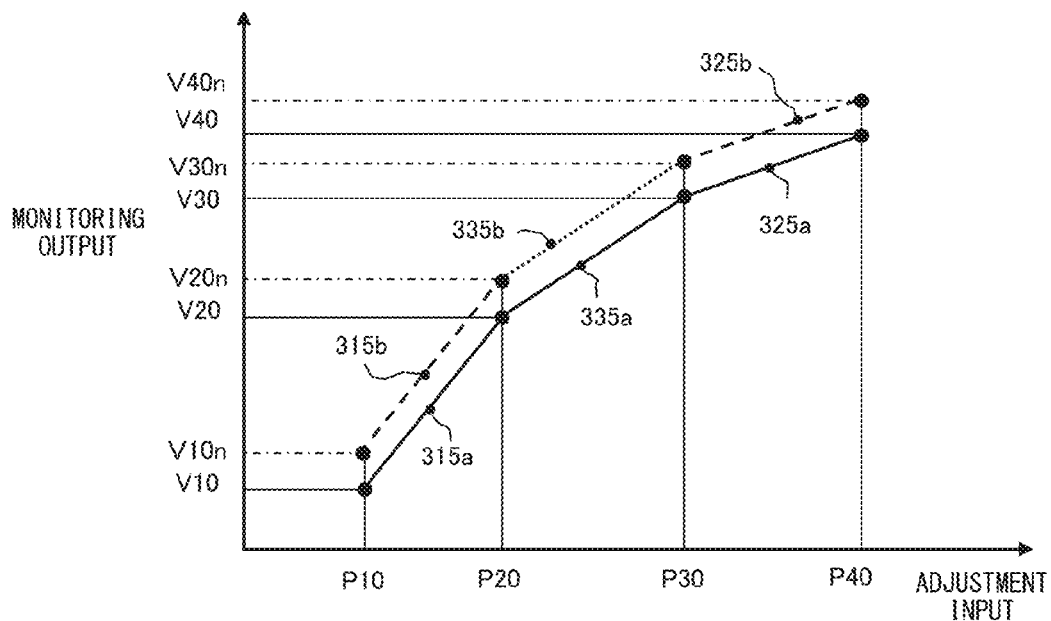
FIG. 14C
|  | FIRST LINE (315a·315b) | SECOND LINE (325a·325b) |
|---|---|---|
| STANDARD DATA | (P10, V10, P20, V20) | (P30, V30, P40, V40) |
| INDIVIDUAL DATA | (P10, V10n, P20, V20n) | (P30, V30n, P40, V40n) |
| LABEL RESISTOR | FIRST LABEL RESISTOR | SECOND LABEL RESISTOR |
| ADJUSTMENT COEFFICIENT OR BIAS ADJUSTMENT VALUE | (V10n/V10, V20n/V20) | (V30n/V30, V40n/V40) |
| | (V10n−V10, V20n−V20) | (V30n−V30, V40n−V40) |

F I G. 1 5
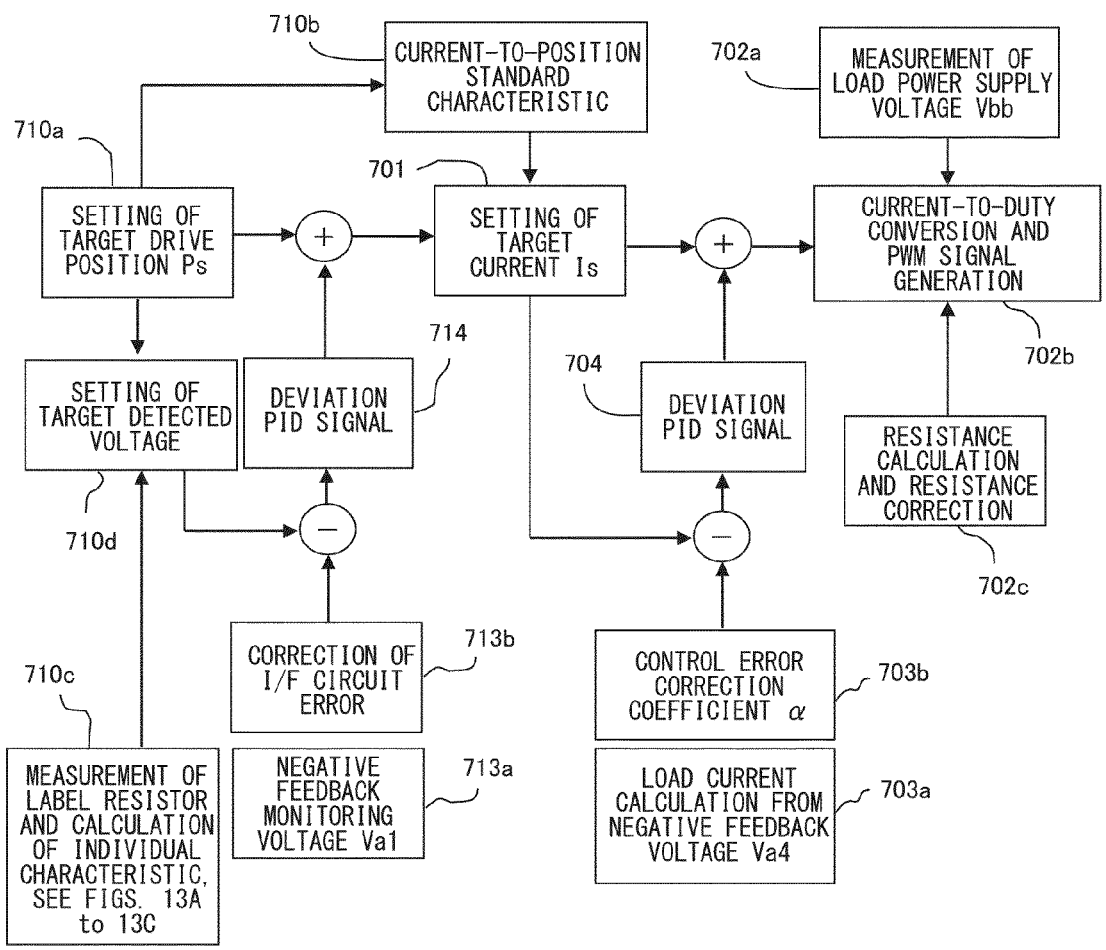

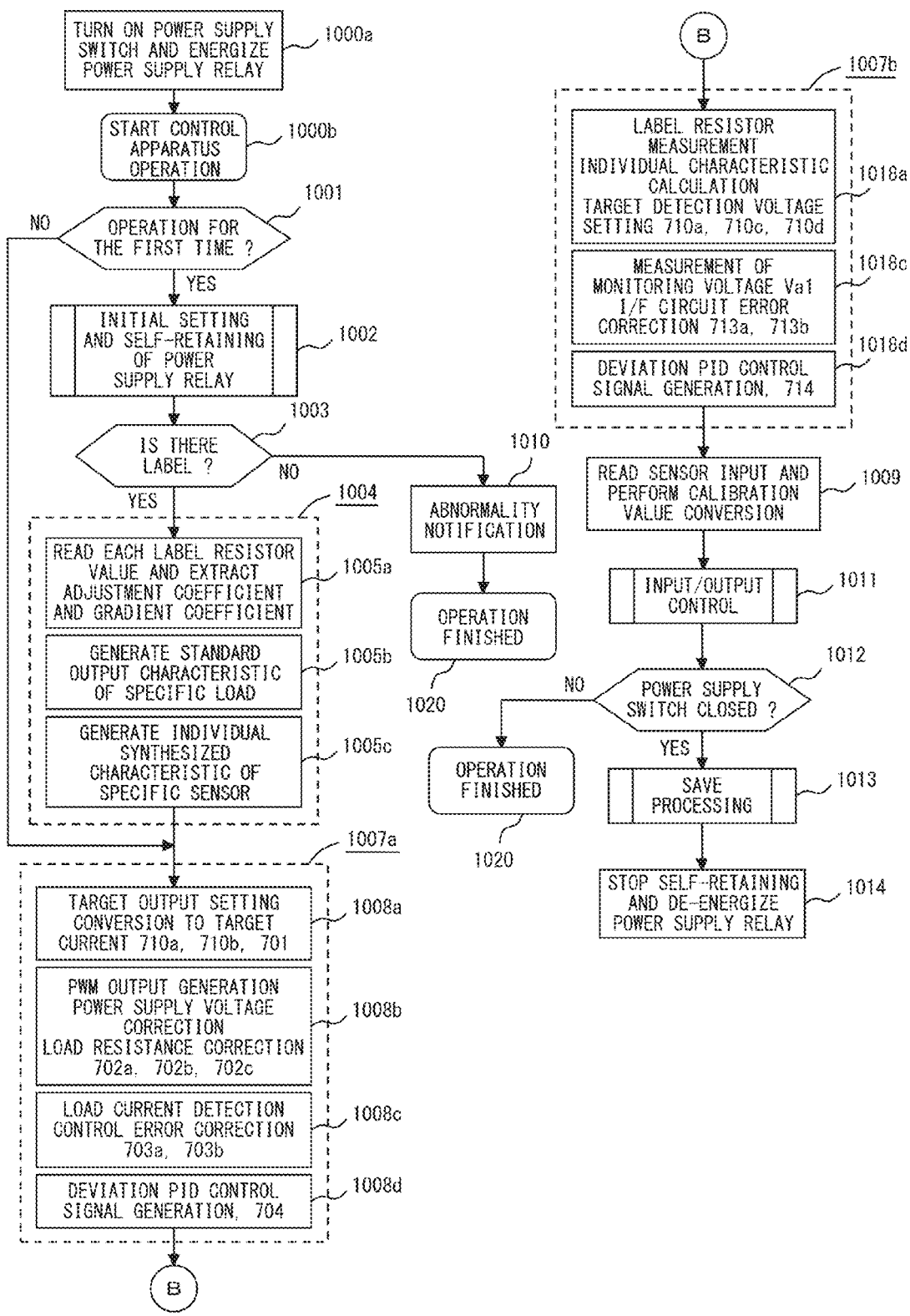

FIG. 22A

| B9 | B8 | B7 | B6 | B5 | B4 | B3 | B2 | B1 | B0 |
|---|---|---|---|---|---|---|---|---|---|
| VACANT | 256 | 128 | 64 | 32 | 16 | 8 | 4 | 2 | 1 |

| SECOND BIAS ADJUSTMENT VALUE | | | | VACANT | FIRST BIAS ADJUSTMENT VALUE | | | | |
|---|---|---|---|---|---|---|---|---|---|
| SECOND PARAMETER | | | | | | | | | |

| +3 | +2 | +1 | ±0 | −1 | −2 | −3 | −4 | FIRST PARAMETER | |
|---|---|---|---|---|---|---|---|---|---|
| (8) 111 | (7) 110 | (6) 101 | (5) 100 | (4) 011 | (3) 010 | (2) 001 | (1) 000 | 00001~11110 | CORRECTION CONSTANT |
| 512 | 448 | 320 | 256 | 192 | 128 | 64 | 0 | 1~3 | −10 |
| 512 | 448 | 320 | 256 | 192 | 128 | 64 | 0 | 4~6 | −8 |
| 512 | 448 | 320 | 256 | 192 | 128 | 64 | 0 | 7~9 | −6 |
| 512 | 448 | 320 | 256 | 192 | 128 | 64 | 0 | 10~12 | −4 |
| 512 | 448 | 320 | 256 | 192 | 128 | 64 | 0 | 13~15 | −2 |
| 512 | 448 | 320 | 256 | 192 | 128 | 64 | 0 | 16~18 | ±0 |
| 512 | 448 | 320 | 256 | 192 | 128 | 64 | 0 | 19~21 | +2 |
| 512 | 448 | 320 | 256 | 192 | 128 | 64 | 0 | 22~24 | +4 |
| 512 | 448 | 320 | 256 | 192 | 128 | 64 | 0 | 25~27 | +6 |
| 512 | 448 | 320 | 256 | 192 | 128 | 64 | 0 | 28~30 | +8 |

FIG. 22B

| B6 | B5 | B4 | B3 | B2 | B1 | B0 |
|---|---|---|---|---|---|---|
| 64 | 32 | 16 | 8 | 4 | 2 | 1 |

| ALLOCATION OF RANKS 1-126 | | | ADJUSTMENT ADDITION VALUE (FIRST PARAMETER) | | | | | | |
|---|---|---|---|---|---|---|---|---|---|
| | CORRECTION CONSTANT | ROUGH | +6 | +4 | +2 | 0 | −2 | −4 | −6 |
| | ROUGH | FINE | +3 | +2 | +1 | 0 | −1 | −2 | −3 |
| ADJUSTMENT FACTOR SECOND PARAMETER | 1.08 | 1.04 | 1·64 | 2·65 | 3·66 | 4·67 | 5·68 | 6·69 | 7·70 |
| | 1.06 | 1.03 | 14·77 | 13·76 | 12·75 | 11·74 | 10·73 | 9·72 | 8·71 |
| | 1.04 | 1.02 | 15·78 | 16·79 | 17·80 | 18·81 | 19·82 | 20·83 | 21·84 |
| | 1.02 | 1.01 | 28·91 | 27·90 | 26·89 | 25·88 | 24·87 | 23·86 | 22·85 |
| | 1.00 | 1.00 | 29·92 | 30·93 | 31·94 | 32·95 | 33·96 | 34·97 | 35·98 |
| | 0.98 | 0.99 | 42·105 | 41·104 | 40·103 | 39·102 | 38·101 | 37·100 | 36·99 |
| | 0.96 | 0.98 | 43·106 | 44·107 | 45·108 | 46·109 | 47·110 | 48·111 | 49·112 |
| | 0.94 | 0.97 | 56·119 | 55·118 | 54·117 | 53·116 | 52·115 | 51·114 | 50·113 |
| | 0.92 | 0.96 | 57·120 | 58·121 | 59·122 | 60·123 | 61·124 | 62·125 | 63·126 |

- LOWER-NUMBER RANKS 1-63 ARE FOR FINE ADJUSTMENT (B6=0)
- HIGHER-NUMBER RANKS 64-126 ARE FOR ROUGH ADJUSTMENT (B6=1)
- MINIMUM UNIT OF ADJUSTMENT ADDITION VALUE IS DEFINED IN DATA MEMORY

FIG. 23A
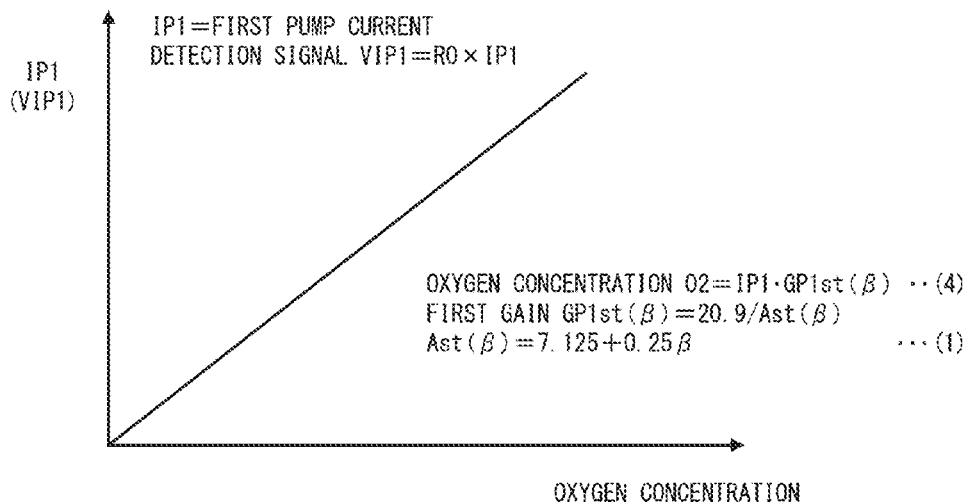
FIG. 23B
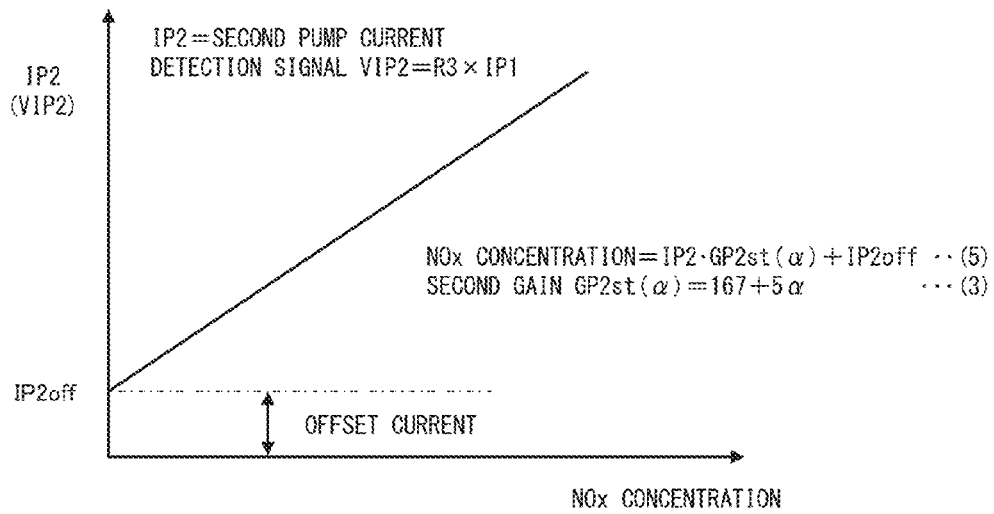
FIG. 23C
| RANK BASED ON LABEL RESISTOR RL | | IP2 GAIN CORRECTION COEFFICIENT $\alpha$ | | | | | |
|---|---|---|---|---|---|---|---|
| | | −2 | −1 | 0 | 1 | 2 | 3 |
| IP1 CORRECTION COEFFICIENT $\beta$ | −2 | 1 | 2 | 3 | 4 | 5 | 6 |
| | −1 | 7 | 8 | 9 | 10 | 11 | 12 |
| | 0 | 13 | 14 | 15 | 16 | 17 | 18 |
| | 1 | 19 | 20 | 21 | 22 | 23 | 24 |
| | 2 | 25 | 26 | 27 | 28 | 29 | 30 |
| | 3 | 31 | 32 | 33 | 34 | 35 | 36 |

| RANKS 1-25 BASED ON CORRECTION RESISTOR R2 | | SECOND REFERENCE CORRECTION AMOUNT (μs) | | | | |
|---|---|---|---|---|---|---|
| | | −20 | −10 | ±0 | +10 | +20 |
| FIRST REFERENCE CORRECTION AMOUNT (μs) | −20 | 1 | 2 | 3 | 4 | 5 |
| | −10 | 10 | 9 | 8 | 7 | 6 |
| | ±0 | 11 | 12 | 13 | 14 | 15 |
| | +10 | 20 | 19 | 18 | 17 | 16 |
| | +20 | 21 | 22 | 23 | 24 | 25 |

ELECTRONIC CONTROL APPARATUS AND CONTROL CHARACTERISTIC ADJUSTMENT METHOD FOR THE SAME HAVING A LABEL RESISTOR FOR CALIBRATING A DEVICE-VARIABILITY VARIATION

BACKGROUND OF THE INVENTION

1. Field of the Invention

The present invention relates to improvement in an electronic control apparatus that includes a microprocessor performing drive control for an electric load group in accordance with the operation state of an input sensor group and the content of a program memory, and in which a specific sensor of the input sensor group has a label resistor for calibrating a device-variability variation in the detection characteristic of the specific sensor, or a specific load of the electric load group has a label resistor for calibrating a device-variability variation in the output characteristic, and relates to improvement in a control characteristic adjustment method for the electronic control apparatus.

2. Description of the Background Art

An electronic control apparatus is known in which: a specific sensor or a specific load is used which has a label resistor for calibrating a device-variability variation in a detection characteristic which is a relationship of measurement input-to-detection output of an input sensor, or in an output characteristic which is a relationship of control input-to-generated output of an electric load that is an electromagnetic actuator such as a motor or a solenoid; a microprocessor reads a resistance value of the label resistor; and the detection characteristic of the applied specific sensor or the output characteristic of the applied specific load is accurately recognized by the read resistance value.

For example, according to "GAS SENSOR, CONNECTOR OF GAS SENSOR, AND GAS CONCENTRATION DETECTION APPARATUS" of Japanese Laid-Open Patent Publication No. 11-281617 (see FIGS. 4 and 8 and paragraphs [0062] and [0065], hereinafter, referred to as Patent Document 1), as shown in FIGS. 23A to 23C, a label resistor RL is provided at a connector portion for external connection of a gas sensor that detects an oxygen concentration based on a first pump current IP1 (see FIG. 23A) and detects a NOx concentration based on a second pump current IP2 (see FIG. 23B), and ranks 1 to 36 are allocated on a two-dimensional map using six grades of correction coefficient $\beta$ of $-2$, $-1$, 0, 1, 2, 3 for the first pump current IP1 and six grades of correction coefficient $\alpha$ of $-2$, $-1$, 0, 1, 2, 3 for the second pump current IP2 (see FIG. 23C). Then, one of the ranks 1 to 36 is specified by the resistance value of the label resistor RL, and as a result, the correction coefficients $\alpha$ and $\beta$ are determined. Then, the oxygen concentration and the NOx concentration are detected by predetermined arithmetic expressions (1), (3), (4), and (5).

In addition, according to "INJECTOR AND FUEL INJECTION SYSTEM" of Japanese Laid-Open Patent Publication No. 2000-220508 (see FIGS. 14 and 18 and paragraphs [0064] and [0067], hereinafter, referred to as Patent Document 2), a correction resistor is provided on an injector so as to correct a device-variability variation included in the output response characteristic of a fuel injection electromagnetic valve. As shown in FIGS. 24A and 24B, in order to calculate an injection pulse period for determining a valve opening period of the fuel injection electromagnetic valve required for an instruction injection amount for obtaining a target fuel injection amount, a corrected injection pulse period characteristic indicated by a dotted line is generated which is obtained by algebraically adding first and second reference correction amounts to a basic injection pulse period characteristic indicated by a solid line in FIG. 24A.

For each of the first and second reference correction amounts, five grades of correction amounts of $-20$, $-10$, $\pm 0$, $+10$, $+20$ μs can be selected. Ranks 1 to 25 are allocated on a two-dimensional map using the first and second reference correction amounts (see FIG. 24B), and one of the ranks 1 to 25 is specified by the resistance value of the correction resistor.

The specific sensor of Patent Document 1 which is the gas sensor has a feature of being capable of determining the two types of correction coefficients $\alpha$ and $\beta$ by one label resistor. However, each of the correction coefficients $\alpha$ and $\beta$ is used for correction of a proportional gain GP1st($\beta$) or GP2st($\alpha$) of the first pump current IP1 and the second pump current IP2, and an offset component IP2off of the second pump current IP2 is not corrected but a constant value is applied thereto.

Thus, a concept of performing correction, using a label resistor, for a detection characteristic including an offset component or a curved detection characteristic which is at least difficult to be represented as a linear line, is not shown, and in the case of such a complicated curved detection characteristic, characteristic data needs to be transmitted via an IC memory.

It is noted that, according to FIGS. 6A and 6B of Patent Document 1 showing the second embodiment thereof, a correction resistor Rc1 for adjusting the proportional gain of the first pump current IP1, a correction resistor Rc2 for adjusting the proportional gain of the second pump current IP2, and a correction resistor Rc3 for adjusting the offset current of the second pump current IP2 are used as circuit components of an amplifier circuit in a detection apparatus. In such a hardware style, there is a problem that noise malfunction can occur when a weak current signal circuit is connected to the outside of the detection apparatus or that the hardware cost of the detection apparatus increases.

In addition, the specific load of Patent Document 2 which is the injector merely corrects a device-variability variation in a response time of the fuel injection electromagnetic valve, but variability correction for a proportional gain which determines the relationship between the magnitude of an instruction current for the fuel injection electromagnetic valve and the injection pulse period is not taken into consideration.

In addition, a concept of performing correction by a correction resistor when the injection pulse period is not represented as a simple linear line, is not shown. In the case of such a complicated curved detection characteristic, characteristic data needs to be transmitted via an IC memory.

SUMMARY OF THE INVENTION

The first object of the present invention is to provide a simple electronic control apparatus that is applicable to the case where the detection characteristic of a specific sensor or the output characteristic of a specific load is not a two-value curve having a mountain-like shape or a valley-like shape but a curved characteristic which monotonically (hereinafter referred to as "monotonously") increases or monotonously decreases and is approximated by a polygonal line characteristic having a pair or more of polygonal lines, and that can suppress reduction of control accuracy due to device-variability variation in the detection characteristic or the output characteristic.

The second object of the present invention is to provide a simple control characteristic adjustment method for an electronic control apparatus, that is applicable to various variation factors of a variability characteristic between a standard characteristic based on the average value of experiment data using multiple samples and an individual characteristic of an actual target product, such as the case of greatly depending on variability of the slope angle of a characteristic line or on variation in a deviation component without variation in the slope angle, or the case of depending on both the slope angle and the deviation component, and that can suppress reduction of control accuracy due to device-variability variation in the detection characteristic or the output characteristic.

An electronic control apparatus according to the present invention includes a microprocessor which performs drive control for an electric load group in accordance with an operation state of an input sensor group and a content of a program memory. A specific sensor of the input sensor group has a label resistor for calibrating a device-variability variation in a detection characteristic of the specific sensor, or a specific load of the electric load group has a label resistor for calibrating a device-variability variation in an output characteristic of the specific load.

The microprocessor is further connected to a RAM memory for arithmetic processing, a non-volatile data memory which is a certain area of the non-volatile program memory or is separately provided, and an AD converter, and operates in cooperation therewith.

The program memory or the data memory has stored therein, in a predetermined data form, standard characteristic data which is standard detection characteristic data of the specific sensor or standard output characteristic data of the specific load, which is average characteristic data of experiment data based on a plurality of samples thereof.

The detection characteristic or the output characteristic has a monotonous increase property or a monotonous decrease property in which a secondary differential value thereof does not reverse between positive and negative, and is approximated by a polygonal line characteristic having at least one pair of polygonal lines.

The program memory or the data memory further has stored therein interpolation information for compensating error between the standard characteristic data approximated by a polygonal line characteristic and actual standard characteristic data.

The program memory includes a control program functioning as label resistor reading conversion means.

The label resistor reading conversion means calculates the resistance value of the label resistor by referring to the resistance value of a series resistor connected in series to the label resistor, the both-end voltage of the label resistor, and a control voltage which is a voltage applied to a series circuit, calculates a correction constant for correcting the device-variability variation in the detection characteristic of the specific sensor or the output characteristic of the specific load, based on the calculated resistance value, and stores the correction constant in the data memory or the RAM memory.

The correction constant is a pair of adjustment factors, a pair of adjustment addition values, or a complex combination of an adjustment factor and an adjustment addition value for specifying individual characteristic data which is individual detection characteristic data of the specific sensor or individual output characteristic data of the specific load, based on the standard characteristic data.

The adjustment factor is a correction constant to be multiplied by the standard characteristic data, thereby obtaining the individual characteristic data, the adjustment factor being an adjustment coefficient which is the relative ratio between the individual characteristic data and the standard characteristic data at a predetermined adjustment comparison point, or being a gradient coefficient which is the relative ratio with respect to change rate between the individual characteristic data and the standard characteristic data at a predetermined adjustment comparison point.

The adjustment addition value is a correction constant to be algebraically added to the standard characteristic data, thereby obtaining the individual characteristic data, the adjustment addition value being a bias adjustment value which is the relative deviation between the individual characteristic data and the standard characteristic data at a predetermined adjustment comparison point, or being a gradient adjustment value which is the relative deviation with respect to change rate between the individual characteristic data and the standard characteristic data at a predetermined adjustment comparison point.

The label resistor reading conversion means is executed at the start of operation when a power supply switch is turned on, or when the specific sensor or the specific load is replaced upon maintenance, to identify what combination the correction constant includes, of the adjustment coefficient, the gradient coefficient, the bias adjustment value, and the gradient adjustment value, and restore and generate the individual characteristic data by combining the identified correction constant, the standard characteristic data of the specific sensor or the specific load, and the interpolation information.

The microprocessor performs drive control for the electric load group by referring to the generated individual detection characteristic data, or performs drive control for the specific load by referring to the generated individual output characteristic data.

A control characteristic adjustment method for an electronic control apparatus according to the present invention is as follows.

Auxiliary data for selecting the data form is stored in the program memory or the data memory, in addition to the standard characteristic data.

A standard characteristic of the standard characteristic data and an individual characteristic of the individual characteristic data are approximated in a polygonal-line fashion in a two-dimensional coordinate system having an adjustment input axis indicating a common comparison adjustment value that is inputted and a monitoring output axis indicating a different comparison monitoring value that is outputted, or having an adjustment output axis indicating a common comparison adjustment value that is outputted and a monitoring input axis indicating a different comparison monitoring value that is inputted.

By the auxiliary data, one option is selected from some or all of options A1 to A7 as a selection parameter composing the correction constant, so that (1) the option A1 for selecting a combination of the adjustment coefficient and the gradient coefficient or the option A2 for selecting a pair of adjustment coefficients composed of a combination of the first and the second adjustment coefficients, is selected, (2) the option A3 for selecting a combination of the bias adjustment value and the gradient adjustment value or the option A4 for selecting a pair of bias adjustment values composed of the first and the second bias adjustment values, is selected, or (3) the option A5 for selecting a complex combination of the bias adjustment value and the adjustment coefficient, the option A6 for selecting a complex combination of the adjustment coefficient and the gradient adjustment value, or the option A7 for selecting a combination of the bias adjustment value and the gradient coefficient, is selected.

Further, (4) one of an option B1 for selecting two-dimensional coordinate axes of adjustment input axis-to-monitoring output axis as the coordinate axes of the polygonal line characteristic, and an option B2 for selecting two-dimensional coordinate axes of adjustment output axis-to-monitoring input axis as the coordinate axes of the polygonal line characteristic, is selected, so that one of a total of 14 options is designated as the selection parameter.

The adjustment coefficient is a parameter determined by a ratio (yn0/y0) based on comparison between a comparison monitoring output yn0 in the individual characteristic and a comparison monitoring output y0 in the standard characteristic with respect to a common comparison adjustment input x0, or a ratio (xn0/x0) based on comparison between a comparison monitoring input xn0 in the individual characteristic and a comparison monitoring input x0 in the standard characteristic with respect to a common comparison adjustment output y0.

The gradient coefficient is a parameter determined by a ratio ($\theta n/\theta 0$ or $\tan \theta n/\tan \theta 0$) based on comparison between the slope angle or tangent of a segment which is the change rate of the individual characteristic, and the slope angle or tangent of a segment which is the change rate of the standard characteristic, at a comparison adjustment point for calculating the adjustment coefficient.

The bias adjustment value is a parameter determined by a comparison deviation (y1n−y1) between a comparison monitoring output y1n in the individual characteristic and a comparison monitoring output y1 in the standard characteristic with respect to a common comparison adjustment input x1, or a comparison deviation (x1n−x1) between a comparison monitoring input x1n in the individual characteristic and a comparison monitoring input x1 in the standard characteristic with respect to a common comparison adjustment output y1.

The gradient adjustment value is a parameter determined by a comparison deviation ($\theta n - \theta 1$ or $\tan \theta n - \tan \theta 1$) between the slope angle or tangent of a segment which is the change rate of the individual characteristic, and the slope angle or tangent of a segment which is the change rate of the standard characteristic, at a comparison adjustment point for calculating the bias adjustment value.

As described above, in the electronic control apparatus according to the present invention, a specific sensor of the input sensor group or a specific load of the electric load group has a label resistor for calibrating a device-variability variation in the detection characteristic or the output characteristic, whereby the individual characteristic data corresponding to the applied specific sensor or specific load is restored and generated by combination of the resistance value of the label resistor measured at the start of operation, the standard characteristic data stored in advance, and the interpolation information. In addition, a polygonal characteristic is obtained by a plurality of constants selected from among the adjustment coefficient, the gradient coefficient, the bias adjustment value, and the gradient adjustment value which are determined by the resistance value of the label resistor.

Therefore, if at a manufacture and shipping phase of the electronic control apparatus, adjustment work as a control apparatus is performed by using a specific sensor or a specific load that is a standard sample, and at a manufacture and shipping phase of a specific sensor or a specific load, a label resistor for correcting the device variability is attached, it is not necessary to perform combination adjustment for the electronic control apparatus with the specific sensor or the specific load at an overall assembly phase for assembling them or when the specific sensor, the specific load, or the electronic control apparatus is replaced upon maintenance in the market. Therefore, assembly and maintenance replacement are facilitated, and an electronic control apparatus having highly accurate control performance is obtained by using a specific sensor or a specific load apparatus that is relatively inexpensive.

In addition, even if the detection characteristic or the output characteristic is a complicated characteristic including a polygonal line characteristic having a pair or more of polygonal lines, an IC memory for storing a correction constant is not needed for the specific sensor or the specific load, and the device-variability variation can be easily calibrated by reading the resistance value of a small and inexpensive label resistor. Therefore, it is not necessary to perform complicated signal communication between the specific sensor or the specific load and the electronic control apparatus, thus obtaining an effect of enhancing economic performance as a whole. In addition, since the microprocessor provided in the electronic control apparatus reads the label resistor during a period of not performing input/output control, and generates the individual characteristic data in advance, it is not necessary to perform reading/conversion processing for the label resistor during operation, thus obtaining an effect of reducing control load on the microprocessor and allowing usage of an inexpensive microprocessor.

As described above, in the control characteristic adjustment method for an electronic control apparatus according to the present invention, the program memory or the data memory has stored therein the auxiliary data for selecting the data form of the correction constant for calculating the individual characteristic data from the standard characteristic data.

Therefore, an effect is obtained that, when experimental measurement for multiple samples is performed to generate the standard characteristic data, if the data form is selected so as to decrease the variation width of the correction constant by comparing the standard characteristic and various variability characteristics obtained here, the adjustment width of the resistance value of a label resistor can be reduced.

It is noted that, for example, in the case where the standard characteristic is a horizontal line having an extremely small slope angle $\theta 0$, a gradient coefficient $\theta n/\theta 0$ or $\tan \theta n/\tan \theta 0$ which is the ratio of the slope angle $\theta n$ of the individual characteristic becomes an excessively large value, and the variation width of the gradient coefficient becomes excessively large, thus making it difficult to represent the gradient coefficient by a label resistor.

In general, if variation in the slope angle is small so that the standard characteristic and the individual characteristic are almost parallel with each other, a bias method is advantageous, if the standard characteristic and the individual characteristic are parallel characteristics in which the slope angles thereof are small so as to form gentle slopes with respect to the X-axis, the adjustment input-to-monitoring output method is advantageous, and if they are parallel characteristics that are steep with respect to the X-axis, the adjustment output-to-monitoring input method is advantageous.

On the other hand, if variation in the slope angle between the standard characteristic and the individual characteristic is large, the adjustment coefficient method is advantageous.

In this case, if the intersection of a segment of the standard characteristic and a segment of the individual characteristic is present at a first or fourth coordinate, it is advantageous to use a pair of adjustment coefficients, and if the intersection is present at a second or third coordinate, the gradient coefficient method is advantageous.

The foregoing and other objects, features, aspects and advantages of the present invention will become more apparent from the following detailed description when read in conjunction with the accompanying drawings.

BRIEF DESCRIPTION OF THE DRAWINGS

FIGS. 4A and 4B are allocation configuration diagrams of the label resistor in FIG. 2;

FIG. 5 is a configuration diagram of two label resistors used in the first embodiment;

FIG. 7 is a control block diagram of a specific load of the first embodiment;

FIG. 9 is a flowchart of adjustment work of an electronic control apparatus of the first embodiment;

FIG. 11 is an entire configuration diagram showing the second embodiment of the present invention;

FIGS. 14A to 14C are diagrams showing modification aspects for calculating a correction constant of the second embodiment;

FIG. 15 is a control block diagram of a specific load of the second embodiment;

FIG. 18 is a flowchart of the drive operation of the electronic control apparatus of the second embodiment;

FIGS. 22A and 22B are diagrams about allocation of the correction constant in the control characteristic adjustment method of the present invention;

FIGS. 23A to 23C are diagrams for explaining Patent Document 1 as a conventional technique.

DETAILED DESCRIPTION OF THE PREFERRED EMBODIMENTS OF THE INVENTION

First Embodiment

Hereinafter, FIG. 1 which is an entire configuration diagram showing the first embodiment of the present invention will be described.

Figure 1:
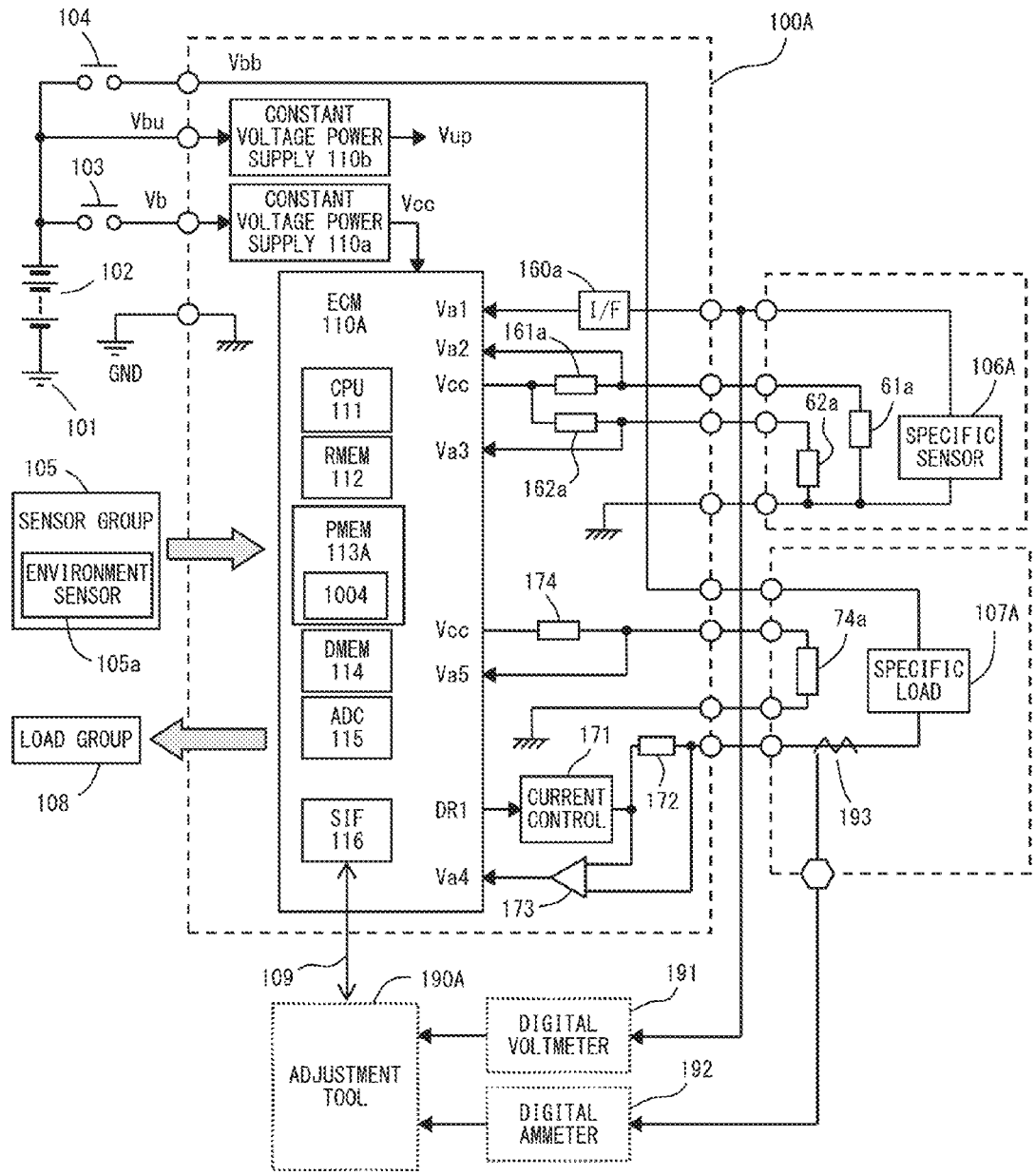
FIG. 1 is an entire configuration diagram showing the first embodiment of the present invention.

In FIG. 1, an electronic control apparatus 100A composed of an electronic control module 110A as a main component is fed with power from an external power supply 102 such as an on-vehicle battery whose negative terminal is connected to a vehicle body 101. In addition, to the electronic control apparatus 100A, a feed voltage Vb as a main power supply is applied via an output contact 103 of a power supply relay energized when a power supply switch (not shown) is closed, a load power supply voltage Vbb is applied via an output contact 104 of a load power supply relay, and a power supply voltage Vbu for memory backup is directly fed.

The power supply relay is energized when a power supply switch (not shown) is closed, and once the output contact 103 of the power supply relay is closed and the electronic control apparatus 100A starts to operate, the energized state is retained by a self-retaining instruction signal generated by the electronic control apparatus 100A, whereby the energized state continues even after the power supply switch is opened. If the self-retaining instruction signal is stopped when the electronic control apparatus 100A completes operation stop processing, the power supply relay is de-energized and the output contact 103 is opened.

A sensor group 105 as an input signal is connected to the electronic control apparatus 100A. The sensor group 105 includes various open/close sensors or analog sensors that operate in accordance with a manual operation switch or the operation state of an electric load group 108 described later, an environment sensor 105a such as a temperature sensor, or the like.

A specific sensor 106A included in the sensor group 105 has first and second label resistors 61a and 62a for calibrating a device-variability variation in the detection characteristic.

The electric load group 108 which is drive-controlled by the electronic control apparatus 100A is, for example, an actuator such as a motor or an electromagnetic solenoid, or a display apparatus as a man-machine interface. The specific load 107A included in the electric load group 108 has a device-variability variation in its characteristic of generated output with respect to instruction input, and has a label resistor 74a for performing calibration so as to give an appropriate instruction signal to obtain a target generated output.

It is noted that the detection characteristic of the specific sensor 106A and the output characteristic of the specific load 107A are not a mountain-shape or valley-shape curve but a curved characteristic that monotonously increases or monotonously decreases. In the case of relatively mild linear characteristic, it is only necessary to use one label resistor. In the case of curved characteristic, two label resistors are used.

Accordingly, if the specific sensor 106A has a relatively mild linear characteristic, one label resistor is used, and if the specific load 107A has a curved characteristic, two label resistors are used. Here, as a mere example, it is assumed that the specific sensor 106A uses two label resistors and the specific load 107A uses one label resistor.

The electronic control apparatus 100A has therein a constant voltage power supply 110a which is fed with power via the output contact 103 of the power supply relay from the external power supply 102 and generates a control voltage Vcc stabilized to be, for example, DC 5V, so that power is fed to each section including the electronic control module 110A and an interface circuit (not shown).

In the electronic control module 110A, a microprocessor 111 which is an arithmetic processing unit is connected, via a bus, to a RAM memory 112 for arithmetic processing, a non-volatile program memory 113A such as a flash memory, a non-volatile data memory 114, a multichannel AD converter 115, and a series-parallel converter 116.

It is noted that the program memory 113A has stored therein a control program which functions as label resistor reading conversion means 1004 described later.

In addition, the control voltage Vcc as a reference voltage is applied to the AD converter 115, and a digital converted value of an analog input signal voltage Vi obtained by the AD converter 115 is proportional to the ratio between the control voltage Vcc and the input signal voltage Vi. When the input signal voltage Vi is equal to the control voltage Vcc, a full-scale value corresponding to the resolution of the AD converter 115 is obtained.

A constant voltage power supply 110b which is directly fed with power from the external power supply 102 is provided for performing backup so that data written in the RAM memory 112 will not be lost in the state where the output contact 103 of the power supply relay is opened. Of the data written in the RAM memory 112, important data is transferred and stored into the data memory 114 during a period when the output contact 103 of the power supply relay is closed due to delay after the power supply switch (not shown) is opened.

It is noted that as the data memory 114, a non-volatile memory that allows electrical reading and writing to be easily performed in 1-byte unit can be used. In the case where the program memory 113A is a flash memory that can electrically delete data collectively in block unit, a specific block can be used as the data memory 114.

In addition, program rewriting processing for the program memory 113A is performed in the state where a program tool (not shown) or an adjustment tool 190 described later is connected. In the state where such a tool is not connected, only reading can be performed but rewriting processing cannot be performed. However, regarding the data memory 114, even if the data memory 114 is a partial area of the program memory 113A, if the storage block is different, reading and writing for the data memory 114 can be freely performed by the microprocessor 111 without connection of the tool.

However, in the case of flash memory, since the number of times deletion can be performed is limited, in general, data written in the RAM memory 112 during operation is transferred and stored into the data memory 114 immediately after the power supply switch is opened.

An interface circuit 160a provided in the electronic control apparatus 100A inputs a monitoring voltage Va1 according to a detected signal of the specific sensor 106A, to the multichannel AD converter 115.

In the case where the specific sensor 106A generates, for example, a detected signal of DC 0-5 V, the interface circuit 160a is unnecessary. However, when the detected signal voltage is minute, the detected signal voltage is amplified by the interface circuit 160a, and when the detected signal voltage can take values in both positive and negative regions, a bias voltage is added by the interface circuit 160a, whereby normalizing conversion is performed such that the monitoring voltage Va1 becomes a value in a positive coordinate region of DC 0-5 V.

The control voltage Vcc is connected to one end of a series resistor 161a connected in series to the first label resistor 61a, and the other end is inputted, as a both-end voltage Va2 of the first label resistor 61a, to the multichannel AD converter 115.

The control voltage Vcc is connected to one end of a series resistor 162a connected in series to the second label resistor 62a, and the other end is inputted, as a both-end voltage Va3 of the second label resistor 62a, to the multichannel AD converter 115.

The control voltage Vcc is connected to one end of a series resistor 174 connected in series to the label resistor 74a of the specific load 107A, and the other end is inputted, as a both-end voltage Va5 of the label resistor 74a, to the multichannel AD converter 115.

Here, if the resistance value of the series resistor 174 is set as R174 and the resistance value of the label resistor 74a is set as R74, relationships shown by expressions (1) and (2) are obtained.

$$Va5 = Vcc \times R74/(R74+R174) \qquad (1)$$

$$\therefore R74 = R174 \times (Va5/Vcc)/[1-(Va5/Vcc)] \qquad (2)$$

Accordingly, the resistance value of the label resistor 74a can be calculated from the resistance value R174 of the series resistor 174 which is a known value, and a digital converted value of the both-end voltage Va5 of the label resistor 74a obtained by the AD converter 115.

The same applies to the cases of the first and second label resistors 61a and 62a.

A current control circuit 171 composed of a transistor (not shown) as a main component performs open/close operation based on a control instruction signal DR1 which is a pulse width modulation signal (PWM signal) generated by the microprocessor 111, feeds power to the specific load 107A via a current detection resistor 172 connected in series to one end of the specific load 107A for which the load power supply voltage Vbb is applied to the other end, and controls a load current in accordance with an open/close duty which is the ratio between a closed time and the open/close cycle period.

The both-end voltage of the current detection resistor 172 is amplified by a differential amplifier 173, and then inputted as a negative feedback voltage Va4 to the AD converter 115.

The adjustment tool 190A is connected via a serial communication line 109 at the time of shipping adjustment operation of the electronic control apparatus 100A, and performs initial calibration for the interface circuit 160a and the current control circuit 171. In this shipping adjustment operation, standard sample products are used for the specific sensor 106A and the specific load 107A.

The input voltage of the interface circuit 160a is inputted to the electronic control apparatus 100A via a digital voltmeter 191 for measurement and the adjustment tool 190A, and digital converted values Di1 and Di2 obtained by the AD converter 115 from the monitoring voltage Va1 when two kinds of (large and small) input voltages Vi1 and Vi2 are given, are acquired. Then, from the relationship between the input voltages Vi1 and Vi2 and the digital converted voltages Di1 and Di2, the actual bias voltage added in the interface circuit 160a and the actual amplification factor of the interface circuit 160a are calculated.

As a result, even if there is a device-variability variation in the bias voltage added in the interface circuit 160a or the amplification factor of the interface circuit 160a, by storing the actually measured bias voltage and amplification factor in the data memory 114, a signal voltage inputted via the interface circuit 160a can be accurately acquired.

The output current of the current control circuit 171 is inputted to the electronic control apparatus 100A via a current detector 193 and a digital ammeter 192 for measurement and the adjustment tool 190A, and digital converted values Di1 and Di2 obtained by the AD converter 115 from the negative feedback voltage Va4 when two kinds of (large and small) output currents Ai1 and Ai2 are given, are acquired. Then, from the relationship between the output currents Ai1 and Ai2 and the digital converted voltages Di1 and Di2, the actual offset voltage generated by the differential amplifier 173 and the actual value of the current detection resistor 172 are calculated, and the relationship between the control instruction signal DR1 and the actual output current is calculated.

As a result, even if there is a device-variability variation in the current control circuit 171 and the current detection resistor 172, by storing in the data memory 114 the offset voltage and the value of the current detection resistor 172 that are actually measured and the relationship between the control instruction signal DR1 and the output current, the feed current for the specific load 107A can be accurately acquired from the negative feedback voltage Va4 inputted via the differential amplifier 173, and the control instruction signal can be generated so as to obtain a target output current.

As described above, appropriate calibration processing is performed in advance for the interface circuit in the electronic control apparatus 100A, for the specific sensor 106A and the specific load 107A, and therefore, even if the specific sensor 106A generates both positive and negative detected signals, it can be assumed that these signals are replaced with detected signals in a positive coordinate system owing to the bias addition in the interface circuit 160a.

Accordingly, in the description below, it will be assumed that the detection characteristic of the specific sensor and the output characteristic of the specific load do not have negative values.

Next, FIG. 2 which is a configuration diagram of the one label resistor 74a used in the first embodiment, FIGS. 3A to 3D which are characteristic line diagrams for explaining adjustment coefficients in the case of using the label resistor 74a in FIG. 2, and FIGS. 4A and 4B which are allocation configuration diagrams of the label resistor in FIG. 2, will be described.

Figure 2:
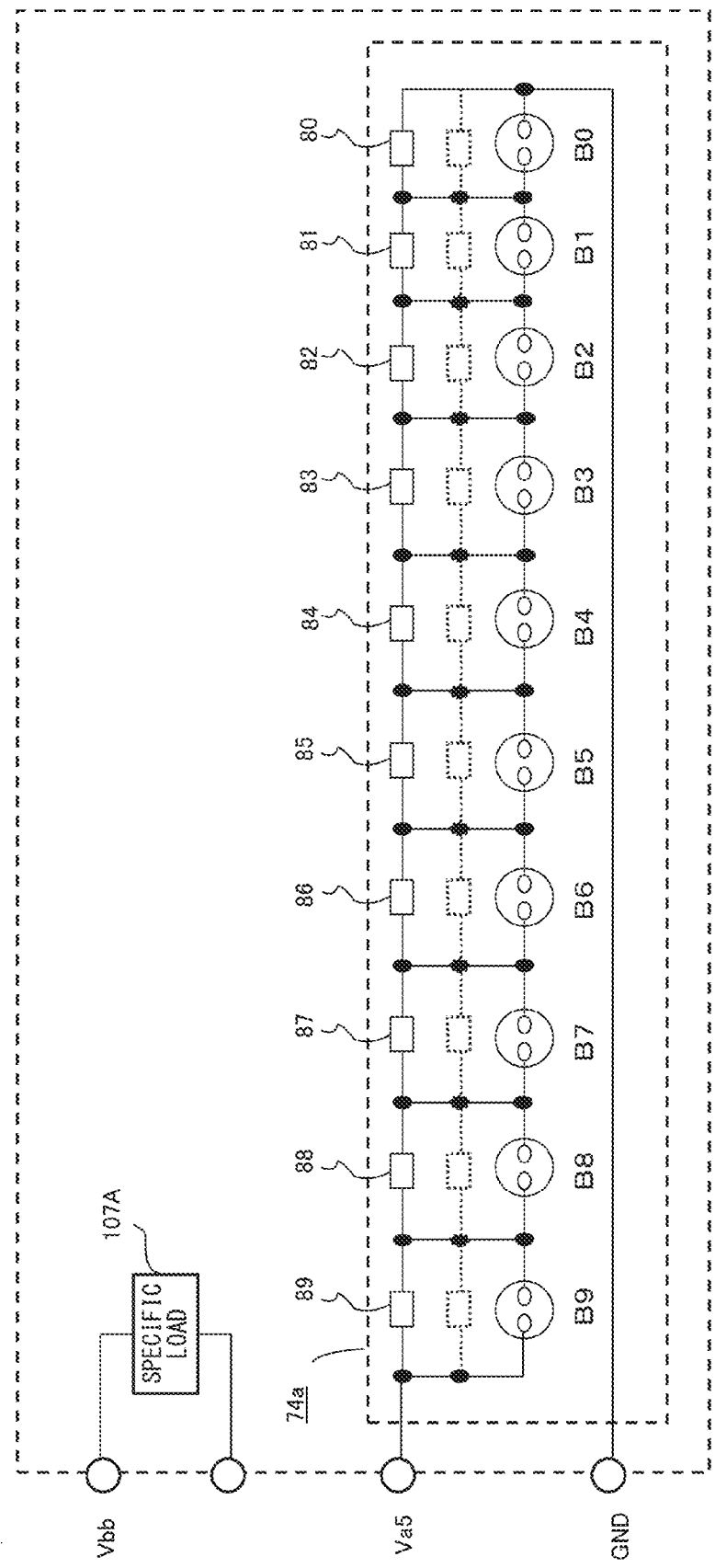
FIG. 2 is a configuration diagram of one label resistor used in the first embodiment.

In FIG. 2, the label resistor 74a is composed of a plurality of series resistors 80 to 89 sequentially connected in series. Among the series resistors 80 to 89, the resistance value of the subsequent one is two times as high as that of the previous one. The series resistors 80 to 89 can be short-circuited or open-circuited by a plurality of short-circuit/open-circuit terminals B0 to B9 provided in an adjustment window, respectively.

It is noted that since a preferred number of a geometric progression is applied to the resistance value of a resistor, it is difficult to choose each single resistor having a resistance value two times as high as that of the previous one. Therefore, a parallel resistor indicated by a dotted line is connected as appropriate so as to obtain a resistance value substantially two times as high as that of the previous one.

The short-circuit/open-circuit terminals B0 to B9 correspond to binary values of a target resistance value of the label resistor 74a, and are short-circuited for a binary value "0" and open-circuited for a binary value "1".

Owing to the above circuit configuration, when a given combination of the short-circuit/open-circuit terminals B0 to B9 are short-circuited, a combined resistance as the label resistor 74a changes depending on the given combination, and change in the resistance value of the label resistor 74a when the short-circuit/open-circuit terminal at a left position close to B9 is short-circuited is larger than change in the resistance value of the label resistor 74a when the short-circuit/open-circuit terminal at a position close to B0 is short-circuited. Such a short-circuit/open-circuit terminal at the left position is defined as a high-order bit.

Accordingly, the resistance value of the label resistor 74a is proportional to the binary value (B9, B8 . . . B1, B0).

It is noted that in the case where the short-circuit/open-circuit terminal is open-circuited for a binary value "0" and short-circuited for a binary value "1", a complement number is obtained.

It is noted that in adjustment work for the label resistor 74a, some or all of the short-circuit/open-circuit terminals B0 to B9 are short-circuited by soldering, or in some cases, all of them are open-circuited, and then, after the adjustment work is finished, sealing material is injected into an adjustment window (not shown).

Next, FIGS. 3A to 3D showing a standard characteristic line diagram and an individual characteristic diagram of the specific load 107a in FIG. 1 will be described.

Figure 3A:
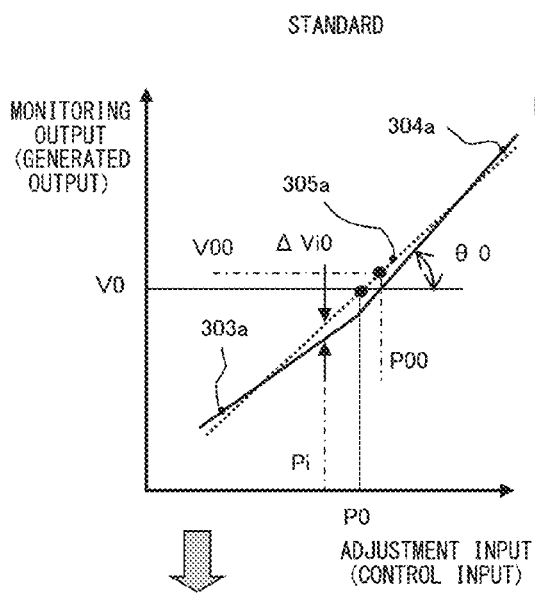
FIGS. 3A to 3D are characteristic line diagrams for explaining an adjustment coefficient in the case of using the label resistor in FIG. 2.

FIG. 3A is a standard characteristic line diagram showing the average value of the output characteristic of the specific load 107A based on a plurality of samples thereof. In FIG. 3A, if the specific load 107A is, for example, a DC motor, the horizontal axis indicates a feed current that is a control input for the motor, and the vertical axis indicates a generated torque of the motor.

The standard characteristic is approximated by a polygonal line composed of a first segment 303a and a second segment 304a. Further, the first segment 303a and the second segment 304a can be approximated by one synthesized line 305a.

The synthesized line 305a passes through a coordinate point (P0, V0), and the gradient thereof with respect to the horizontal axis is θ0.

Here, P0 is a predetermined current that is actually measured, and V0 is a generated torque at the actual measured current P0. These values constitute standard data (P0, V0, θ0).

In addition, at the actual measured current Pi, there is an error ΔVi0 between the synthesized line 305a and the polygonal line data, and the errors corresponding to various values of the actual measured current Pi constitute differential data (ΔVi0).

The standard data (P0, V0, θ0) and the differential data (ΔVi0) are stored as standard output characteristic data in the program memory 113A or the data memory 114.

Figure 3B:
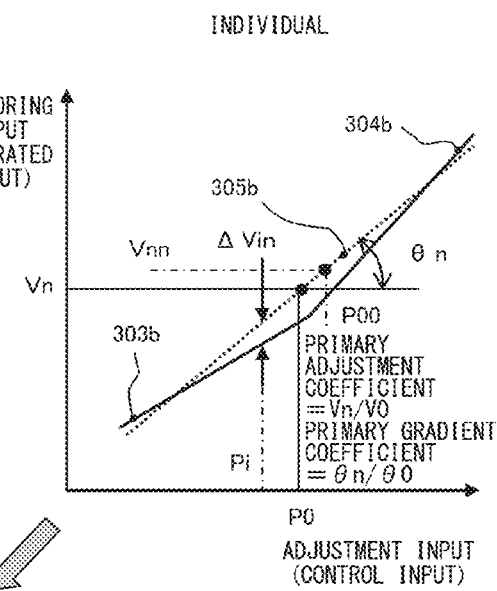

FIG. 3B is an individual characteristic line diagram showing the output characteristic of the specific load 107A that is an actual target product for shipping inspection. The relationship between the horizontal axis and the vertical axis is the same as in FIG. 3A.

The individual characteristic is approximated by a polygonal line composed of a first segment 303b and a second segment 304b. Further, the first segment 303b and the second segment 304b can be approximated by one synthesized line 305b.

The synthesized line 305b passes through a coordinate point (P0, Vn), and the gradient thereof with respect to the horizontal axis is θn.

Here, P0 is a predetermined current that is actually measured, and Vn is a generated torque at the actual measured current P0. These values constitute individual data (P0, Vn, θn).

In addition, at the actual measured current Pi, there is an error ΔVin between the synthesized line 305b and the polygonal line data, and the errors corresponding to various values of the actual measured current Pi constitute differential data (ΔV1n).

Here, a ratio Vn/V0 between the generated torque Vn in the individual characteristic and the generated torque V0 in the standard characteristic is set as a primary adjustment coefficient, and a ratio θn/θ0 between the gradient θn in the individual characteristic and the gradient θ0 in the standard characteristic is set as a primary gradient coefficient. Then, a primary correction coefficient is set as (Vn/V0, θn/θ0).

The primary correction coefficient (Vn/V0, θn/θ0) is represented by the resistance value of the label resistor 74a. The microprocessor 111 acquires the primary correction coefficient (Vn/V0, θn/θ0) for the applied specific load 107A by reading the resistance value of the label resistor 74a.

As a result, the microprocessor 111 can acquire the individual output characteristic of the motor that is the applied specific load 107A, based on the standard characteristic data stored in advance and the primary correction coefficient obtained by reading the resistance value of the label resistor 74a.

Figure 3C:
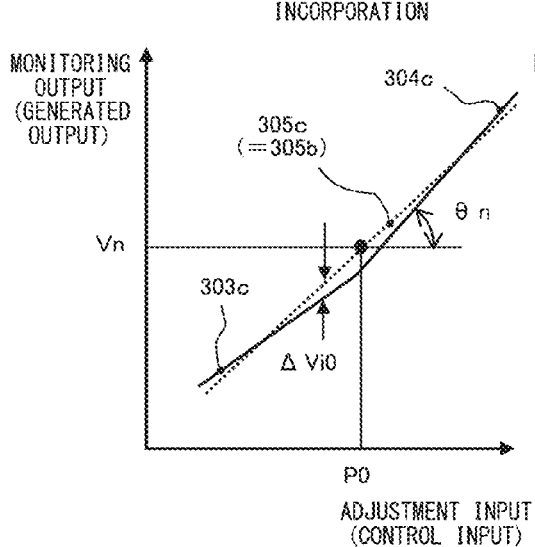

FIG. 3C shows the individual output characteristic thus acquired. As shown in FIG. 3C, a synthesized line 305c which is the same as the individual synthesized line 305b is reproduced based on the standard synthesized line 305a and the primary correction coefficient (Vn/V0, θn/θ0).

By algebraically adding the standard differential data ΔVi0 to the reproduced synthesized line 305c (=305b), a first segment 303c and a second segment 304c can be generated.

The primary correction polygonal line characteristic thus generated in FIG. 3C differs in the differential data ΔVin, as compared to the individual detection characteristic in FIG. 3B.

Figure 3D:
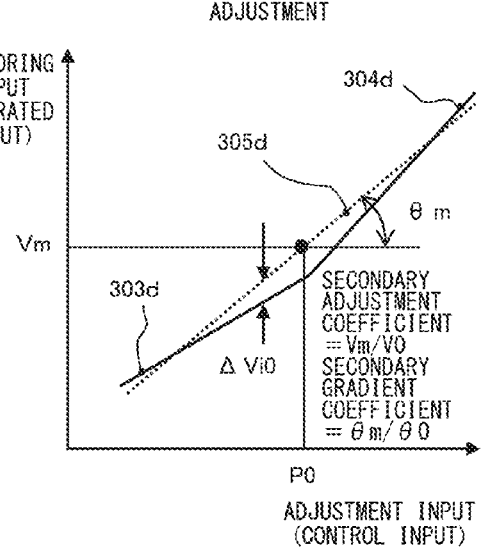

FIG. 3D shows a first segment 303d, a second segment 304d, and a synthesized line 305d based on a secondary correction polygonal line characteristic.

The synthesized line 305d passes through a coordinate point (P0, Vm), and the gradient thereof with respect to the horizontal axis is θm. The label resistor 74a represents a secondary correction coefficient (Vm/V0, θm/θ0) instead of the primary correction coefficient.

For the secondary correction coefficient, the values of a secondary adjustment coefficient (Vm/V0) and a secondary gradient coefficient (θm/θ0) are calculated so as to minimize the relative error between the first segment 303c and the second segment 304c in the primary correction polygonal line characteristic obtained by slightly increasing or slightly decreasing the values of the primary adjustment coefficient (Vn/V0) and the primary gradient coefficient (θn/θ0), and the first segment 303b and the second segment 304b in the individual polygonal line characteristic.

The microprocessor 111 specifies the synthesized line 305d based on the standard data (P0, V0, θ0) and the secondary correction coefficient read from the resistance value of the label resistor 74a, and algebraically adds the differential data ΔVi0 to the specified synthesized line 305d, thereby specifying the secondary correction polygonal line characteristic composed of the first segment 303d and the second segment 304d. Then, the microprocessor 111 acquires the individual output characteristic of the specific load 107A based on the specified secondary correction polygonal line characteristic.

Although the case where the specific load 107A is a DC motor has been described above, generally, in FIGS. 3A to 3D, the horizontal axis indicates a control input to the specific load 107A, and the vertical axis indicates a generated output from the specific load 107A.

Particularly, in the description here, the control input P0 is used as a common adjustment input, and the generated output V0 in the standard characteristic and the generated output Vn in the individual characteristic are compared with each other as monitoring outputs. Instead, the ratio of monitoring inputs that allow a common adjustment output to be obtained can be also used as an adjustment coefficient.

In addition, instead of using the gradient coefficient, a pair of comparison coordinate points can be set on the synthesized line 305a, to represent the synthesized line 305a by standard data (P0, V0, P00, V00), and then the individual synthesized line 305b can be calculated from a pair of adjustment coefficients (Vn/V0, Vnn/V00).

In the above description, the adjustment coefficient which is the relative ratio between the individual characteristic data and the standard characteristic data at a predetermined adjustment comparison point, or the gradient coefficient which is the relative ratio with respect to change rate between the individual characteristic data and the standard characteristic data at a predetermined adjustment comparison point, is used as an adjustment factor. The adjustment factor is used as a correction constant which is multiplied by the standard characteristic data, thereby obtaining the individual characteristic data.

Instead, a bias adjustment value which is the relative deviation between the individual characteristic data and the standard characteristic data at a predetermined adjustment comparison point, or a gradient adjustment value which is the relative deviation with respect to change rate between the individual characteristic data and the standard characteristic data at a predetermined adjustment comparison point, can be used as an adjustment addition value. The adjustment addition value can be used as a correction constant which is algebraically added to the standard characteristic data, thereby obtaining the individual characteristic data.

Next, FIGS. 4A and 4B which are diagrams for explaining a method for determining the resistance value of the label resistor 74a will be described.

FIG. 4A shows a bit configuration in the case where the resistance value of the label resistor 74a is converted to digital to be represented by a binary value.

Low-order bits (B4 to B0) are a numerical region for designating 1.04 to 0.95 as the adjustment coefficient. For example, in order to set the adjustment coefficient at 0.95, the low-order bits are set at 00010 which is the center value between 00001 and 00011.

Thus, in consideration of adjustment error on the label resistor or AD conversion error, even if an error of 1 bit occurs, the adjustment coefficient of 0.95 can be reliably recognized.

It is noted that in FIG. 4A, the binary values of 00001 to 11110 of the low-order bits are converted to decimal values of 1 to 30, and adjustment coefficients of 0.95 to 1.04 are allocated thereto.

For the high-order bits (B8 to B6), 1.04 to 0.97 are allocated as the gradient coefficient. For example, in order to set the gradient coefficient at 1.01, the high-order bits are set as (B8, B7, B6)=(1, 0, θ).

Although the decimal value in this case is 256, if, for example, the decimal value is 258=256+2, 1.01 is selected for the gradient coefficient, and 0.95 is selected for the adjustment coefficient.

FIG. 4B is a diagram for explaining a method for determining the resistance value of the label resistor 74a according to another embodiment. The data form applied here is such that, as the correction constant, a bias adjustment value is applied at a first comparison adjustment point and an adjustment coefficient is used at a second comparison adjustment point.

It is noted that what combination of the adjustment coefficient, the gradient coefficient, the bias adjustment value, and the gradient adjustment value is to be applied as the correction constant is written and stored as a data form in the program memory 113A or the data memory 114 in advance.

FIG. 4B is a table with 9 rows and 7 columns, i.e., a total of 63 cells, and fine adjustment allowing 7-grade correction of (+3, +2, +1, 0, −1, −2, −3) and rough adjustment allowing 7-grade correction of (+6, +4, +2, 0, −2, −4, −6) can be selected for the bias adjustment value. The meaning of one unit of correction amount is defined in the program memory 113A or the data memory 114. For example, a specific numerical value such as 5 mV or −10 Kg is stored.

In addition, for the adjustment coefficient, fine adjustment allowing 9-grade correction of (1.04, 1.03, 1.02, 1.01, 1.00, 0.99, 0.98, 0.97, 0.96) and rough adjustment allowing 9-grade correction of (1.08, 1.06, 1.04, 1.02, 1.00, 0.98, 0.96, 0.94, 0.92) can be selected.

On the other hand, the label resistor allows 7-bit selection adjustment using bits 0 to 6. Of the digital converted values 0 to 127 of the label resistor, 1 to 126 are allocated as rank numbers.

Of the rank numbers 1 to 126, odd numbers are allocated for fine adjustment and even numbers are allocated for rough adjustment. For example, in the case of a rank number 81, the bias adjustment value is to perform addition correction by a unit of +2, and the adjustment coefficient is to perform multiplication correction by 0.99 times.

In addition, for example, in the case of a rank number 82, the bias adjustment value is to perform addition correction by a unit of +4, and the adjustment coefficient is to perform multiplication correction by 0.98 times.

Next, FIG. 5 which is a configuration diagram of the two label resistors 61a and 62a used in the first embodiment, and FIGS. 6A and 6B which are characteristic line diagrams for explaining an adjustment coefficient in the case of using the label resistors 61a and 62a in FIG. 5, will be described.

In FIG. 5, the first and second label resistors 61a and 62a integrated with the specific sensor 106A are each composed of a thin-film resistor processed by laser trimming, and the resistance value thereof can be adjusted through one adjustment hole.

Here, if the thin-film resistor has a width X, a length Y, and a thickness T, a cutting dimension in the width direction is set at ΔX, and a cutting dimension in the length direction is set at ΔY, an incremental resistance value ΔR which is the increment from an initial resistance value R0 due to the cutting is calculated by expression (3).

$$\Delta R/R0=(\Delta Y/Y)\times \Delta X/(X-\times X) \qquad (3)$$

Accordingly, resistance adjustment in a wide range can be performed by adjustment of the cutting dimensions, and then a finished resistance with high accuracy can be obtained by a small-gauge laser beam.

Figure 6A:
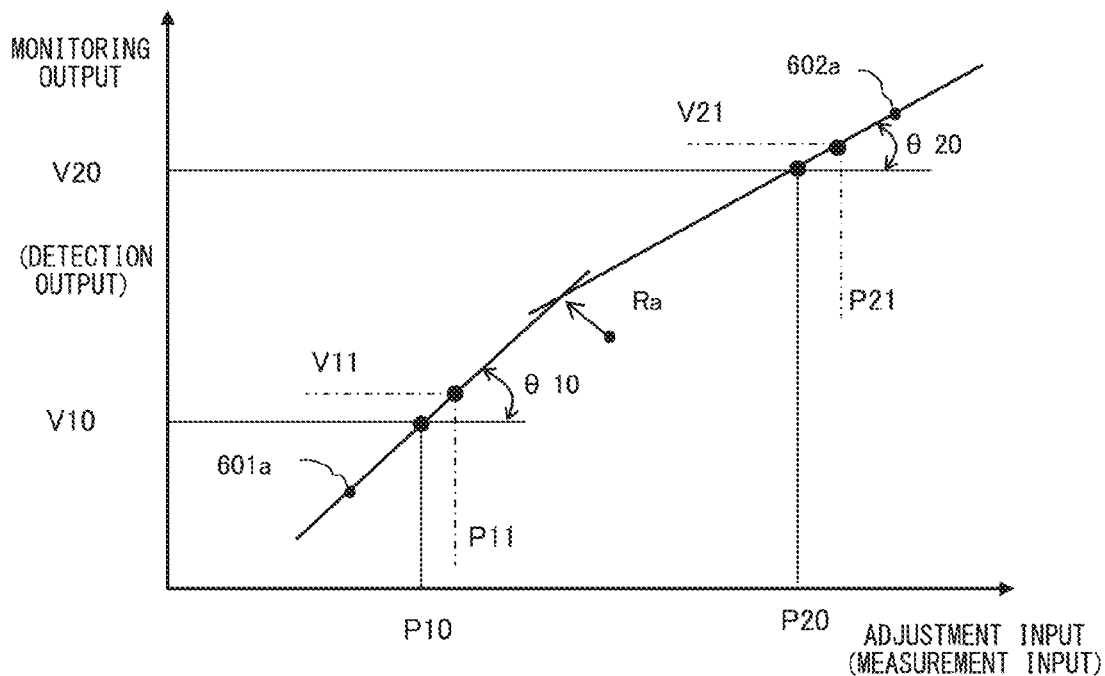
FIGS. 6A and 6B are characteristic line diagrams for explaining an adjustment coefficient in the case of using the label resistors in FIG. 5.
Figure 6B:
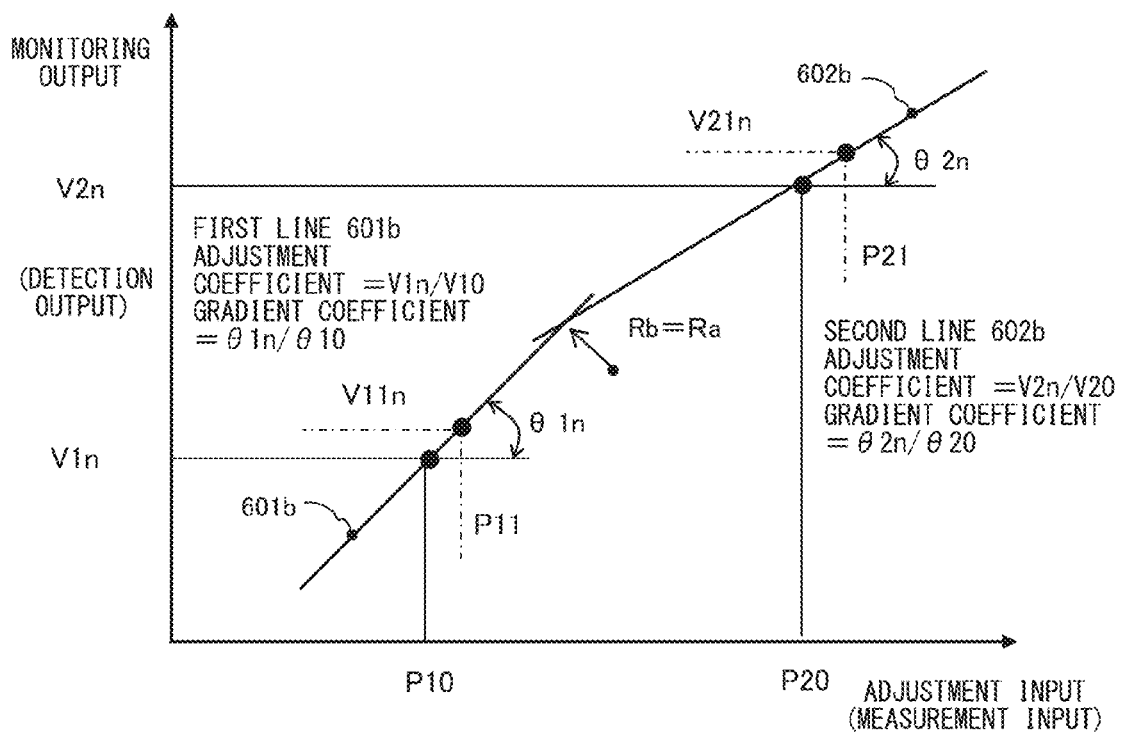

Next, FIGS. 6A and 6B showing a standard detection characteristic line diagram and an individual detection characteristic line diagram of the specific sensor 106A in FIG. 1 will be described.

FIG. 6A is a standard characteristic line diagram showing the average value of the detection characteristic of the specific sensor 106A based on a plurality of samples thereof. In FIG. 6A, if the specific sensor 106A is, for example, a pressure sensor, the horizontal axis indicates the actual measured pressure with high accuracy measured by a highly accurate pressure detector for measurement, and the vertical axis indicates the actual measured detection output voltage of the specific sensor 106A measured by a highly accurate voltmeter for measurement.

The standard characteristic is approximated by a polygonal line composed of a first line 601a and a second line 602a. The first line 601a passes through a coordinate point (P10, V10), and the gradient thereof with respect to the horizontal axis is θ10. The second line 602a passes through a coordinate point (P20, V20), and the gradient thereof with respect to the horizontal axis is θ20. In addition, at the intersection of the first line 601a and the second line 602a, arc interpolation with a curvature radius Ra can be performed.

FIG. 6B is an individual characteristic line diagram showing the detection characteristic of the specific sensor 106A that is a target for shipping inspection. The relationship between the horizontal axis and the vertical axis is the same as in FIG. 6A.

The individual characteristic is approximated by a polygonal line composed of a first line 601b and a second line 602b. The first line 601b passes through a coordinate point (P10, V1n), and the gradient thereof with respect to the horizontal axis is θ1n. The second line 602b passes through a coordinate point (P20, V2n), and the gradient thereof with respect to the horizontal axis is θ2n.

In addition, at the intersection of the first line 601b and the second line 602b, arc interpolation with a curvature radius Rb can be performed. For the curvature radius Rb, the curvature radius Ra in the standard characteristic can be used approximately.

Here, a ratio V1n/V10 between the first detection output V1n in the individual characteristic and the first detection output V10 in the standard characteristic is set as a first adjustment coefficient, and a ratio θ1n/θ10 between the first gradient θ1n in the individual characteristic and the first gradient θ10 in the standard characteristic is set as a first gradient coefficient. Then, a first correction coefficient is set as (V1n/V10, θ1n/θ10).

Similarly, a ratio V2n/V20 between the second detection output V2n in the individual characteristic and the second detection output V20 in the standard characteristic is set as a second adjustment coefficient, and a ratio θ2n/θ20 between the second gradient θ2n in the individual characteristic and the second gradient θ20 in the standard characteristic is set as a second gradient coefficient. Then, a second correction coefficient is set as (V2n/V20, θ2n/θ2θ).

The first and second correction coefficients thus calculated are represented by the resistance values of the pair of label resistors 61a and 62a in the previously-described manner.

As a result, the microprocessor 111 of the electronic control apparatus 100A can acquire the individual detection characteristic of the applied specific sensor 106A, based on the standard characteristic data stored in advance and the first and second correction coefficients obtained by reading the resistance values of the pair of label resistors 61a and 62a.

Although the case where the specific sensor 106A is a pressure sensor has been described above, generally, in FIGS. 6A and 6B, the horizontal axis indicates a measurement input to the specific sensor 106A, and the vertical axis indicates a detection output from the specific sensor 106A. Particularly, in the description here, the measurement inputs P10 and P20 are used as common adjustment inputs, and the detection outputs V10 and V20 in the standard characteristic and the detection outputs V1n and V2n in the individual characteristic are compared with each other as monitoring outputs. Instead, the ratio of monitoring inputs that allow a common adjustment output to be obtained can be used as an adjustment coefficient.

In addition, instead of using the gradient coefficient, a pair of comparison coordinate points can be set on each of the first line 601a and the second line 602a, to represent the first line 601a and the second line 602a by first standard data (P10, V10, P11, V11) and second standard data (P20, V20, P21, V21), and then the individual first line 601b and the individual second line 602b can be calculated from pairs of adjustment coefficients (V1n/V10, V11n/V11) and (V2n/V20, V21n/V21), respectively.

In the above description, the adjustment coefficient which is the relative ratio between the individual characteristic data and the standard characteristic data at a predetermined adjustment comparison point, or the gradient coefficient which is the relative ratio with respect to change rate between the individual characteristic data and the standard characteristic data at a predetermined adjustment comparison point, is used as an adjustment factor. The adjustment factor is used as a correction constant which is multiplied by the standard characteristic data, thereby obtaining the individual characteristic data.

Instead, a bias adjustment value which is the relative deviation between the individual characteristic data and the standard characteristic data at a predetermined adjustment comparison point, or a gradient adjustment value which is the relative deviation with respect to change rate between the individual characteristic data and the standard characteristic data at a predetermined adjustment comparison point, can be used as an adjustment addition value. The adjustment addition value can be used as a correction constant which is algebraically added to the standard characteristic data, thereby obtaining the individual characteristic data.

Next, FIG. 7 which is a drive control block diagram of the specific load of the electronic control apparatus 100A in FIG. 1 will be described.

In FIG. 7, in the case where the specific load 107A is, for example, a DC motor, a control block 700a sets a target drive output Ps which is a target output torque of the DC motor.

Next, a control block 700b reads the resistance value of the label resistor 74a, and calculates the individual output characteristic of the specific load 107A in the manner described in FIGS. 3A to 3D.

Next, a control block 701 sets a target current Is by referring to the target drive output Ps set by the control block 700a and the individual output characteristic calculated by the control block 700b.

A control block 702a measures the load power supply voltage Vbb applied to the specific load 107A. It is noted that the load power supply voltage Vbb and the feed voltage Vb are substantially the same values. Therefore, generally, a divided voltage of the feed voltage Vb is inputted to the AD converter 115, and the load power supply voltage Vbb and the feed voltage Vb are measured.

The subsequent control block 702b generates a control signal DR1 with a conduction duty Kd based on arithmetic expression (4).

$$Kd = Is \times Rc / Vbb \quad (4)$$

Here, Is is a target current, Rc is the resistance value of the specific load 107A at a reference temperature, and Vbb is the present value of the feed voltage Vbb calculated by the control block 702a.

A control block 702c is for replacing the value of the resistance value Rc in arithmetic expression (4) with the present resistance value at the present temperature. The present resistance value is obtained by calculating an average applied voltage as the moving average value of the product of the conduction duty Kd and the load power supply voltage Vbb in the last several open/close cycles of the control instruction signal DR1, calculating an average current as the moving average value of a detected current in the same period, and dividing the average applied voltage by the average current. Just after operation start, a predetermined fixed constant as the resistance value at a reference temperature of the specific load 107A is applied to the present resistance value.

A control block 703a calculates a feed current to the specific load 107A, from the value of the negative feedback voltage Va4 inputted to the AD converter 115.

A control block 703b multiplies a control error correction coefficient α for calibrating the device-variability variation in a target current-to-load current characteristic measured at the time of shipping inspection for the electronic control apparatus 100A.

The subsequent control block 704 generates a PID control signal based on a deviation signal between the target current Is set by the control block 701 and the load current detected and calibrated by the control blocks 703a and 703b, and algebraically adds the PID control signal to the target current for the control block 702b.

Hereinafter, the details of the operation of the electronic control apparatus according to the first embodiment of the present invention configured as shown in FIG. 1 will be described with reference to flowcharts shown in FIGS. 8 to 10.

Figure 8A:
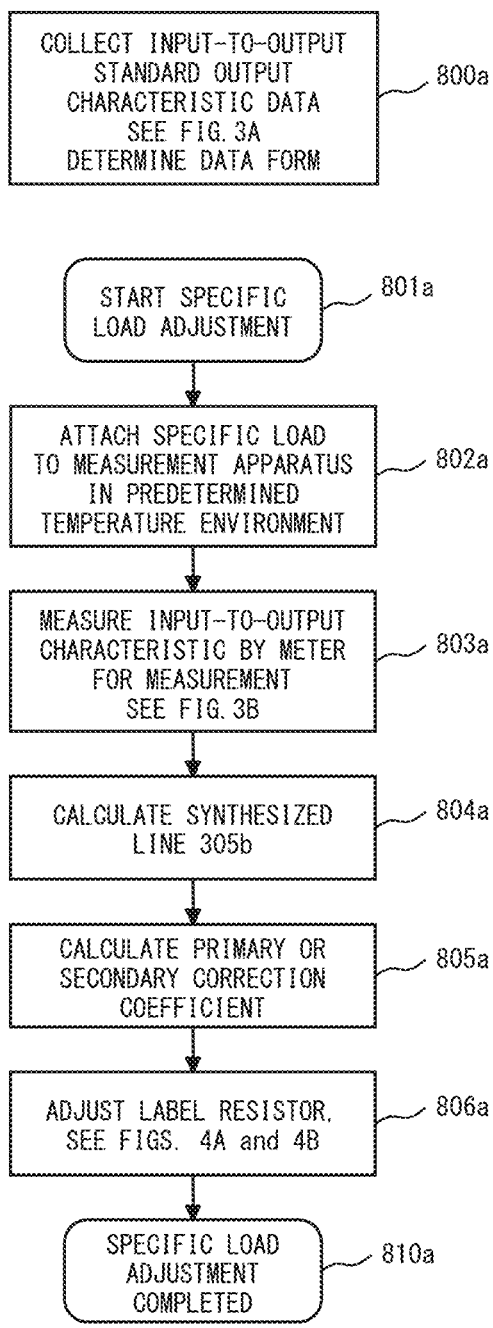
FIGS. 8A and 8B are flowcharts of adjustment work for a specific sensor and the specific load of the first embodiment.
Figure 8B:
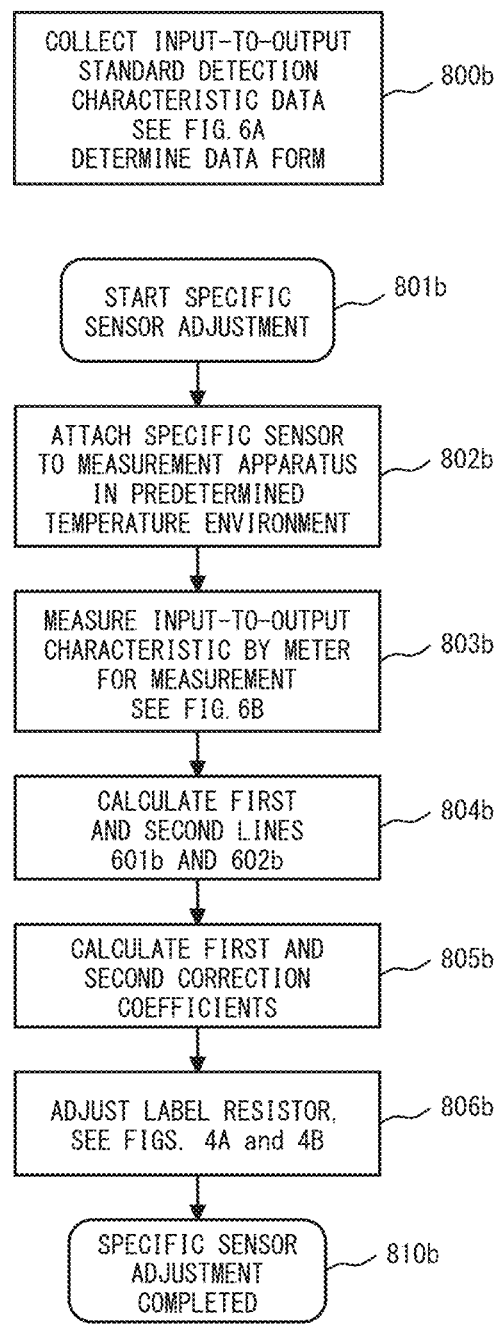

First, FIGS. 8A and 8B showing flowcharts of the shipping adjustment work for the specific sensor 106A and the specific load 107A will be described.

FIG. 8A is the flowchart for the specific load 107A. Step 800a is a step for experimental measurement performed before the shipping adjustment work. In this step, the standard output characteristic of the specific load 107A shown in FIG. 3A is set. In addition, the device-variability variation range of the individual characteristics of multiple samples experimentally measured for obtaining standard data is observed, a data form of the standard data is specified, and for example, (P0, V0, θ0) and differential data ΔVi0 are generated as the standard data.

It is noted that if the output characteristic of the specific load 107A varies by, for example, the ambient temperature and the variation cannot be ignored, the output characteristic needs to be measured in a reference temperature environment and in other high-temperature and low-temperature environments, to generate the standard data for different temperature environments.

Step 801a is a step of starting the shipping adjustment work for the specific load 107A that is the actual product for shipping adjustment.

In the subsequent step 802a, the specific load 107A is attached to a measurement apparatus as a testing facility in a predetermined reference environment. In the subsequent step 803a, the individual output characteristic shown in FIG. 3B is measured. In the subsequent step 804a, an arithmetic expression for the synthesized line 305b is obtained. In the subsequent step 805a, the primary correction coefficient for obtaining the primary correction polygonal line characteristic shown in FIG. 3C or the secondary correction coefficient for obtaining the secondary correction polygonal line characteristic shown in FIG. 3D is calculated. In the subsequent step 806a, the label resistor is adjusted with reference to FIGS. 4A and 4B. Then, in step 810a, the shipping adjustment is completed.

It is noted that step 800a is, in principle, performed through manual work, using office automation equipment. However, for a series of works from step 802a to step 806a, overall labor-saving can be realized by an automation facility mainly composed of a programmable controller.

FIG. 8B is the flowchart for the specific sensor 106A. Step 800b is a step for experimental measurement performed before the shipping adjustment work. In this step, the standard detection characteristic of the specific sensor 106A shown in FIG. 6A is set. In addition, the device-variability variation range of the individual characteristics of multiple samples experimentally measured for obtaining standard data is observed, a data form of the standard data is specified, and for example, first standard data (P10, V10, θ10) and second standard data (P20, V20, θ20) are generated as the standard data.

It is noted that if the detection characteristic of the specific sensor 106A varies by, for example, the ambient temperature and the variation cannot be ignored, the detection characteristic needs to be measured in a reference temperature environment and in other high-temperature and low-temperature environments, to generate the standard data for different temperature environments.

Step 801b is a step of starting the shipping adjustment work for the specific sensor 106A that is the actual product for shipping adjustment.

In the subsequent step 802b, the specific sensor 106A is attached to a measurement apparatus as a testing facility in a predetermined reference environment. In the subsequent step 803b, the individual detection characteristic shown in FIG. 6B is measured. In the subsequent step 804b, arithmetic expressions for the first and second lines 601b and 602b are obtained. In the subsequent step 805b, the first and second correction coefficients are calculated. In the subsequent step 806b, the first and second label resistors 61a and 62a are adjusted with reference to FIGS. 4A and 4B. Then, in step 810b, the shipping adjustment is completed.

It is noted that step 800b is, in principle, performed through manual work, using office automation equipment. However, for a series of works from step 802b to step 806b, overall labor-saving can be realized by an automation facility mainly composed of a programmable controller.

Next, FIG. 9 which is a flowchart of adjustment operation of the electronic control apparatus 100A in FIG. 1 will be described. In FIG. 9, step 900a is a preparation step of connecting the specific sensor 106A and the specific load 107A that are standard samples to the electronic control apparatus 100A, and connecting the adjustment tool 190A, the digital voltmeter 191, the digital ammeter 192, and the current detector 193 for measurement shown in FIG. 1.

It is noted that the label resistors 61a and 62a of the specific sensor 106A that is a standard sample and the label resistor 74a of the specific load 107A that is a standard sample are adjusted in advance into a standard state in which both the adjustment coefficient and the gradient coefficient are 1.0.

In addition, the program memory 113A or the data memory 114 of the electronic control apparatus 100A has stored therein, in advance, a control program as the label resistor reading conversion means 1004 and an input-output control program, and further, the standard detection data of the specific sensor 106A and the data form thereof, and the standard output data of the specific load 107A and the data form thereof.

Step 900b is a step of starting the shipping adjustment work for the electronic control apparatus 100A.

The subsequent step 901 is a step of reading the values of the label resistors of the specific sensor 106A and the specific load 107A connected as standard samples, and determining whether or not a predetermined resistance value can be read. If the reading is successful, the determination result is YES and the process proceeds to step 902. If the reading is failed, the determination result is NO and the process proceeds to step 906.

It is noted that the resistance values of the label resistors 61a, 62a, and 74a are calculated from arithmetic expression (2) by referring to the both-end voltages Va2, Va3, and Va5 in FIG. 1, respectively.

In step 902, the adjustment coefficient and the gradient coefficient are extracted from the read resistance value of the label resistor. In the subsequent step 903, it is determined whether or not both the adjustment coefficient and the gradient coefficient extracted in step 902 are standard coefficients of 1.0. If both are the standard coefficients, the determination result is YES and the process proceeds to step 904a. If both are not the standard coefficients, the determination result is NO and the process proceeds to step 906, to inspect whether or not the reading function for the label resistors 61a, 62a, and 74a is normal.

Step 904a is a step of, at a predetermined feed voltage Vbb, setting a predetermined target current Isn which is, for example, a rated current of the specific load 107A by the adjustment tool 190A, and applying a current to the specific load 107A. The subsequent step 905a is a step corresponding to correction control constant storage means for reading an excitation current Ifn measured by the digital ammeter 192, calculating a current correction coefficient α=Isn/Ifn for the target current Isn, and storing the current correction coefficient in the program memory 113A or the data memory 114.

It is noted that the control error correction coefficient α used in the control block 703b in FIG. 7 is the value measured in step 905a.

In the subsequent step 904b, a predetermined voltage is applied from the specific sensor 106A or an alternative reference voltage source (not shown) to the interface circuit 160a in the electronic control apparatus 100A, the digital converted value of the monitoring voltage Va1 which is the output voltage of the interface circuit 160a is read, and then the read value is compared with the actual measured input voltage inputted from the adjustment tool 190A to the interface circuit 160a.

The subsequent step 905b is a step of, based on the comparison using two kinds of input voltages in step 904b, calculating and storing the bias voltage and the amplification factor of the interface circuit 160a from simultaneous equations about the input voltage-to-digital converted value relationship.

Step 906 is a step of, if the determination result is NO in step 901 or step 903, notifying the adjustment tool 190A of abnormality, to proceed to adjustment completion step 910.

Next, FIG. 10 which is a flowchart of the drive operation of the electronic control apparatus 100A in FIG. 1 will be described.

Figure 10:
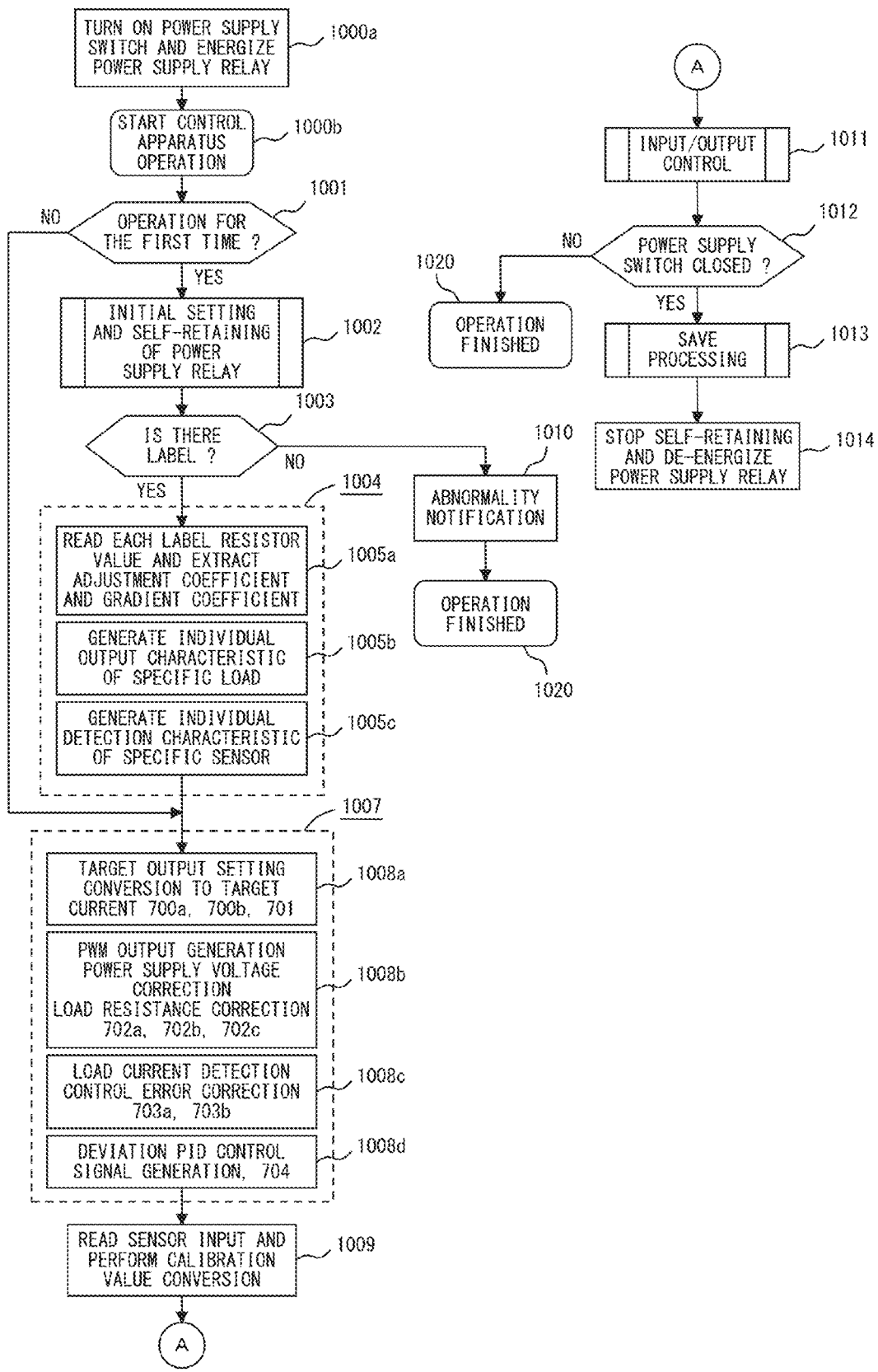
FIG. 10 is a flowchart of the drive operation of the electronic control apparatus of the first embodiment.

In FIG. 10, step 1000a is a step of closing the power supply switch (not shown), energizing the power supply relay in FIG. 1 to close the output contact 103, and feeding power to the electronic control apparatus 100A.

In the subsequent step 1000b, the constant voltage power supply 110a in the electronic control apparatus 100A generates a predetermined control voltage Vcc, whereby the microprocessor 111 starts to operate. The subsequent step 1001 is a determination step of determining, by the operation state of a flag memory (not shown), whether or not the present control flow is the first one that has been executed since the power supply switch is closed. If the present control flow is the first one, the determination result is YES and the process proceeds to step 1002. If the present control flow is not the first one, the determination result is NO and the process proceeds to step block 1007.

Step block 1002 is a step of performing initialization setting of the RAM memory 112, generating a self-retaining instruction signal to retain the closed state of the output contact 103 of the power supply relay, and energizing the load power supply relay to close the output contact 104.

Step 1003 is a step of reading the values of the label resistors 61a, 62a, and 74a provided on the specific sensor 106A and the specific load 107A, and determining whether or not a predetermined resistance value can be read. If the reading is successful, the determination result is YES and the process proceeds to step block 1004. If the reading is failed, the determination result is NO and the process proceeds to step 1010.

The subsequent step block 1004 corresponds to label resistor reading conversion means composed of steps 1005a to 1005c.

Step 1005a is a step of identifying the adjustment coefficient, the gradient coefficient, the bias adjustment value, or the gradient adjustment value which is an adjustment element, by referring to the read resistance value of the label resistor and the data form of standard data stored in the data memory 114. The subsequent step 1005b is a step of generating an arithmetic expression or a data table of the output characteristic shown in FIG. 3C or 3D, based on the adjustment coefficient and the gradient coefficient extracted in step 1005a, to proceed to step 1005c.

The subsequent step 1005c is a step of generating an arithmetic expression or a data table of the detection characteristic shown in FIG. 6B, based on the adjustment coefficient and the gradient coefficient extracted in step 1005a, to proceed to step block 1007.

The subsequent step block 1007 is a negative feedback control block composed of steps 1008a to 1008d.

Step 1008a, which corresponds to the control blocks 700a, 700b, and 701 in FIG. 7, calculates a target current from a target output torque that is set and the output characteristic of the specific load 107A generated in step 1005b.

The subsequent step 1008b, which corresponds to the control blocks 702a, 702b, and 702c in FIG. 7, generates the control instruction signal DR1 with the conduction duty according to the measured load power supply voltage Vbb and the estimated value of the load resistance.

The subsequent step 1008c, which corresponds to the control blocks 703a and 703b in FIG. 7, calculates a calibrated load current by referring to the negative feedback voltage Va4 proportional to a load current and the control error correction coefficient α calculated in step 905a in FIG. 9.

The subsequent step 1008d, which corresponds to the control block 704 in FIG. 7, is a step of, in accordance with the deviation signal between the target current set in step 1008a and the load current detected in step 1008c, generating a PID control signal obtained by combining a proportional signal, an integral signal, and a differential signal of the deviation signal, and algebraically adding the PID control signal to the target current signal.

In the subsequent step 1009, a detected signal from the specific sensor 106A is read, and an input signal in which the device-variability variation is eliminated by the individual detection characteristic generated in step 1005c and the calibration characteristic of the interface circuit 160a measured in step 905b in FIG. 9, is detected.

The subsequent step block 1011 is a step of performing drive control for the electric load group 108 in accordance with the operation states of the sensor group 105 and the specific sensor 106a and the content of the input-output control program stored in the program memory 113A.

The subsequent step 1012, which is periodically executed in step block 1011, is a step of determining whether or not the power supply switch (not shown) is closed. If the power supply switch is still closed, the determination result is NO and the process proceeds to operation completion step 1020. If the power supply switch is opened, the determination result is YES and the process proceeds to step 1013.

Step block 1013 is a step of transferring and storing, into the data memory 114, important data such as learning information or abnormality occurrence information written in the RAM memory 112 through execution of step block 1011, to proceed to step 1014.

In step 1014, the self-retaining instruction signal generated in step block 1002 is stopped, whereby the power supply relay is de-energized, the output contact 103 is opened, and then feeding to the electronic control apparatus 100A is stopped.

It is noted that in the electronic control apparatus 100A, power supply to a certain area of the RAM memory 112 is continued by the constant voltage power supply 110b directly fed with power by the external power supply 102.

Step 1020, which is an operation completion step, executes another control program, and then returns to step 1000b within a predetermined time period. Thus, steps 1000b to 1020 are repeatedly executed.

It is noted that step 1010 gives a notification of abnormality, and then proceeds to the operation completion step 1020. In the above description, step block 1004 as the label resistor reading conversion means is executed every time just after the power supply switch is turned on. Therefore, the arithmetic expressions or the data tables of the detection characteristic and the output characteristic corresponding to the actual applied products are stored in the RAM memory 112, but do not need to be transferred and stored into the non-volatile data memory 114.

However, regarding the reading timing of the label resistors, in the case where the label resistor reading conversion means is executed when the power supply switch is turned on for the first time after the terminal of the external power supply 102 is disconnected and connected, it is necessary to transfer and store the data into the non-volatile data memory 114.

As is obvious from the above description, the electronic control apparatus 100A according to the first embodiment of the present invention includes the microprocessor 111 which performs drive control for the electric load group 108 in accordance with the operation state of the input sensor group 105 and the content of the program memory 113A, in which the specific sensor 106A of the input sensor group 105 has the label resistors 61a and 62a for calibrating a device-variability variation in the detection characteristic of the specific sensor 106A, or the specific load 107A of the electric load group 108 has the label resistor 74a for calibrating a device-variability variation in the output characteristic.

The microprocessor 111 is further connected to the RAM memory 112 for arithmetic processing, the non-volatile data memory 114 which is a certain area of the non-volatile program memory 113A or is separately provided, and the AD converter 115, and operates in cooperation therewith.

The program memory 113A or the data memory 114 has stored therein, in a predetermined data form, the standard characteristic data which is the standard detection characteristic data of the specific sensor 106A or the standard output characteristic data of the specific load 107A, which is average characteristic data of experiment data based on a plurality of samples thereof.

The detection characteristic or the output characteristic has a monotonous increase property or a monotonous decrease property in which the secondary differential value thereof does not reverse between positive and negative, and is approximated by a polygonal line characteristic having at least one pair of polygonal lines.

The program memory 113A or the data memory 114 further has stored therein interpolation information for compensating error between the standard characteristic data approximated by the polygonal line characteristic and the actual standard characteristic data.

The program memory 113A includes a control program functioning as the label resistor reading conversion means 1004. The label resistor reading conversion means 1004 calculates the resistance values of the label resistors 61a, 62a, and 74a by referring to the resistance values of the series resistors 161a, 162a, and 174 connected in series to the label resistors 61a, 62a, and 74a, the both-end voltages Va2, Va3, and Va5 of the label resistors 61a, 62a, and 74a, and the control voltage Vcc which is a voltage applied to a series circuit, calculates a correction constant for correcting the device-variability variation in the detection characteristic of the specific sensor 106A or the output characteristic of the specific load 107A, based on the calculated resistance values, and stores the correction constant in the data memory 114 or the RAM memory 112.

The correction constant is a pair of adjustment factors, a pair of adjustment addition values, or a complex combination of an adjustment factor and an adjustment addition value for specifying individual characteristic data which is the individual detection characteristic data of the specific sensor 106A or the individual output characteristic data of the specific load 107A, based on the standard characteristic data.

The adjustment factor is a correction constant to be multiplied by the standard characteristic data, thereby obtaining the individual characteristic data, the adjustment factor being an adjustment coefficient which is the relative ratio between the individual characteristic data and the standard characteristic data at a predetermined adjustment comparison point, or being a gradient coefficient which is the relative ratio with respect to change rate between the individual characteristic data and the standard characteristic data at a predetermined adjustment comparison point.

The adjustment addition value is a correction constant to be algebraically added to the standard characteristic data, thereby obtaining the individual characteristic data, the adjustment addition value being a bias adjustment value which is the relative deviation between the individual characteristic data and the standard characteristic data at a predetermined adjustment comparison point, or being a gradient adjustment value which is the relative deviation with respect to change rate between the individual characteristic data and the standard characteristic data at a predetermined adjustment comparison point.

The label resistor reading conversion means 1004 is executed at the start of operation when the power supply switch is turned on, or when the specific sensor 106A or the specific load 107A is replaced upon maintenance, to identify what combination the correction constant includes, of the adjustment coefficient, the gradient coefficient, the bias adjustment value, and the gradient adjustment value, and restore and generate the individual characteristic data by combining the identified correction constant, the standard characteristic data of the specific sensor 106A or the specific load 107A, and the interpolation information.

The microprocessor 111 performs drive control for the electric load group 108 by referring to the generated individual detection characteristic data, or performs drive control for the specific load 107A by referring to the generated individual output characteristic data.

The label resistor 74a is composed of a plurality of the series resistors 80 to 89 sequentially connected in series. Among the series resistors 80 to 89, the resistance value of the subsequent one is two times as high as that of the previous one. The series resistors 80 to 89 are short-circuited or open-circuited by a plurality of short-circuit/open-circuit terminals B0 to B9 provided in the adjustment window, respectively. The short-circuit/open-circuit terminals B0 to B9 correspond to binary values of a target resistance value of the label resistor 74a, and are short-circuited or open-circuited depending on the logical states of respective bits.

As described above, the label resistor is composed of multistage series resistors, and each series resistor has a resistance value progressively increasing in multiples of the first one. In addition, after the label resistor is incorporated into the specific sensor or the specific load, the short-circuit/open-circuit terminals are short-circuited or open-circuited through the adjustment window.

Therefore, a feature is obtained that, upon adjustment of the label resistor, the resistance value of the label resistor can be set at multi-grade target values without a measurement machine for the label resistor.

For the label resistors 61a and 62a, a thin-film resistor is used that allows the resistance values thereof to be adjusted by laser trimming through the adjustment window such that the resistance values become target values by the cutting dimension $\Delta X$ in the width direction and the cutting dimension $\Delta Y$ in the length direction while the resistance values are measured and monitored.

As described above, a thin-film resistor is used for the label resistor. The label resistor is cut in the width dimension direction and the length dimension direction through the adjustment window by laser work, thus adjusting the label resistor while the resistance value is measured.

Therefore, a feature is obtained that, by post-processing after implementation of the label resistor, unlimited-grade adjustment can be performed such that the label resistor has a highly accurate resistance value while the resistance value of the label resistor is measured.

Particularly, a feature is obtained that, if the adjustment portions of a pair of the label resistors are adjacent, adjustment can be performed through one adjustment window and the sealing processing after the adjustment only needs to be performed for one portion.

Digital converted values of the label resistors 61a, 62a, and 74a measured by the microprocessor 111 are used being divided into a high-order bit group and a low-order bit group.

The high-order bit group and the low-order bit group are each allocated to a setting value of one of the adjustment coefficient, the gradient coefficient, the bias adjustment value, and the gradient adjustment value. The allocated setting values, and the minimum value with respect to the bias adjustment value or the gradient adjustment value are stored in the program memory 113A or the data memory 114. The bias adjustment value or the gradient adjustment value is set as a factor for the minimum value.

As described above, a plurality of setting values among the adjustment coefficient, the gradient coefficient, the bias adjustment value, and the gradient adjustment value are individually identified by one label resistor provided on the specific sensor or the specific load.

Therefore, a feature is obtained that the individual characteristic data of the specific sensor or the specific load that is applied can be obtained by a small number of label resistors, and that a specific setting value and the ratio or intervals among the plurality of setting values of the adjustment coefficient, the gradient coefficient, the bias adjustment value, or the gradient adjustment value can be freely set by the program memory or the data memory.

Digital converted values of the label resistors 61a, 62a, and 74a measured by the microprocessor 111 correspond to serial numbers provided on a two-dimensional map for allocating setting values of the adjustment coefficient, the gradient coefficient, the bias adjustment value, or the gradient adjustment value.

Rank numbers of the setting values are designated by the serial numbers.

When the serial numbers are divided into a lower number group and a higher number group or into an odd number group and an even number group, two of the serial numbers are allocated to each rank number, and the setting values for fine adjustment or rough adjustment allocated to the respective rank numbers, and the minimum value with respect to the bias adjustment value or the gradient adjustment value are stored in the program memory 113A or the data memory 114.

The bias adjustment value or the gradient adjustment value is set as a factor for the minimum value.

As described above, a setting value of the adjustment coefficient, the gradient coefficient, the bias adjustment value, or the gradient adjustment value can be identified by one label resistor provided on the specific sensor or the specific load.

Therefore, a feature is obtained that the individual characteristic data of the specific sensor or the specific load that is applied can be obtained by a small number of label resistors, and that a specific value and the ratio or intervals among the plurality of setting values of the adjustment coefficient, the gradient coefficient, the bias adjustment value, or the gradient adjustment value can be freely set by the program memory or the data memory.

Second Embodiment

Hereinafter, FIG. 11 which is an entire configuration diagram showing the second embodiment of the present invention will be described, focusing on the difference from that in FIG. 1.

It is noted that in each drawing, the same reference characters indicate the same or the corresponding parts.

In FIG. 11, an electronic control apparatus 100B composed of an electronic control module 110B as a main component is fed with power from the external power supply 102 directly and via the output contact 103 of the power supply relay and the output contact 104 of the load power supply relay.

The electronic control apparatus 100B performs drive control for the electric load group 108 and a specific load 107B in accordance with the operation states of the input sensor group 105 and a specific sensor 106B and the content of an input-output control program stored in a program memory 113B.

The specific load 107B is, for example, an electromagnetic actuator such as a linear solenoid, and generates electromagnetic propulsion force according to a load drive current.

The specific sensor 106B is, for example, a position sensor for detecting a position at which the electromagnetic propulsion force generated by the specific load 107B and repulsion force of a coil spring balance with each other.

The specific sensor 106B has first and second label resistors 61b and 62b for calibrating a synthesized output characteristic obtained by synthesizing a device-variability variation in the load current-to-electromagnetic propulsion force relationship which is the output characteristic of the specific load 107B, and a device-variability variation in the position detection characteristic of the specific sensor 106B.

It is noted that the synthesized output characteristic of the specific sensor 106B and the output characteristic of the specific load 107B are not a mountain-shape or valley-shape curve but a curved characteristic that monotonously increases or monotonously decreases. In the case of relatively mild linear characteristic, it is only necessary to use one label resistor. In the case of curved characteristic, two label resistors are used.

An interface circuit 160b provided in the electronic control apparatus 100B inputs a monitoring voltage Va1 according to a detected signal of the specific sensor 106B, to the multichannel AD converter 115.

In the case where the specific sensor 106B generates, for example, a detected signal of DC 0-5 V, the interface circuit 160b is unnecessary. However, when the detected signal voltage is minute, the detected signal voltage is amplified by the interface circuit 160b, and when the detected signal voltage can take values in both positive and negative regions, a bias voltage is added by the interface circuit 160b, whereby normalizing conversion is performed such that the monitoring voltage Va1 becomes a value in a positive coordinate region of DC 0-5 V.

The control voltage Vcc is connected to one end of a series resistor 161b connected in series to the first label resistor 61b, and the other end is inputted, as a both-end voltage Va2 of the first label resistor 61b, to the multichannel AD converter 115.

The control voltage Vcc is connected to one end of a series resistor 162b connected in series to the second label resistor 62b, and the other end is inputted, as a both-end voltage Va3 of the second label resistor 62b, to the multichannel AD converter 115.

An adjustment tool 190B is connected via the serial communication line 109 at the time of shipment adjustment operation of the electronic control apparatus 100B, and performs initial calibration for the interface circuit 160b and the current control circuit 171. In this shipment adjustment operation, a standard sample product is used for the specific load 107B having the specific sensor 106B.

The input voltage of the interface circuit 160b is inputted to the electronic control apparatus 100B via the digital voltmeter 191 for measurement and the adjustment tool 190B, and digital converted values Di1 and Di2 obtained by the AD converter 115 from the monitoring voltage Va1 when two kinds of (large and small) input voltages Vi1 and Vi2 are given, are acquired. Then, from the relationship between the input voltages Vi1 and Vi2 and the digital converted voltages Di1 and Di2, the actual bias voltage added in the interface circuit 160b and the actual amplification factor of the interface circuit 160b are calculated.

As a result, even if there is a device-variability variation in the bias voltage added in the interface circuit 160b or the amplification factor of the interface circuit 160b, by storing the actually measured bias voltage and amplification factor in the data memory 114, a signal voltage inputted via the interface circuit 160b can be accurately acquired.

Calibration for the device-variability variations in the current control circuit 171 and the current detection resistor 172 is as described above in FIG. 1.

As described above, appropriate calibration processing is performed in advance for the interface circuit in the electronic control apparatus 100B, for the specific sensor 106B and the specific load 107B, and therefore, even if the specific sensor 106B generates both positive and negative detected signals, it can be assumed that these signals are replaced with detected signals in a positive coordinate system owing to the bias addition in the interface circuit 160b.

Accordingly, in the description below, it will be assumed that the detection characteristic of the specific sensor and the output characteristic of the specific load do not have negative values.

Next, FIG. 12 which is a representative configuration diagram of the two label resistors 61b and 62b used in the second embodiment, and FIGS. 13A to 13C which are characteristic line diagrams for explaining adjustment coefficients in the case of using the label resistors 61b and 62b in FIG. 12, will be described.

Figure 12:
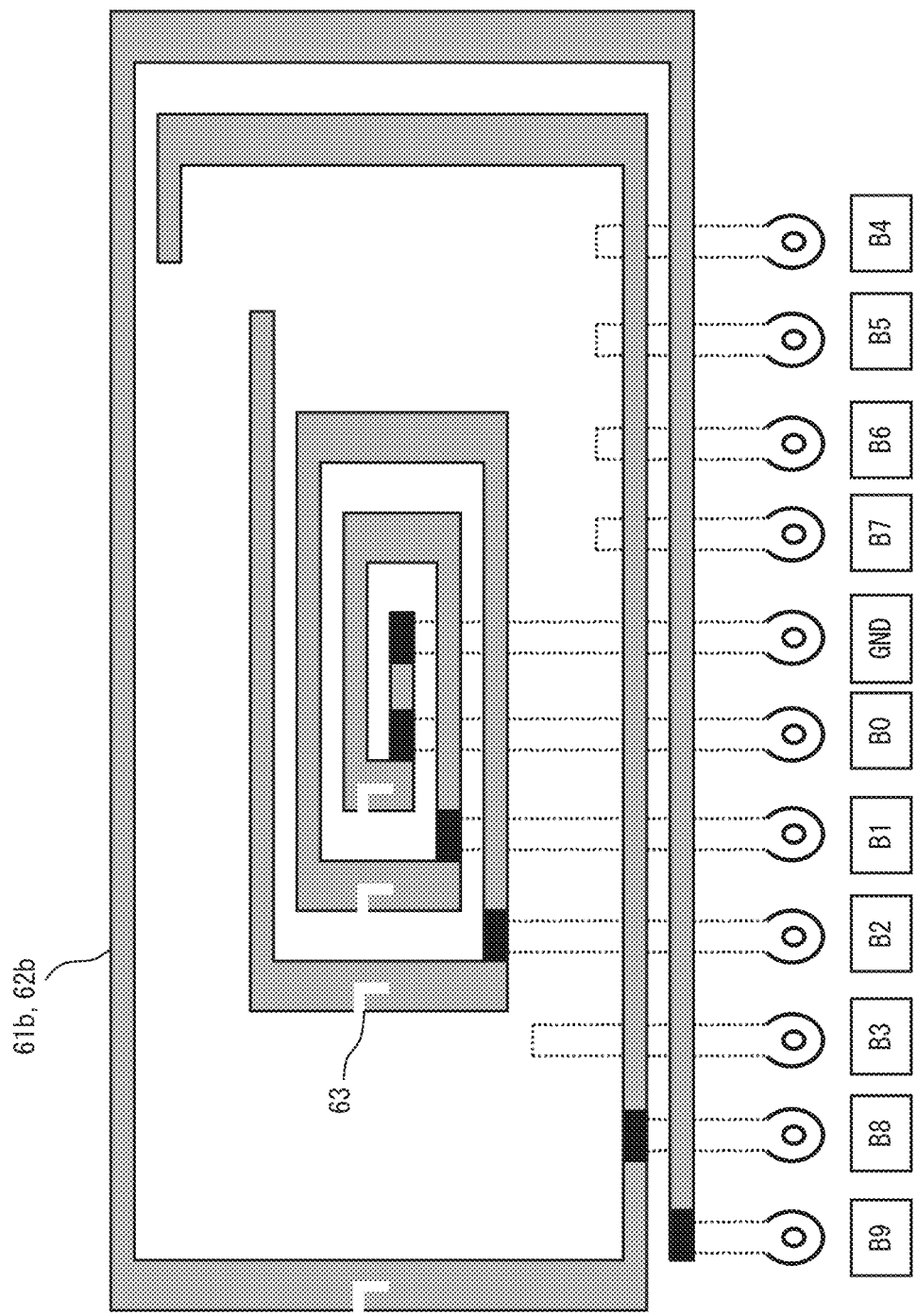
FIG. 12 is a configuration diagram of a label resistor used in the second embodiment.

In FIG. 12, in series resistors composing the label resistors 61b and 62b, connection terminals are sequentially provided on a thin-film resistor body formed in spiral shape, and the connection terminals are used as a plurality of short-circuit/open-circuit terminals B0 to B9 by which the series resistors are short-circuited or open-circuited through an adjustment window.

Resistors between the short-circuit/open-circuit terminals B0 to B9 have cut portions 63 provided sequentially from the smallest resistor by laser trimming, thus being adjusted so as to have resistance values progressively increasing in multiples of the smallest resistance value.

Owing to the above circuit configuration, when a given combination of the short-circuit/open-circuit terminals B0 to B9 are short-circuited, a combined resistance as the label resistors 61b and 62b changes depending on the given combination, and change in the resistance value of the label resistors 61b and 62b when the short-circuit/open-circuit terminal at a left position close to B9 is short-circuited is larger than change in the resistance value of the label resistors 61b and 62b when the short-circuit/open-circuit terminal at a position close to B0 is short-circuited. Such a short-circuit/open-circuit terminal at the left position is defined as a high-order bit.

It is noted that the label resistors 61b and 62b are acquired as standard parts that have been adjusted in advance. At a phase of integration with the specific sensor 106B, some or all of the short-circuit/open-circuit terminals B0 to B9 are short-circuited by soldering. After this adjustment work is finished, sealing material is injected into an adjustment window (not shown).

Figure 13A:
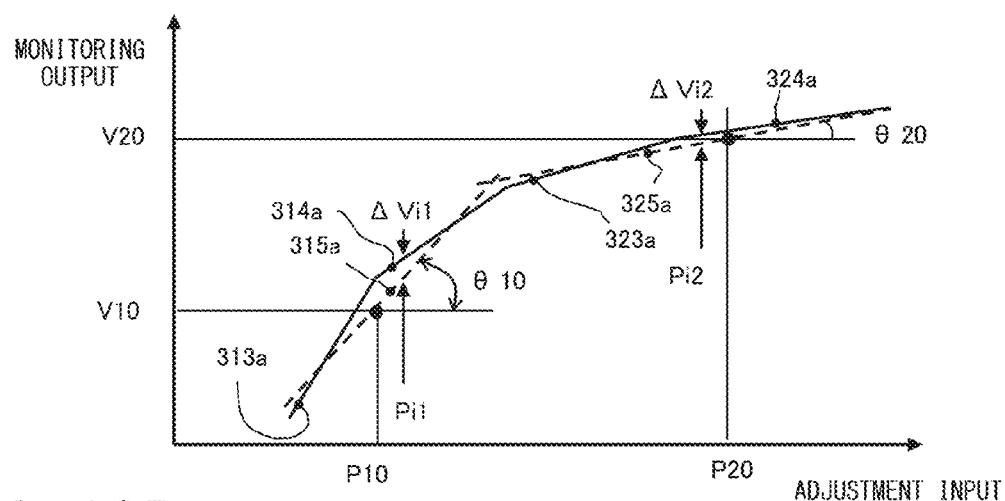
FIGS. 13A to 13C are characteristic line diagrams for explaining an adjustment coefficient in the case of using the label resistor in FIG. 12.

FIG. 13A is a standard synthesized line diagram showing the average value of the synthesized output characteristic of the specific sensor 106B based on a plurality of samples thereof. In FIG. 6A, if the specific sensor 106B is, for example, a position sensor for a plunger of a linear solenoid, the horizontal axis indicates the actual measured excitation current of the linear solenoid which is the specific load 107B, and the vertical axis indicates the actual measured output voltage of the specific sensor 106B measured by a highly accurate voltmeter for measurement.

The standard characteristic is approximated by a polygonal line composed of a first line 315a and a second line 325a. The first line 315a passes through a coordinate point (P10, V10), and the gradient thereof with respect to the horizontal axis is $\theta 10$. The second line 325a passes through a coordinate point (P20, V20), and the gradient thereof with respect to the horizontal axis is $\theta 20$.

Further, the first line 315a is a line obtained by synthesizing a polygonal line composed of a first segment 313a and a second segment 314a at the preceding stage. Further, the second line 325a is a line obtained by synthesizing a polygonal line composed of a first segment 323a and a second segment 324a at the subsequent stage.

The first and second segments at the preceding and subsequent stages reflect therein the actual standard synthesized characteristic more accurately, and the first line 315a is a synthesized line calculated so as to minimize the relative error between the first line 315a and each of the first segment 313a and the second segment 314a at the preceding stage. However, when an excitation current having various dispersion adjustment values Pi1 is applied, there is an error indicated by first differential data $\Delta Vi1$ between the first segment 313a and the second segment 314a.

Similarly, the second line 325a is a synthesized line calculated so as to minimize the relative error between the second line 325a and each of the first segment 323a and the second segment 324a at the subsequent stage. However, when an excitation current having various dispersion adjustment values Pi2 is applied, there is an error indicated by second differential data $\Delta Vi2$ between the first segment 323a and the second segment 324a.

Figure 13B:
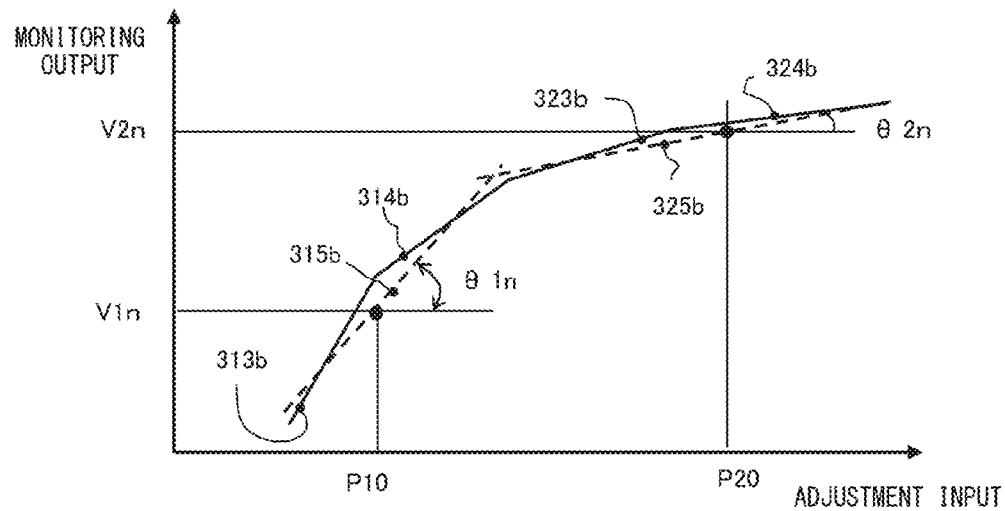

FIG. 13B is an individual characteristic line diagram of the specific load 107B with the specific sensor 106A that is an actual product as a shipping target.

The individual characteristic is approximated by a polygonal line composed of a first segment 315b and a second segment 325b. The first segment 315b passes through a coordinate point (P10, V1n), and the gradient thereof with respect to the horizontal axis is $\theta 1n$. The second segment 325b passes through a coordinate point (P20, V2n), and the gradient thereof with respect to the horizontal axis is $\theta 2n$.

Further, the first line 315b is a line obtained by synthesizing a polygonal line composed of a first segment 313b and a second segment 314b at the preceding stage. Further, the second line 325b is a line obtained by synthesizing a polygonal line composed of a first segment 323b and a second segment 324b at the subsequent stage.

The first and second segments at the preceding and subsequent stages reflect therein the actual individual synthesized characteristic more accurately, and the first line 315b is a synthesized line calculated so as to minimize the relative error between the first line 315b and each of the first segment 313b and the second segment 314b at the preceding stage.

Similarly, the second line 325b is a synthesized line calculated so as to minimize the relative error between the second line 325b and each of the first segment 323b and the second segment 324b at the subsequent stage.

Figure 13C:
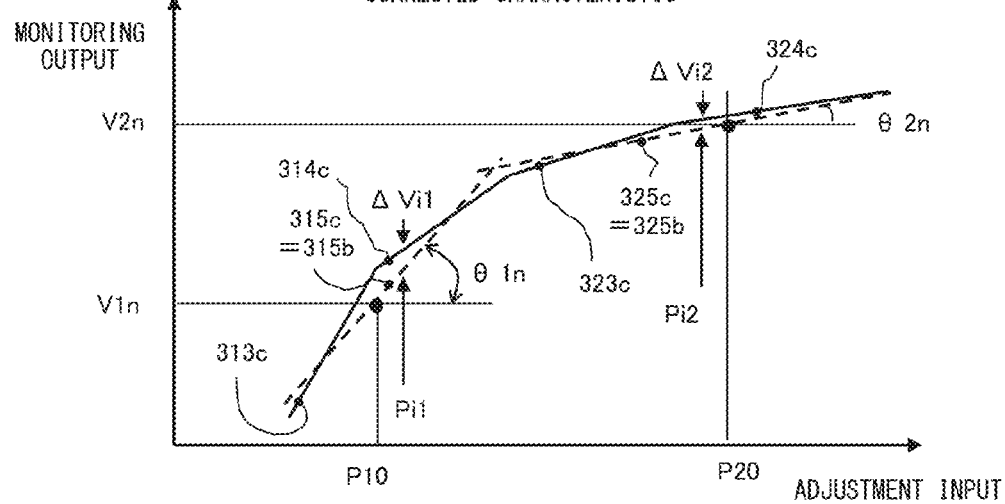

FIG. 13C shows a restored polygonal line characteristic composed of a restored first line 315c which is the same line as the individual first line 315b, and a restored second line 325c which is the same line as the individual second line 325b, which are restored based on first individual data (P10, Vin, $\theta 1n$) and second individual data (P20, V2n, $\theta 2n$) obtained by multiplying first standard data (P10, V10, $\theta 10$) and second standard data (P20, V20, $\theta 20$) with respect to the first line 315a and the second line 325a in the standard characteristic shown in FIG. 13A, by first correction constants (V1n/V10, $\theta 1n/\theta 10$) and second correction constants (V2n/V20, $\theta 2n/\theta 20$). In addition, in the restored polygonal line characteristic, the first segment 313c and the second segment 314c at the preceding stage are obtained by algebraically adding the first differential data $\Delta Vi1$ in FIG. 13A to the restored first line 315c, and the first segment 323c and the second segment 324c at the subsequent stage are obtained by algebraically adding the second differential data $\Delta Vi2$ in FIG. 13A to the restored second line 325c.

The four-stage restored polygonal line characteristic thus obtained is stored in the data memory 113B or the RAM memory 112, and the microprocessor 111 obtains the calibrated synthesized output characteristic by the restored polygonal line characteristic.

Although the case where the specific sensor 106B is a position sensor and the specific load 107B is a linear solenoid has been described above, generally, in FIGS. 13A to 13C, the horizontal axis indicates a feed current to the specific load 107B, and the vertical axis indicates a detection output from the specific sensor 106B.

Particularly, in the description here, the feed currents P10 and P20 are used as common adjustment inputs, and the detection outputs V10 and V20 in the standard characteristic and the detection outputs V1n and V2n in the individual characteristic are compared with each other as monitoring outputs. Instead, the ratio of monitoring inputs that allow a common adjustment outputs to be obtained can be also used as an adjustment coefficient.

In addition, instead of using the gradient coefficient, a pair of comparison coordinate points can be set on the first line 315a and the second line 325a, to represent the first line 315a and the second line 325a by first standard data (P10, V10, P11, V11) and second standard data (P20, V20, P21, V21), and then the individual first line 315b and the individual second line 325b can be calculated from pairs of adjustment coefficients (V1n/V10, V11n/V11) and (V2n/V20, V21n/V21).

In the above description, the adjustment coefficient which is the relative ratio between the individual characteristic data and the standard characteristic data at a predetermined adjustment comparison point, or the gradient coefficient which is the relative ratio with respect to change rate between the individual characteristic data and the standard characteristic data at a predetermined adjustment comparison point, is used as an adjustment factor. The adjustment factor is used as a correction constant which is multiplied by the standard characteristic data, thereby obtaining the individual characteristic data.

Instead, a bias adjustment value which is the relative deviation between the individual characteristic data and the standard characteristic data at a predetermined adjustment comparison point, or a gradient adjustment value which is the relative deviation with respect to change rate between the individual characteristic data and the standard characteristic data at a predetermined adjustment comparison point, can be used as an adjustment addition value. The adjustment addition value can be used as a correction constant which is algebraically added to the standard characteristic data, thereby obtaining the individual characteristic data.

Next, FIGS. 14A to 14C showing modification aspects for calculating the correction constant will be described.

FIG. 14A shows a concept diagram in the case where the specific sensor 106B has first and second label resistors, a detected signal from the specific sensor 106B is inputted to the electronic control apparatus 100B, and the resistance values of the first and second label resistors are measured, whereby the device-variability variation in the specific sensor 106B is calibrated.

FIG. 14B shows a standard synthesized line graph indicated by a solid line which shows the average value of the synthesized output characteristic of the specific sensor 106B based on a plurality of samples thereof, and an individual synthesized line graph indicated by a dotted line with respect to the specific load 107B with the specific sensor 106B that is an actual product as a shipping target.

The standard characteristic indicated by the solid line is approximated by a polygonal line composed of a first line 315a, a second line 325a, and a third line 335a positioned at the middle between the first line 315a and the second line 325a. The first line 315a passes through coordinate points (P10, V10) and (P20, V20), and the second line 325a passes through coordinate points (P30, V30) and (P40, V40).

The third line 335a passes through the coordinate point (P20, V20) common with the first line 315a, and passes through the coordinate point (P30, V30) common with the second line 325a.

The individual characteristic indicated by the dotted line is approximated by a polygonal line composed of a first line 315b, a second line 325b, and a third line 335b positioned at the middle between the first line 315b and the second line 325b. The first line 315b passes through coordinate points (P10, V10n) and (P20, V20n), and the second line 325b passes through coordinate points (P30, V30n) and (P40, V40n).

The third line 335b passes through the coordinate point (P20, V20n) common with the first line 315b, and passes through the coordinate point (P30, V30n) common with the second line 325b.

FIG. 14C shows standard data and individual data which are the coordinate points of the first lines 315a and 315b and the second lines 325a and 325b, and also shows a list of correction constants represented by the first and second label resistors.

As the correction constants, an adjustment coefficient for obtaining the individual data by multiplying the standard data by the adjustment coefficient, and a bias adjustment value for obtaining the individual data by adding the bias adjustment value to the standard data, are shown.

Thus, in the case of performing three-stage polygonal-line approximation, correction associated with three lines can be performed by using two label resistors.

Next, FIG. 15 which is a drive control block diagram of the specific load of the electronic control apparatus 100B in FIG. 11 will be described, focusing on the difference from that in FIG. 7.

In FIG. 15, the control blocks in the 700s from 701 to 703b are the same as those in FIG. 7, and the specific load 107B is replaced with a linear solenoid. The relationship of the balanced position between the electromagnetic propulsion force according to the excitation current and the coil spring, of the linear solenoid, is stored as the standard output characteristic of the specific load 107B in the program memory 113B.

Therefore, in accordance with the target drive position determined by a control block 710a, a control block 710b calculates a required excitation current from the standard output characteristic of the specific load 107B, and then the control block 701 sets a target current.

A control block 710c reads the resistance values of the label resistors 61b and 62b, and restores and generates in advance the individual synthesized output characteristic of the specific load 107B shown in FIG. 13C.

A control block 710d sets a target detected voltage to be generated by the specific sensor 106B, by referring to the target drive position set by the control block 710a, and the individual synthesized output characteristic restored and generated by the control block 710c.

A control block 713a acquires position signal information by the specific sensor 106B, from the value of the negative feedback monitoring voltage Va1 inputted to the AD converter 115.

A control block 713b converts the acquired position signal to a calibrated position signal in consideration of a device-variability variation of the input interface circuit 160b measured upon shipping inspection of the electronic control apparatus 100B.

The subsequent control block 714 generates a PID control signal based on the deviation signal between the target detected voltage set by the control block 710d and the position detected signal voltage detected and calibrated by the control blocks 713a and 713b, and algebraically adds the PID control signal to the target current of the control block 701.

As described above, the specific load 107B having the specific sensor 106B performs open-loop control by the control blocks 702a, 702b, and 702c so as to obtain the target current set based on the standard output characteristic data by the control block 701, and if there is an error between the target current and the actual excitation current, primary negative feedback control is performed by the control blocks 703a, 703b, and 704.

Further, if there is an error between the target detected voltage of the specific sensor 106B set by the control blocks 710c and 710d based on the target drive position set in step 710a, and the actual drive position detected and calibrated by the control blocks 713a and 713b, the control block 714 performs secondary negative feedback control such that the control instruction signal is corrected to increase or decrease, by referring to the individual synthesized output characteristic data.

Hereinafter, the details of the operation of the electronic control apparatus according to the second embodiment of the present invention configured as shown in FIG. 11 will be described with reference to flowcharts shown in FIGS. 16 to 18, focusing on the difference from the flowcharts shown in FIGS. 8 to 10.

Figure 16:
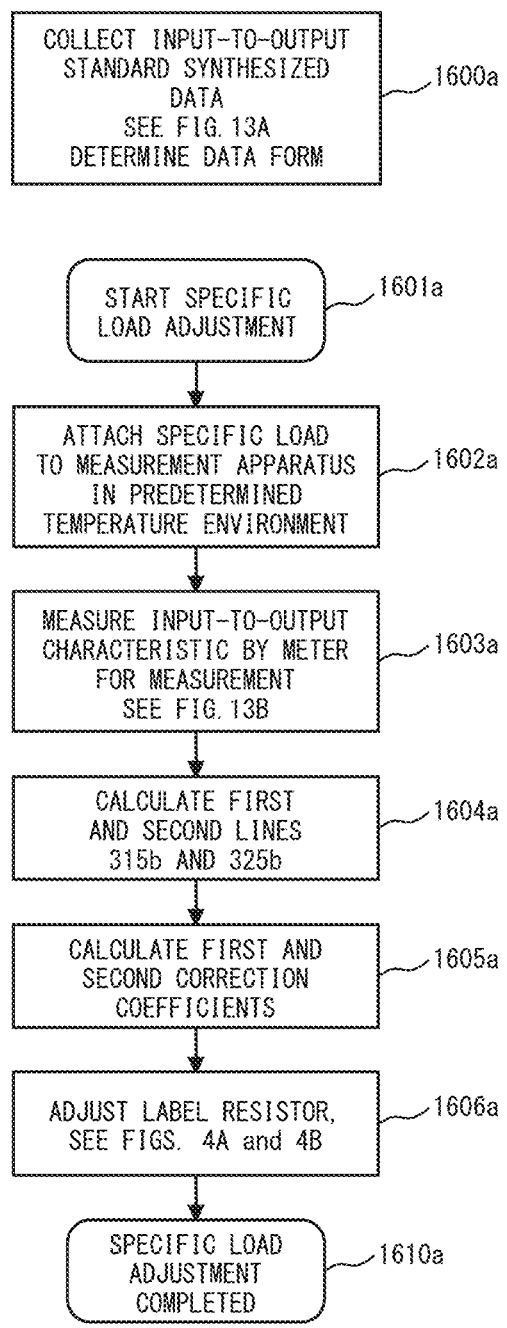
FIG. 16 is flowcharts of adjustment work for the specific load with a specific sensor of the second embodiment.
Figure 17:
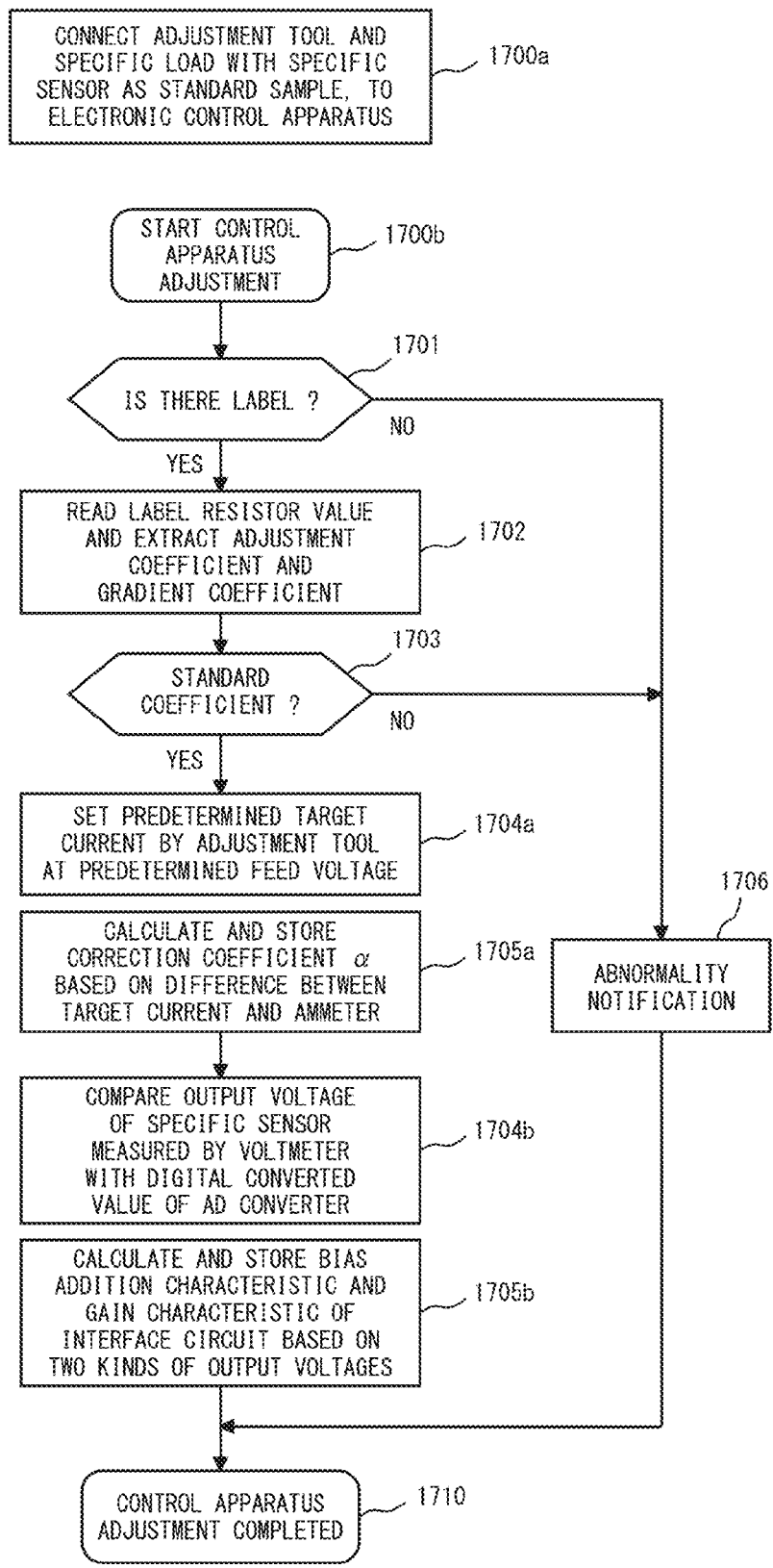
FIG. 17 is a flowchart of adjustment work of an electronic control apparatus of the second embodiment.

It is noted that, instead of the reference characters in the 800s and 900s used in FIGS. 8 and 9, reference characters in the 1600s and 1700s are used in FIGS. 16 and 17. In FIG. 18, the same reference characters in the 1000s as in FIG. 10 are used, and the numbers in the 10s and later are given so as to keep the correspondence relationship between the drawings.

First, FIG. 16 showing a flowchart of the shipping adjustment work for the specific load 107B with the specific sensor 106B will be described.

In FIG. 16, step 1600a is a step for experimental measurement performed before the shipping adjustment work. In this step, the standard synthesized output characteristic of the specific load 107B with the specific sensor shown in FIG. 13A is set. In addition, the device-variability variation range of the individual characteristics of multiple samples experimentally measured for obtaining standard data is observed, a data form of the standard data is specified, and for example, first standard data (P10, V10, θ10) and differential data ΔVi1, and second standard data (P20, V20, θ20) and differential data ΔVi2, are generated as the standard characteristic data.

In addition, the standard output characteristic of the specific load 107B alone without the specific sensor 106B is also generated.

Step 1601a is a step of starting the shipping adjustment work for the specific load 107B with the specific sensor that is the actual product for shipping adjustment.

In the subsequent step 1602a, the specific load 107B with the specific sensor is attached to a measurement apparatus as a testing facility in a predetermined reference environment. In the subsequent step 1603a, the individual output characteristic shown in FIG. 13B is measured. In the subsequent step 1604a, individual data of the first line 315b and the second line 325b is specified. In the subsequent step 1605a, the first and second correction coefficients are calculated. In the subsequent step 1606a, the label resistor is adjusted with reference to FIGS. 4A and 4B. Then, in step 1610a, the shipping adjustment is completed.

It is noted that step 1600a is, in principle, performed through manual work, using office automation equipment. However, for a series of works from step 1602a to step 1606a, overall labor-saving can be realized by an automation facility mainly composed of a programmable controller.

Next, FIG. 17 which is a flowchart of adjustment operation of the electronic control apparatus 100B in FIG. 11 will be described.

In FIG. 17, step 1700a is a preparation step of connecting the specific load 107B with the specific sensor that is a standard sample to the electronic control apparatus 100B, and connecting the adjustment tool 190B, the digital voltmeter 191, the digital ammeter 192, and the current detector 193 for measurement shown in FIG. 11.

It is noted that the label resistors 61b and 62b of the specific load 107B with the specific sensor that is a standard sample are adjusted in advance into a standard state in which both the adjustment coefficient and the gradient coefficient are 1.0.

In addition, the program memory 113B or the data memory 114 of the electronic control apparatus 100B has stored therein, in advance, a control program as the label resistor reading conversion means 1004 and an input-output control program, and further, the standard synthesized output data of the specific load 107B with the specific sensor, the standard output data of the specific load 107B, and the data form thereof.

Step 1700b is a step of starting the shipping adjustment work for the electronic control apparatus 100B.

The subsequent step 1701 is a step of reading the values of the label resistors of the specific load 107B with the specific sensor connected as a standard sample, and determining whether or not a predetermined resistance value can be read. If the reading is successful, the determination result is YES and the process proceeds to step 1702. If the reading is failed, the determination result is NO and the process proceeds to step 1706.

It is noted that the resistance values of the label resistors 61b and 62b are calculated from arithmetic expression (2) by referring to the values of the both-end voltages Va2 and Va3 in FIG. 11, respectively.

In step 1702, the adjustment coefficient and the gradient coefficient are extracted from the read resistance value of the label resistor. In the subsequent step 1703, it is determined whether or not both the adjustment coefficient and the gradient coefficient extracted in step 1702 are standard coefficients of 1.0. If both are the standard coefficients, the determination result is YES and the process proceeds to step 1704a. If both are not the standard coefficients, the determination result is NO and the process proceeds to step 1706, to inspect whether or not the reading function for the label resistors 61b and 62b is normal.

Step 1704a is a step of, at a predetermined feed voltage Vbb, setting a predetermined target current Isn which is, for example, a rated current of the specific load 107B by the adjustment tool 190B, and applying a current to the specific load 107B.

The subsequent step 1705a is a step corresponding to correction control constant storage means for reading an excitation current Ifn measured by the digital ammeter 192, calculating a current correction coefficient α=Isn/Ifn for the target current Isn, and storing the current correction coefficient in the program memory 113B or the data memory 114.

It is noted that the control error correction coefficient α used in the control block 703b in FIG. 15 is the value measured in step 1705a.

In the subsequent step 1704b, a predetermined voltage is applied from the specific sensor 106B or an alternative reference voltage source (not shown) to the interface circuit 160b in the electronic control apparatus 100B, the digital converted value of the monitoring voltage Va1 which is the output voltage of the interface circuit 160b is read, and then the read value is compared with the actual measured input voltage inputted from the adjustment tool 190B to the interface circuit 160b.

The subsequent step 1705b is a step of, based on the comparison using two kinds of input voltages in step 1704b, calculating and storing the bias voltage and the amplification factor of the interface circuit 160b from simultaneous equations about the input voltage-to-digital converted value relationship.

Step 1706 is a step of, if the determination result is NO in step 1701 or step 1703, notifying the adjustment tool 190B of abnormality, to proceed to adjustment completion step 1710.

Next, FIG. 18 which is a flowchart of the drive operation of the electronic control apparatus 100B in FIG. 11 will be described.

It is noted that the main difference in FIG. 18, as compared to FIG. 10 described above, is only that step block 1007 is replaced with step block 1007a and step block 1007b is added.

It is noted that in step 1005b, instead of the individual output characteristic of the specific load 107B, the standard output characteristic stored in the program memory 113B or the data memory 114 is read, and in step 1005c, the individual synthesized output characteristic of the specific sensor 106B is generated.

In FIG. 18, the newly added step block 1007b is a negative feedback control block composed of steps 1018a, 1018c, and 1018d.

Step 1018a, which corresponds to the control blocks 710a, 710c, and 710d in FIG. 15, calculates a target detected voltage of the specific sensor 106B from the target drive position that is set and the individual synthesized characteristic of the specific load 107B generated in step 1005c.

The subsequent step 1018c, which corresponds to the control blocks 713a and 713b in FIG. 15, calculates a calibrated drive position, by referring to the negative feedback monitoring voltage Va1 corresponding to the drive position, and the characteristic of the interface circuit 160b calculated in step 1705b in FIG. 17.

The subsequent step 1018d which corresponds to the control block 714 in FIG. 15, here, generates a PID control signal based on the deviation signal between the target detected voltage set by the control block 710d and the position detected signal voltage detected and calibrated by the control blocks 713a and 713b, and algebraically adds the PID control signal to the target current of the control block 701.

As is obvious from the above description, the electronic control apparatus 100B according to the second embodiment of the present invention includes the microprocessor 111 which performs drive control for the electric load group 108 in accordance with the operation state of the input sensor group 105 and the content of the program memory 113B, in which the specific load 107B of the electric load group 108 has the specific sensor 106B which detects output of the specific load, and the specific sensor 106B has the label resistors 61b and 62b for calibrating a device-variability variation in a synthesized output characteristic obtained by synthesizing the output characteristic of the specific load 107B and the detection characteristic of the specific sensor 106B.

The microprocessor 111 is further connected to the RAM memory 112 for arithmetic processing, the non-volatile data memory 114 which is a certain area of the non-volatile program memory 113B or is separately provided, and the AD converter 115, and operates in cooperation therewith.

The program memory 113B or the data memory 114 has stored therein, in a predetermined data form, the standard synthesized characteristic data of the specific load 107B and the specific sensor 106B, which is average characteristic data of experiment data based on a plurality of samples thereof.

The synthesized output characteristic has a monotonous increase property or a monotonous decrease property in which the secondary differential value thereof does not reverse between positive and negative, and is approximated by a polygonal line characteristic having at least one pair of polygonal lines.

The program memory 113B or the data memory 114 further has stored therein interpolation information for compensating error between the standard synthesized characteristic data approximated by the polygonal line characteristic and the actual standard synthesized characteristic data. The program memory 113B includes a control program functioning as the label resistor reading conversion means 1004. The label resistor reading conversion means 1004 calculates the resistance values of the label resistors 61b and 62b by referring to the resistance values of the series resistors 161b and 162b connected in series to the label resistors 61b and 62b, the both-end voltages Va2 and Va3 of the label resistors 61b and 62b, and the control voltage Vcc which is a voltage applied to a series circuit, calculates a correction constant for correcting the device-variability variation in the synthesized output characteristic of the specific load 107B, based on the calculated resistance values, and stores the correction constant in the data memory 114 or the RAM memory 112.

The correction constant is a pair of adjustment factors, a pair of adjustment addition values, or a complex combination of an adjustment factor and an adjustment addition value for specifying individual characteristic data which is individual synthesized characteristic data of the specific load 107B, based on standard characteristic data which is the standard synthesized characteristic data.

The adjustment factor is a correction constant to be multiplied by the standard characteristic data, thereby obtaining the individual characteristic data, the adjustment factor being an adjustment coefficient which is the relative ratio between the individual characteristic data and the standard characteristic data at a predetermined adjustment comparison point, or being a gradient coefficient which is the relative ratio with respect to change rate between the individual characteristic data and the standard characteristic data at a predetermined adjustment comparison point.

The adjustment addition value is a correction constant to be algebraically added to the standard characteristic data, thereby obtaining the individual characteristic data, the adjustment addition value being a bias adjustment value which is the relative deviation between the individual characteristic data and the standard characteristic data at a predetermined adjustment comparison point, or being a gradient adjustment value which is the relative deviation with respect to change rate between the individual characteristic data and the standard characteristic data at a predetermined adjustment comparison point.

The label resistor reading conversion means 1004 is executed at the start of operation when the power supply switch is turned on, or when the specific sensor 106B or the specific load 107B is replaced upon maintenance, to identify what combination the correction constant includes, of the adjustment coefficient, the gradient coefficient, the bias adjustment value, and the gradient adjustment value, and restore and generate the individual characteristic data by combining the identified correction constant, the interpolation information, and the standard characteristic data of the specific load 107B.

The microprocessor 111 performs drive control for the specific load 107B by referring to the generated individual synthesized characteristic data.

As described above, in the electronic control apparatus according to the second embodiment of the present invention, a specific load of the electric load group has a specific sensor for detecting the output characteristic of the specific load, and the specific sensor has a label resistor for calibrating a synthesized output characteristic obtained by synthesizing a device-variability variation in the detection characteristic of the specific sensor and a device-variability variation in the output characteristic of the specific load, whereby the individual synthesized characteristic data corresponding to the applied specific sensor and specific load is restored and generated by combination of the resistance value of the label resistor measured at the start of operation, the standard synthesized characteristic data stored in advance, and the interpolation information.

In addition, a polygonal characteristic is obtained by a plurality of constants selected from among the adjustment coefficient, the gradient coefficient, the bias adjustment value, and the gradient adjustment value which are determined by the resistance value of the label resistor.

Therefore, if at a manufacture and shipping phase of the electronic control apparatus, adjustment work as a control apparatus is performed by using a specific load with a specific sensor that is a standard sample, and at a manufacture and shipping phase of a specific load with a specific sensor, a label resistor for correcting the synthesized device variability is attached, it is not necessary to perform combination adjustment for the electronic control apparatus and the specific load with the specific sensor at an overall assembly phase for assembling them or when the specific load with the specific sensor or the electronic control apparatus is replaced upon maintenance in the market. Therefore, assembly and maintenance replacement are facilitated, and an electronic control apparatus having highly accurate control performance is obtained by using a specific load with a specific sensor that is relatively inexpensive.

In addition, even if the detection characteristic or the output characteristic is a complicated characteristic including a polygonal line characteristic having a pair or more of polygonal lines, an IC memory for storing a correction constant is not needed for the specific load with the specific sensor, and the device-variability variation can be easily calibrated by reading the resistance value of a small and inexpensive label resistor. Therefore, it is not necessary to perform complicated signal communication between the specific load with the specific sensor and the electronic control apparatus, thus obtaining an effect of enhancing economic performance as a whole.

In addition, since the microprocessor provided in the electronic control apparatus reads the label resistor during a period of not performing input/output control, and generates the individual synthesized characteristic data in advance, it is not necessary to perform reading/conversion processing for the label resistor during operation, thus obtaining an effect of reducing control load on the microprocessor and allowing usage of an inexpensive microprocessor.

The program memory 113B or the data memory 114 has stored therein, in a predetermined data form, standard output characteristic data of the specific load 107B, in addition to the standard synthesized characteristic data of the specific load 107B and the specific sensor 106B.

The microprocessor 111, in order for the specific load 107B to generate a target control output, generates a control instruction signal by referring to the standard output characteristic data, and as a result, when there is a control deviation between detection output of the specific sensor 106B obtained by referring to the individual synthesized characteristic data of the specific load, and the target control output, performs negative feedback control such that the control instruction signal is corrected to increase or decrease so as to obtain the target control output.

As described above, in the drive control for the specific load having the specific sensor, the control instruction signal for the specific load is determined by referring to the standard output characteristic data of the specific load, and the control instruction signal is corrected to increase or decrease by referring to the individual synthesized output characteristic data.

Therefore, a feature is obtained that, when the target control output has rapidly changed, the control instruction signal is immediately changed based on the standard output characteristic data, thereby increasing response of the control, and that, even if there is a device-variability variation in the output characteristic of the specific load, the control instruction signal is corrected to increase or decrease based on the individual synthesized characteristic data, thereby generating highly accurate control output.

Series resistors composing the label resistors 61b and 62b are composed of a thin-film resistor body formed in spiral shape and having connection terminals sequentially provided thereon, and the connection terminals are used as the short-circuit/open-circuit terminals B0 to B9 by which the series resistors are short-circuited or open-circuited through an adjustment window.

Resistors between the short-circuit/open-circuit terminals B0 to B9 are adjusted in advance so as to have resistance values progressively increasing in multiples of the smallest resistance value by laser trimming sequentially performed from the smallest resistor.

As described above, the label resistor is composed of series resistors formed by a thin-film resistor body processed by laser trimming so as to have progressively doubled resistance values, and each series resistor is short-circuited or open-circuited by the short-circuit/open-circuit terminals provided in the adjustment window.

Therefore, the label resistors are acquired as standard parts that have been adjusted in advance, and at a phase of integration with the specific sensor or the specific load, some or all of the short-circuit/open-circuit terminals B0 to B9 are short-circuited by soldering, thereby obtaining a feature that the resistance value of the label resistor can be set at multi-grade resistance values with high accuracy without a measurement machine for the label resistor.

Hereinafter, a calculation method for the adjustment factor in the control characteristic adjustment method for the electronic control apparatus according to the present invention will be described in detail based on characteristic line diagrams shown in FIGS. 19A and 19B.

Figure 19A:
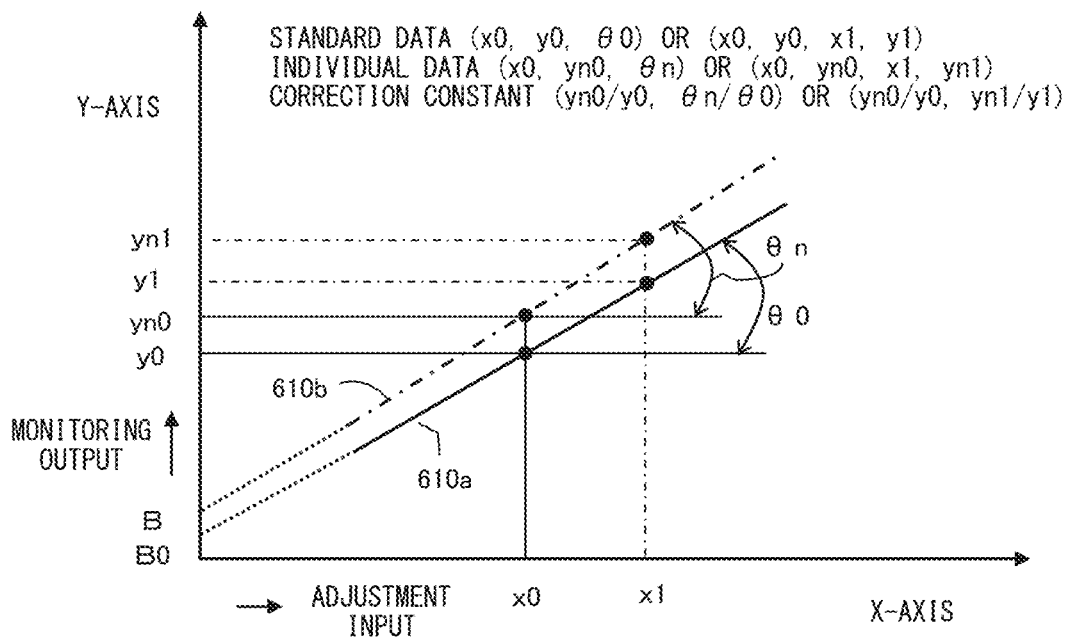
FIGS. 19A and 19B are characteristic line diagrams for explaining an adjustment factor in a control characteristic adjustment method of the present invention.

In FIG. 19A, the horizontal axis (X-axis) is a coordinate axis indicating the value of an adjustment input corresponding to a measurement input to the specific sensor or a control input to the specific load.

The vertical axis (Y-axis) is a coordinate axis indicating the value of a monitoring output corresponding to the detection output of the specific sensor or the generated output of the specific load.

A standard characteristic line 610a which is the standard characteristic of the specific sensor or the specific load passes through coordinate points (x0, y0) and (x1, y1), and the gradient thereof with respect to the horizontal axis is θ0 at a reference coordinate point.

In the line 610a, as shown by arithmetic expression (10a), a constant A0 and a constant B0 are determined if a pair of coordinate points are given or one coordinate point and a gradient are given.

$$y = A0 \cdot x + B0 \tag{10a}$$

Here, $A0 = (y1-y0)/(x1-x0)$
$B0 = (y0 \cdot x1 - y1 \cdot x0)/(x1-x0)$

Or $A0 = \tan \theta 0$ $B0 = y0 - x0 \cdot \tan \theta 0$

Therefore, if coordinates and a gradient (x0, y0, θ0) at a comparison reference point or coordinates (x0, y0, x1, y1) at a pair of comparison reference points are given as the standard data, the arithmetic expression of the standard characteristic line 610a is specified, and the monitoring output y corresponding to any adjustment input x can be calculated.

An individual characteristic line 610b which is the individual characteristic of the specific sensor or the specific load that is an actual product as a shipping target passes through coordinate points (x0, yn0) and (x1, yn1), and the gradient thereof with respect to the horizontal axis is θn at a reference coordinate point.

In the line 610b, as shown by arithmetic expression (10b), a constant A and a constant B are determined if a pair of coordinate points are given or one coordinate point and a gradient are given.

$$y = A \cdot x + B \quad (10b)$$

Here, $A = (yn1 - yn0)/(x1 - x0)$ $B = (yn0 \cdot x1 - yn1 \cdot x0)/(x1 - x0)$

Or $A = \tan \theta n$ $B = yn0 - x0 \cdot \tan \theta n$

It is noted that in FIG. 19A, the difference between the individual characteristic and the standard characteristic is represented as the difference between the monitoring outputs y0 and yn0, θ0 and θn, or y1 and yn1 when the same adjustment input x0 or x1 is given. Here, if an adjustment coefficient yn0/y0 and a gradient coefficient θn/θ0 are given as correction constants, the individual data (x0, yn0, θn) can be obtained by multiplying the standard data (x0, y0, θ0) by the adjustment coefficient and the gradient coefficient, whereby the individual characteristic line 610b can be determined.

Similarly, if a pair of adjustment coefficients yn0/y0 and yn1/y1 are given as correction constants, the individual data (x0, yn0, x1, yn1) can be obtained by multiplying the standard data (x0, y0, x1, y1) by the pair of adjustment coefficients, whereby the individual characteristic line 610b can be determined.

Figure 19B:
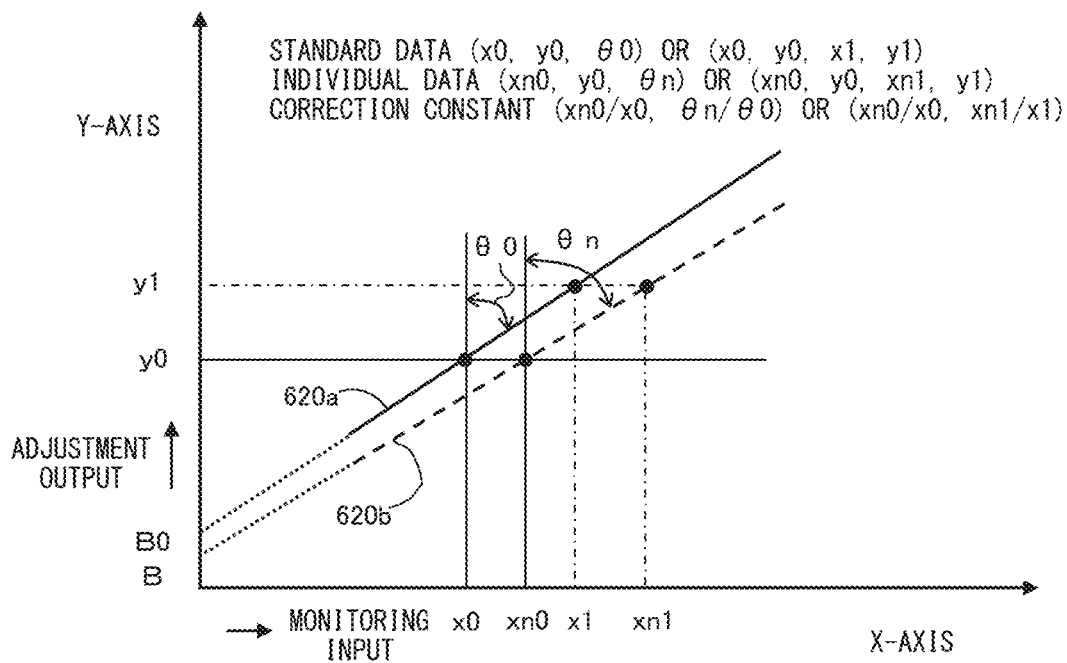

In FIG. 19B, the horizontal axis (X-axis) is a coordinate axis indicating the value of a monitoring input corresponding to a measurement input to the specific sensor or a control input to the specific load.

The vertical axis (Y-axis) is a coordinate axis indicating the value of an adjustment output corresponding to the detection output of the specific sensor or the generated output of the specific load.

A standard characteristic line 620a which is the standard characteristic of the specific sensor or the specific load passes through coordinate points (x0, y0) and (x1, y1), and the gradient thereof with respect to the vertical axis is θ0 at a reference coordinate point.

In the line 620a, as shown by arithmetic expression (20a), a constant A0 and a constant B0 are determined if a pair of coordinate points are given or one coordinate point and a gradient are given.

$$y = A0 \cdot x + B0 \quad (20a)$$

Here, $A0 = (y1 - y0)/(x1 - x0)$

Or $A0 = \cot \theta 0$ $B0 = y0 - x0 \cdot \cot \theta 0$

Therefore, if coordinates and a gradient (x0, y0, θ0) at a comparison reference point or coordinates (x0, y0, x1, y1) at a pair of comparison reference points are given as the standard data, the arithmetic expression of the standard characteristic line 620a is specified, and the adjustment output y corresponding to any monitoring input x can be calculated.

An individual characteristic line 620b which is the individual characteristic of the specific sensor or the specific load that is an actual product as a shipping target passes through coordinate points (xn0, y0) and (xn1, y1), and the gradient thereof with respect to the vertical axis is θn at a reference coordinate point.

In the line 620b, as shown by arithmetic expression (20b), a constant A and a constant B are determined if a pair of coordinate points are given or one coordinate point and a gradient are given.

$$y = A \cdot x + B \quad (20b)$$

Here, $A = (y1 - y0)/(xn1 - xn0)$ $B = (y0 \cdot xn1 - y1 \cdot xn0)/(xn1 - xn0)$ Or $A = \cot \theta n$ $B = y0 - xn0 \cdot \cot \theta n$ It is noted that in FIG. 19B, the difference between the individual characteristic and the standard characteristic is represented as the difference between the monitoring inputs x0 and xn0, θ0 and θn, or x1 and xn1 for obtaining the same adjustment output y0 or y1.

Here, if an adjustment coefficient xn0/x0 and a gradient coefficient θn/θ0 are given as correction constants, the individual data (xn0, y0, θn) can be obtained by multiplying the standard data (x0, y0, θ0) by the adjustment coefficient and the gradient coefficient, whereby the individual characteristic line 620b can be determined.

Similarly, if a pair of adjustment coefficients xn0/x0 and xn1/x1 are given as correction constants, the individual data (xn0, y0, xn1, y1) can be obtained by multiplying the standard data (x0, y0, x1, y1) by the pair of adjustment coefficients, whereby the individual characteristic line 620b can be determined.

As is obvious from the above description, the adjustment factor is a correction constant to be multiplied by the standard characteristic data, thereby obtaining the individual characteristic data. Then, an adjustment coefficient which is the relative ratio between the individual characteristic data and the standard characteristic data at a predetermined adjustment comparison point, and a gradient coefficient which is the relative ratio with respect to change rate between the individual characteristic data and the standard characteristic data at a predetermined adjustment comparison point, are used as selection elements for the adjustment factor. Then, one individual characteristic line can be specified by a pair of adjustment coefficients or a combination of an adjustment coefficient and a gradient coefficient.

It is noted that, if the detection characteristic of the specific sensor or the output characteristic of the specific load changes depending on the placement environment represented by the temperature, the atmospheric pressure, or the like, an environment sensor for measuring the placement environment of the specific sensor or the specific load is provided, and standard characteristic data converted for the present environment is calculated by using the standard characteristic data measured in advance in a plurality of environment conditions, and the present environment condition that is detected. Then, individual characteristic data in the present environment is generated based on a correction constant in a reference environment and the standard characteristic data in the present environment.

Hereinafter, a calculation method for the adjustment addition value in the control characteristic adjustment method for the electronic control apparatus according to the present invention will be described based on characteristic line diagrams shown in FIGS. 20A and 20B, focusing on the difference from those in FIGS. 19A and 19B.

Figure 20A:
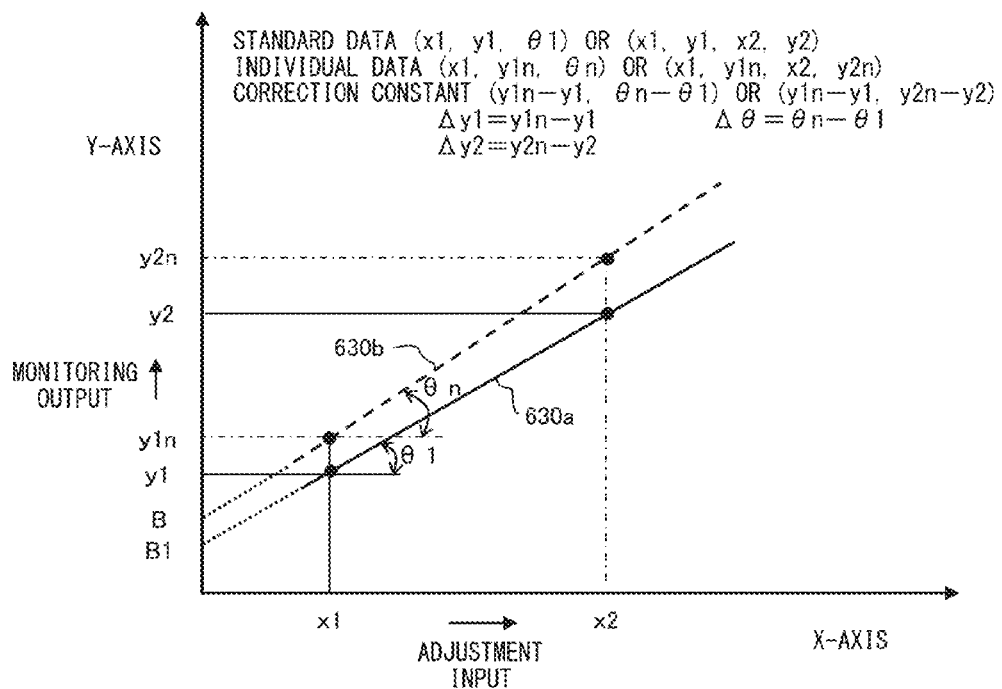
FIGS. 20A and 20B are characteristic line diagrams for explaining an adjustment addition value in the control characteristic adjustment method of the present invention.

In FIG. 20A, the horizontal axis (X-axis) is a coordinate axis indicating the value of an adjustment input corresponding to a measurement input to the specific sensor or a control input to the specific load.

The vertical axis (Y-axis) is a coordinate axis indicating the value of a monitoring output corresponding to the detection output of the specific sensor or the generated output of the specific load.

A standard characteristic line 630a which is the standard characteristic of the specific sensor or the specific load passes through coordinate points (x1, y1) and (x2, y2), and the gradient thereof with respect to the horizontal axis is θ1 at a reference coordinate point.

In the line 630a, as shown by arithmetic expression (30a), a constant A1 and a constant B1 are determined if a pair of coordinate points are given or one coordinate point and a gradient are given.

$$y = A1 \cdot x + B1 \qquad (30a)$$

Here, A1=(y2−y1)/(x2−x1)
B1=(y1·x2−y2·x1)/(x2−x1)
Or A1=tan θ1
B1=y1−x1·tan θ1

Therefore, if coordinates and a gradient (x1, y1, θ1) at a comparison reference point or coordinates (x1, y1, x2, y2) at a pair of comparison reference points are given as the standard data, the arithmetic expression of the standard characteristic line 630a is specified, and the monitoring output y corresponding to any adjustment input x can be calculated.

An individual characteristic line 630b which is the individual characteristic of the specific sensor or the specific load that is an actual product as a shipping target passes through coordinate points (x1, y1n) and (x2, y2n), and the gradient thereof with respect to the horizontal axis is θn at a reference coordinate point.

In the line 630b, as shown by arithmetic expression (30b), a constant A and a constant B are determined if a pair of coordinate points are given or one coordinate point and a gradient are given.

$$y = A \cdot x + B \qquad (30b)$$

Here, A=(y2n−y1n)/(x2−x1)
B=(y1n·x2−y2n·x1)/(x2−x1)
Or A=tan θn
B=y1n−x1·tan θn

It is noted that in FIG. 20A, the difference between the individual characteristic and the standard characteristic is represented as the difference between the monitoring outputs y1 and y1n, θ0 and θn, or y2 and y2n when the same adjustment input x1 or x2 is given. Here, if a bias adjustment value Δy1=y1n−y1 and a gradient adjustment value Δθ=θn−θ1 are given as correction constants, the individual data (x1, y1n, θn) can be obtained by algebraically adding the bias adjustment value Δy1 and the gradient adjustment value Δθ to the standard data (x1, y1, θ1), whereby the individual characteristic line 630b can be determined.

Similarly, if a pair of bias adjustment values Δy1=y1n−y1 and Δy2=y2n−y2 are given as correction constants, the individual data (x1, y1n, x2, y2n) can be obtained by algebraically adding the pair of bias adjustment values to the standard data (x1, y1, x2, y2), whereby the individual characteristic line 630b can be determined.

Figure 20B:
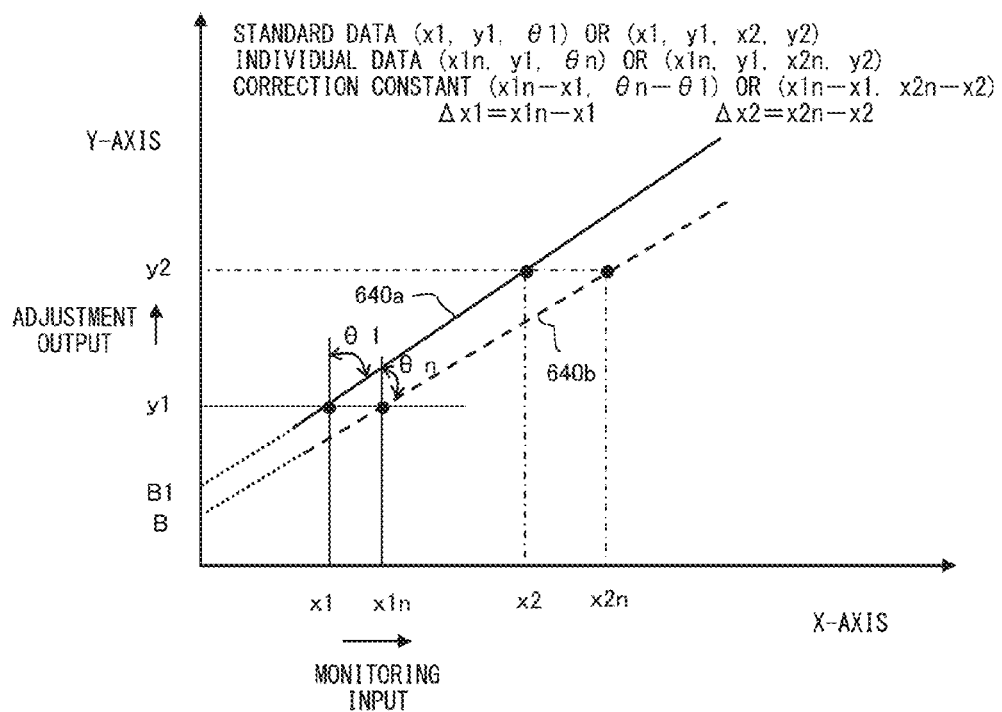

In FIG. 20B, the horizontal axis (X-axis) is a coordinate axis indicating the value of a monitoring input corresponding to a measurement input to the specific sensor or a control input to the specific load.

The vertical axis (Y-axis) is a coordinate axis indicating the value of an adjustment output corresponding to the detection output of the specific sensor or the generated output of the specific load.

A standard characteristic line 640a which is the standard characteristic of the specific sensor or the specific load passes through coordinate points (x1, y1) and (x2, y2), and the gradient thereof with respect to the vertical axis is θ1 at a reference coordinate point.

In the line 640a, as shown by arithmetic expression (40a), a constant A1 and a constant B1 are determined if a pair of coordinate points are given or one coordinate point and a gradient are given.

$$y = A1 \cdot x + B1 \qquad (40a)$$

Here, A1=(y2−y1)/(x2−x1)
B1=(y1·x2−y2·x1)/(x2−x1)
Or A1=cot θ1
B1=y1−x1·cot θ1

Therefore, if coordinates and a gradient (x1, y1, θ1) at a comparison reference point or coordinates (x1, y1, x2, y2) at a pair of comparison reference points are given as the standard data, the arithmetic expression of the standard characteristic line 640a is specified, and the adjustment output y corresponding to any monitoring input x can be calculated.

An individual characteristic line 640b which is the individual characteristic of the specific sensor or the specific load that is an actual product as a shipping target passes through coordinate points (x1n, y1) and (x2n, y2), and the gradient thereof with respect to the vertical axis is θn at a reference coordinate point.

In the line 640b, as shown by arithmetic expression (40b), a constant A and a constant B are determined if a pair of coordinate points are given or one coordinate point and a gradient are given.

$$y = A \cdot x + B \qquad (40b)$$

Here, A=(y2−y1)/(x2n−x1n)
B=(y1·x2n−y2·x1n)/(x2n−x1n)
Or A=cot θn
B=y1−x1n·cot θn It is noted that in FIG. 20B, the difference between the individual characteristic and the standard characteristic is represented as the difference between the monitoring inputs x1 and x1n, θ1 and θn, or x2 and x2n for obtaining the same adjustment output y1 or y2.

Here, if a bias adjustment value Δx1=x1n−x1 and a gradient adjustment value Δθ=θn−θ0 are given as correction constants, the individual data (x1n, y1, θn) can be obtained by algebraically adding the bias adjustment value and the gradient adjustment value to the standard data (x1, y1, θ1), whereby the individual characteristic line 640b can be determined.

Similarly, if a pair of bias adjustment values Δx1=x1n−x1 and Δx2=x2n−x2 are given as correction constants, the individual data (x1n, y1, x2n, y2) can be obtained by algebraically adding the pair of bias adjustment values to the standard data (x1, y1, x2, y2), whereby the individual characteristic line 640b can be determined.

As is obvious from the above description, the adjustment addition value is a correction constant to be algebraically added to the standard characteristic data, thereby obtaining the individual characteristic data. Then, a bias adjustment value which is the relative deviation between the individual characteristic data and the standard characteristic data at a predetermined adjustment comparison point, and a gradient adjustment value which is the relative deviation with respect to change rate between the individual characteristic data and the standard characteristic data at a predetermined adjustment comparison point, are used as selection elements for the adjustment addition value. Then, one individual characteristic line can be specified by a pair of bias adjustment values or a combination of a bias adjustment value and a gradient adjustment value.

The adjustment coefficient, the gradient coefficient, the bias adjustment value, and the gradient adjustment value, which are all selection elements, can be used in various combinations, and the combination is designated as a data form. It is noted that a pair of gradient coefficients, a pair of gradient adjustment values, and a combination of a gradient coefficient and a gradient adjustment value are invalid, and such a data form does not exist.

Hereinafter, an allocation method for the correction constant in the control characteristic adjustment method for the electronic control apparatus according to the present invention will be described based on diagrams shown in FIGS. 21 and 22.

Figure 21A:
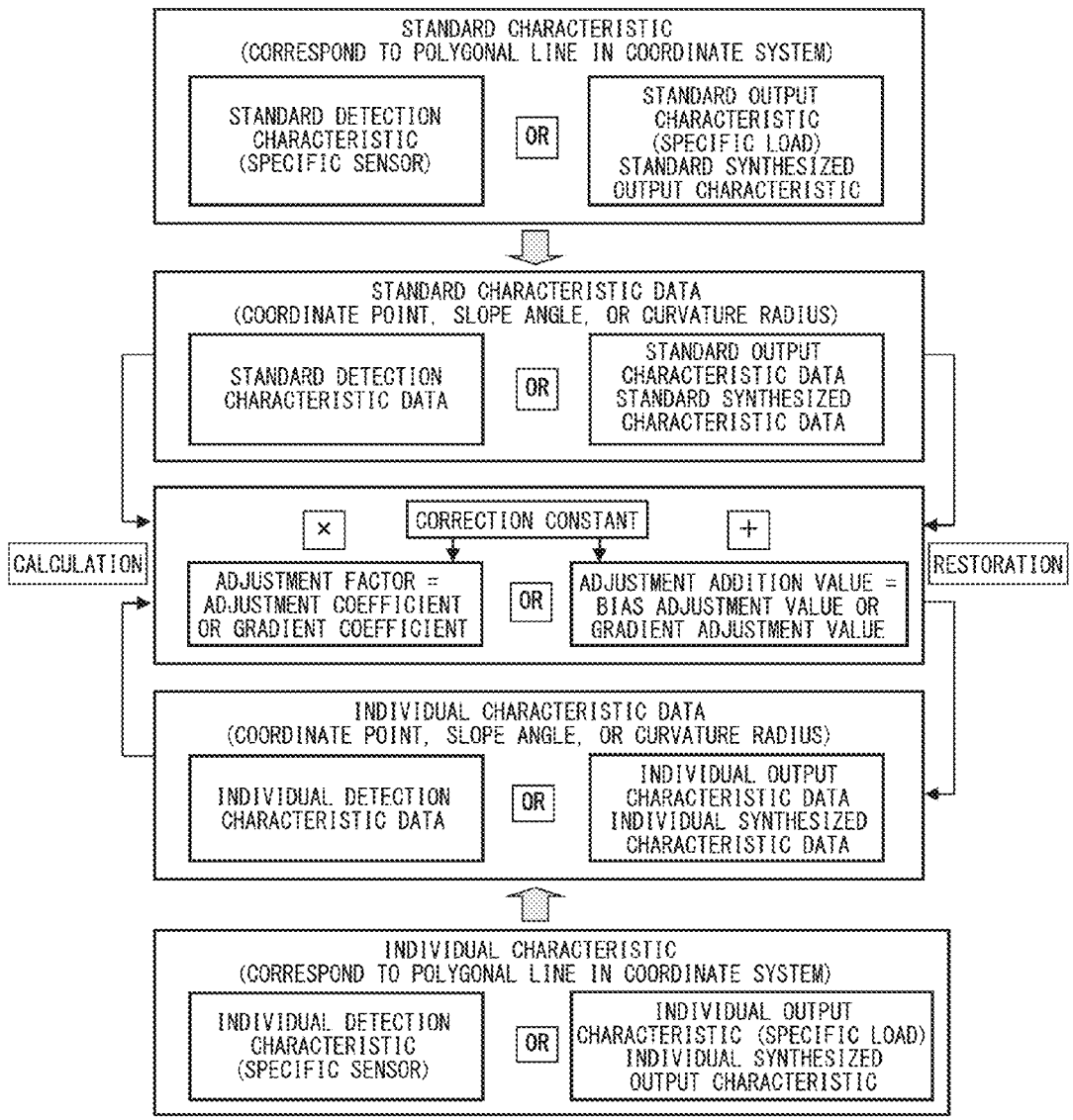
FIGS. 21A and 21B are explanation diagrams about a correction constant in the control characteristic adjustment method of the present invention.

First, in FIG. 21A organizing terms relevant to the correction constant, a standard characteristic, which is a polygonal line in a coordinate system, corresponds to a standard detection characteristic with respect to a specific sensor and a standard output characteristic with respect to a specific load, or a standard synthesized output characteristic with respect to a specific load with a specific sensor.

Standard characteristic data is a numerical value such as a coordinate point, a slope angle, a curvature radius, a differential value, or the like representing the above standard characteristic, and corresponds to standard detection characteristic data, standard output characteristic data, or standard synthesized characteristic data.

The same applies to an individual characteristic and individual characteristic data.

Correction constants, which are calculated by comparison between standard characteristic data and individual characteristic data, include an adjustment factor and an adjustment addition value.

The adjustment factors include an adjustment coefficient and a gradient coefficient, and the adjustment addition values include a bias adjustment value and a gradient adjustment value. These coefficients and adjustment values are represented by the resistance values of label resistors.

An adjustment factor or an adjustment addition value obtained by measuring the resistance value of the label resistor is multiplied by or algebraically added to the standard characteristic data, whereby the individual characteristic data is restored and generated.

Figure 21B:
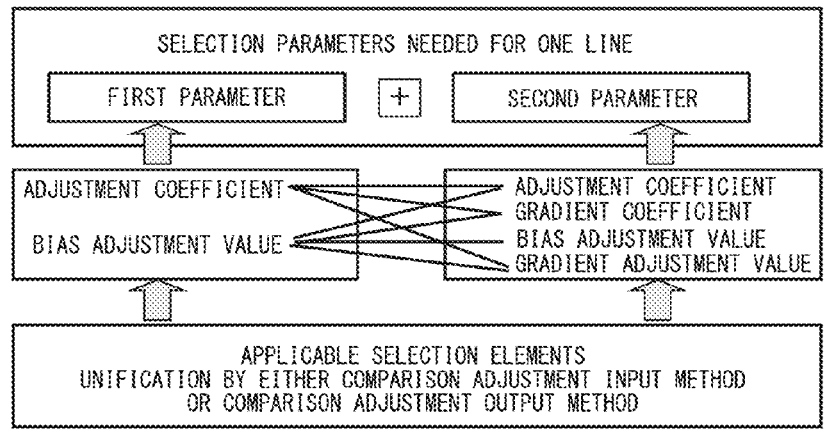
Figures 24A, 24B:
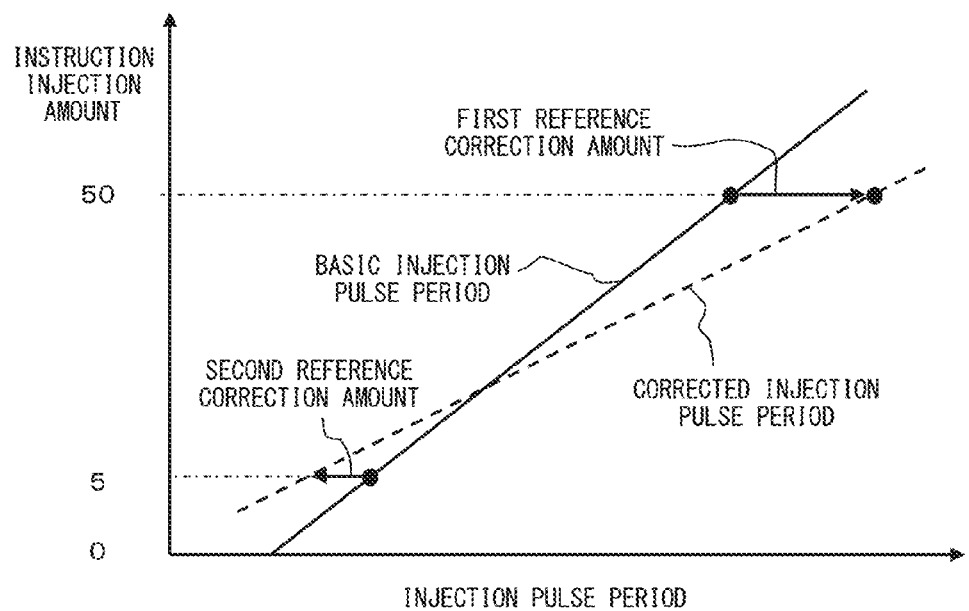
FIGS. 24A and 24B are diagrams for explaining Patent Document 2 as a conventional technique.

Next, in FIG. 21B which is an explanation diagram about the correction constant, selection parameters needed for one individual line are classified into a first parameter and a second parameter.

A selection element that can be applied to the first parameter is one of the adjustment coefficient and the bias adjustment value, and meanwhile, a selection element that can be applied to the second parameter is one of the adjustment coefficient, the gradient coefficient, the bias adjustment value, and the gradient adjustment value.

Therefore, as a combination of selection parameters, one of options A1 to A7 can be selected so that (1) the option A1 for selecting a combination of an adjustment coefficient and a gradient coefficient or the option A2 for selecting a combination of first and second adjustment coefficients, is selected, (2) the option A3 for selecting a combination of a bias adjustment value and a gradient adjustment value or the option A4 for selecting a pair of bias adjustment values composed of first and second bias adjustment values, is selected, or (3) the option A5 for selecting a complex combination of an adjustment coefficient and a bias adjustment value, the option A6 for selecting a complex combination of an adjustment coefficient and a gradient adjustment value, or the option A7 for selecting a combination of a gradient coefficient and a bias adjustment value, is selected.

It is noted that it is impossible to use a combination of an option B1 for selecting two-dimensional coordinate axes of adjustment input axis-to-monitoring output axis as the coordinate axes of the polygonal line characteristic, and an option B2 for selecting two-dimensional coordinate axes of adjustment output axis-to-monitoring input axis as the coordinate axes of the polygonal line characteristic. However, it is possible to employ a combined use such as using the option B1 for the first line and the option B2 for the second line. Therefore, it is necessary to specify the data form.

FIG. 22A shows a bit configuration in the case where the resistance value of the label resistor is converted to digital to be represented by a binary value, when the option A4 is selected so that a first bias adjustment value is applied to the first parameter and a second bias adjustment value is applied to the second parameter.

Low-order bits (B4 to B0) are a numerical region for designating ten grades of −10 to +8 as the first bias adjustment value. For example, in order to set the bias adjustment value at −10, the low-order bits are set at 00010 which is the center value between 00001 and 00011.

Thus, in consideration of adjustment error on the label resistor or AD conversion error, even if an error of 1 bit occurs, the bias adjustment value of −10 can be reliably recognized.

It is noted that in FIG. 22A, the binary values of 00001 to 11110 of the low-order bits are converted to decimal values of 1 to 30, and bias adjustment values −10 to +8 are allocated thereto. In addition, a specific value of "1" which is the minimum unit of the bias adjustment value is defined in the program memory.

For the high-order bits (B8 to B6), eight grades of −4 to +3 are allocated as the second bias adjustment value. For example, in order to set the second bias adjustment value at +1, the high-order bits are set as (B8, B7, B6)=(1, 0, Although the decimal value in this case is 320, if, for example, the decimal value is 322=320+2, −10 is selected for the first bias adjustment value, and +1 is selected for the second bias adjustment value.

FIG. 22B shows the case where the option A5 (or the option A7) is selected so that a bias adjustment value is applied to the first parameter and an adjustment coefficient (or a gradient coefficient) is applied to the second parameter, as in the case of FIG. 4B.

FIG. 22B is a table with 9 rows and 7 columns, i.e., a total of 63 cells, and fine adjustment allowing 7-grade correction of (+3, +2, +1, 0, −1, −2, −3) and rough adjustment allowing 7-grade correction of (+6, +4, +2, 0, −2, −4, −6) can be selected for the bias adjustment value.

The meaning of one unit of correction amount is defined in the program memory or the data memory.

In addition, for the adjustment coefficient, fine adjustment allowing 9-grade correction of (1.04, 1.03, 1.02, 1.01, 1.00, 0.99, 0.98, 0.97, 0.96) and rough adjustment allowing 9-grade correction of (1.08, 1.06, 1.04, 1.02, 1.00, 0.98, 0.96, 0.94, 0.92) can be selected.

On the other hand, the label resistor allows 7-bit selection adjustment using bits 0 to 6. Of the digital converted values 0 to 127 of the label resistor, 1 to 126 are allocated as rank numbers.

Of the rank numbers 1 to 126, lower numbers 1 to 63 are allocated for fine adjustment and higher numbers 64 to 126 are allocated for rough adjustment. For example, in the case of a rank number 80, the bias adjustment value is to perform addition correction by a unit of +2, and the adjustment coefficient is to perform multiplication correction by 1.04 times.

In addition, for example, in the case of a rank number 17, the bias adjustment value is to perform addition correction by a unit of +1, and the adjustment coefficient is to perform multiplication correction by 1.02 times.

In FIG. 4B, an example of classifying rank numbers into fine and rough adjustments depending on whether each rank number is an odd number (B0=1) or an even number (B0=0), has been shown, and in FIG. 22B, an example of classifying rank numbers into fine and rough adjustments depending on whether each rank number is a lower number (B6=0) or a higher number (B6=1), has been shown. However, in actual, one of the above cases should be used in a unified manner.

In addition, the first parameter and the second parameter composing the selection parameters are discriminated by the description order of the standard characteristic data. For example, a selection parameter described first is used as the first parameter.

In addition, in FIGS. 4A and 22A, in the digital converted value of the resistance value of the label resistor, the correspondence relationship is unified so that the low-order bit group corresponds to the first parameter and the high-order bit group corresponds to the second parameter.

Further, in FIGS. 4B and 22B, the correspondence relationship is unified so that the upper field on the rank number table corresponds to the first parameter and the left field corresponds to the second parameter.

Further, although specific correction constants corresponding to fine adjustment and rough adjustment are set as appropriate in accordance with an intended purpose, the setting can be unified as the correction constant described herein for a purpose such as the case where the device-variability variations of the specific sensor and the specific load are, at worst, within a range of ±10%, and normally, within a range of ±5%.

In the above description, the adjustment coefficient and the gradient coefficient are the ratio of individual data/standard data, and the individual data is obtained by multiplying the standard data by these coefficients.

However, the adjustment coefficient and the gradient coefficient may be the ratio of standard data/individual data, and the individual data may be obtained by dividing the standard data by these coefficients.

Similarly, the bias adjustment value and the gradient adjustment value are the deviation obtained by subtracting the standard data from the individual data, and the individual data is obtained by adding these adjustment values to the standard data.

However, the bias adjustment value and the gradient adjustment value may be the deviation obtained by subtracting the individual data from the standard data, and the individual data may be obtained by subtracting these adjustment values from the standard data.

As is obvious from the above description, a control characteristic adjustment method for the electronic control apparatus 100A or 100B according to the first embodiment or the second embodiment of the present invention is as follows.

Auxiliary data for selecting the data form is stored in the program memory 113A or 113B or the data memory 114, in addition to the standard characteristic data.

The standard characteristic and the individual characteristic are approximated in a polygonal-line fashion in a two-dimensional coordinate system having an adjustment input axis indicating a common comparison adjustment value that is inputted and a monitoring output axis indicating a different comparison monitoring value that is outputted, or having an adjustment output axis indicating a common comparison adjustment value that is outputted and a monitoring input axis indicating a different comparison monitoring value that is inputted.

By the auxiliary data, one option is selected from some or all of the options A1 to A7 as a selection parameter composing the correction constant, so that (1) the option A1 for selecting a combination of the adjustment coefficient and the gradient coefficient or the option A2 for selecting a combination of a pair of adjustment coefficients composed of the first and the second adjustment coefficients, is selected, (2) the option A3 for selecting a combination of the bias adjustment value and the gradient adjustment value or the option A4 for selecting a pair of bias adjustment values composed of the first and the second bias adjustment values, is selected, or (3) the option A5 for selecting a complex combination of the bias adjustment value and the adjustment coefficient, the option A6 for selecting a complex combination of the adjustment coefficient and the gradient adjustment value, or the option A7 for selecting a combination of the bias adjustment value and the gradient coefficient, is selected.

Further, (4) one of the option B1 for selecting two-dimensional coordinate axes of adjustment input axis-to-monitoring output axis as the coordinate axes of the polygonal line characteristic, and the option B2 for selecting two-dimensional coordinate axes of adjustment output axis-to-monitoring input axis as the coordinate axes of the polygonal line characteristic, is selected, so that one of a total of 14 options is designated as the selection parameter.

The adjustment coefficient is a parameter determined by a ratio (yn0/y0) based on comparison between a comparison monitoring output yn0 in the individual characteristic and a comparison monitoring output y0 in the standard characteristic with respect to a common comparison adjustment input x0, or a ratio (xn0/x0) based on comparison between a comparison monitoring input xn0 in the individual characteristic and a comparison monitoring input x0 in the standard characteristic with respect to a common comparison adjustment output y0.

The gradient coefficient is a parameter determined by a ratio ($\theta n/\theta 0$ or $\tan \theta n/\tan \theta 0$) based on comparison between the slope angle or tangent of a segment which is the change rate of the individual characteristic, and the slope angle or tangent of a segment which is the change rate of the standard characteristic, at a comparison adjustment point for calculating the adjustment coefficient.

The bias adjustment value is a parameter determined by a comparison deviation (y1n−y1) between a comparison monitoring output y1n in the individual characteristic and a comparison monitoring output y1 in the standard characteristic with respect to a common comparison adjustment input x1, or a comparison deviation (x1n−x1) between a comparison monitoring input x1n in the individual characteristic and a comparison monitoring input x1 in the standard characteristic with respect to a common comparison adjustment output y1.

The gradient adjustment value is a parameter determined by a comparison deviation ($\theta n-\theta 1$ or $\tan \theta n-\tan \theta 1$) between the slope angle or tangent of a segment which is the change rate of the individual characteristic, and the slope angle or tangent of a segment which is the change rate of the standard characteristic, at a comparison adjustment point for calculating the bias adjustment value.

As described above, the program memory or the data memory has stored therein the auxiliary data for selecting the data form of the correction constant for calculating the individual characteristic data from the standard characteristic data.

Therefore, a feature is obtained that, when experimental measurement for multiple samples is performed to generate the standard characteristic data, if the data form is selected so as to decrease the variation width of the correction constant by comparing the standard characteristic and various variability characteristics obtained here, the adjustment width of the resistance value of a label resistor can be reduced.

It is noted that, for example, in the case where the standard characteristic is a horizontal line having an extremely small slope angle θ0, a gradient coefficient θn/θ0 or tan θn/tan θ0 which is the ratio of the slope angle θn of the individual characteristic becomes an excessively large value, and the variation width of the gradient coefficient becomes excessively large, thus making it difficult to represent the gradient coefficient by a label resistor.

In general, if variation in the slope angle is small so that the standard characteristic and the individual characteristic are almost parallel with each other, a bias method is advantageous, if the standard characteristic and the individual characteristic are parallel characteristics in which the slope angles thereof are small so as to form gentle slopes with respect to the X-axis, the adjustment input-to-monitoring output method shown in FIG. 20A is advantageous, and if they are parallel characteristics that are steep with respect to the X-axis, the adjustment output-to-monitoring input method shown in FIG. 20B is advantageous.

On the other hand, if variation in the slope angle between the standard characteristic and the individual characteristic is large, the adjustment coefficient method is advantageous.

In this case, if the intersection of a segment of the standard characteristic and a segment of the individual characteristic is present at a first or fourth coordinate, it is advantageous to use a pair of adjustment coefficients, and if the intersection is present at a second or third coordinate, the gradient coefficient method is advantageous.

The standard characteristic is approximated by a standard polygonal line characteristic composed of the first segment 303a and the second segment 304a, and the synthesized line 305a is calculated so as to minimize the relative error between the synthesized line 305a and each of the first segment 303a and the second segment 304a.

The standard characteristic data is composed of: standard data including the coordinates of a predetermined comparison adjustment point corresponding to one of the 14 selection parameters and a gradient θ0 of the synthesized line 305a at the predetermined comparison adjustment point, or the coordinates of a pair of comparison adjustment points corresponding to one of the 14 selection parameters; and differential data ΔVi0 which is error between the synthesized line 305a and each of the first segment 303a and the second segment 304a, corresponding to a plurality of large and small dispersion adjustment values Pi.

The individual characteristic is approximated by an individual polygonal line characteristic composed of the first segment 303b and the second segment 304b, and the synthesized line 305b is calculated so as to minimize the relative error between the synthesized line 305b and each of the first segment 303b and the second segment 304b.

The individual characteristic data is composed of individual data including the coordinates of a predetermined comparison adjustment point corresponding to the selection parameter applied in the standard characteristic data and a gradient θn of the synthesized line 305b at the predetermined comparison adjustment point, or the coordinates of a pair of comparison adjustment points corresponding to the selection parameter applied in the standard characteristic data.

The label resistor is adjusted to have a resistance value for specifying the selection parameter, by comparison between the synthesized line 305b in the individual characteristic and the synthesized line 305a in the standard characteristic.

The microprocessor 111 reads the resistance value of the label resistor, and extracts, as a primary correction constant, the selection parameter that is designated.

Further, the microprocessor 111 specifies the synthesized line 305c that is the same as the synthesized line 305b in the individual characteristic, based on the standard data and the primary correction constant, algebraically adds the differential data ΔVi0 as interpolation information to the specified synthesized line 305c, thereby specifying a primary correction polygonal line characteristic composed of the first segment 303c and the second segment 304c that are corrected, and restores and generates individual characteristic data of the specific sensor or the specific load, based on the specified primary correction polygonal line characteristic.

As described above, the standard characteristic and the individual characteristic of the specific sensor or the specific load are approximated by a polygonal line composed of the first segment and the second segment and a synthesized line obtained by synthesizing these segments, and the specific sensor or the specific load is provided with one label resistor, whereby the difference between the standard characteristic based on a plurality of samples and an actual target product characteristic is represented by one selection parameter.

Therefore, a feature is obtained that a complicated detection characteristic or a complicated output characteristic can be represented by the resistance value of the label resistor and the individual characteristic data of the specific sensor or the specific load that is applied can be obtained with a simple configuration.

In addition, the standard characteristic data includes differential value data between polygonal-line segments and a synthesized line, as interpolation information. Therefore, a significant feature is obtained that the individual characteristic data corresponding to the polygonal line characteristic can be obtained using one label resistor by algebraically adding the differential value data to a synthesized line with respect to the specific sensor or the specific load that is applied.

A selection parameter as a secondary correction constant is calculated from the value of the selection parameter as the primary correction constant.

The secondary correction constant is calculated by correcting one of the adjustment coefficient, the gradient coefficient, the bias adjustment value, and the gradient adjustment value composing the selection parameter so as to minimize the relative error between the first segment 303c and the second segment 304c in the primary correction polygonal line characteristic obtained when the one of the adjustment coefficient, the gradient coefficient, the bias adjustment value, and the gradient adjustment value is slightly increased or slightly decreased, and the first segment 303b and the second segment 304b in the individual polygonal line characteristic. The label resistor is adjusted to have a resistance value for specifying the one of the adjustment coefficient, the gradient coefficient, the bias adjustment value, and the gradient adjustment value that is corrected and calculated.

The microprocessor 111 specifies the synthesized line 305d based on the standard data and the secondary correction constant read from the resistance value of the label resistor, algebraically adds the differential data ΔVi0 as interpolation information to the specified synthesized line 305d, thereby specifying a secondary correction polygonal line characteristic composed of the first segment 303d and the second segment 304d that are additionally corrected, and restores and generates individual characteristic data of the specific sensor or the specific load, based on the specified secondary correction polygonal line characteristic.

As described above, the individual characteristic of the specific sensor or the specific load is corrected by the secondary correction constant, so that calibration is performed so as to minimize the relative error between the individual polygonal line characteristic and the secondary correction polygonal line characteristic.

Therefore, a significant feature of allowing more accurate calibration corresponding to the polygonal line characteristic by using one label resistor.

The standard characteristic is approximated by the standard polygonal line characteristic composed of the first line 601a and the second line 602a.

The standard characteristic data is composed of first standard data with respect to the first line 601a and second standard data with respect to the second line 602a.

The first standard data includes the coordinates of a predetermined comparison adjustment point corresponding to one of the 14 selection parameters and a gradient θ10 of the first line 601a at the predetermined comparison adjustment point, or the coordinates of a pair of predetermined comparison adjustment points corresponding to one of the 14 selection parameters.

The second standard data includes the coordinates of a predetermined comparison adjustment point corresponding to one of the 14 selection parameters and a gradient θ20 of the second line 602a at the predetermined comparison adjustment point, or the coordinates of a pair of predetermined comparison adjustment points corresponding to one of the 14 selection parameters.

The individual characteristic is approximated by the individual polygonal line characteristic composed of the first line 601b and the second line 602b.

The individual characteristic data is composed of first individual data with respect to the first line 601b and second individual data with respect to the second line 602b.

The first individual data includes the coordinates of a predetermined comparison adjustment point corresponding to the selection parameter applied in the first standard data and a gradient θ1n of the first line 601b at the predetermined comparison adjustment point, or the coordinates of a pair of comparison adjustment points corresponding to the selection parameter applied in the first standard data.

The second individual data includes the coordinates of a predetermined comparison adjustment point corresponding to the selection parameter applied in the second standard data and a gradient θ2n of the second line 602b at the predetermined comparison adjustment point, or the coordinates of a pair of comparison adjustment points corresponding to the selection parameter applied in the second standard data.

The label resistor is composed of: a first label resistor adjusted to have a resistance value for specifying the selection parameter, by comparison between the first line 601b in the individual characteristic and the first line 601a in the standard characteristic; and a second label resistor adjusted to have a resistance value for specifying the selection parameter, by comparison between the second line 602b in the individual characteristic and the second line 602a in the standard characteristic.

The microprocessor 111 reads the resistance values of the first and second label resistors, extracts as a first correction constant the selection parameter with respect to the first line 601b in the individual characteristic, extracts as a second correction constant the selection parameter with respect to the second line 602b in the individual characteristic, specifies an arithmetic expression of the first line 601b in the individual characteristic, based on the first standard data and the first correction constant, specifies an arithmetic expression of the second line 602b in the individual characteristic, based on the second standard data and the second correction constant, and restores and generates individual characteristic data of the specific sensor or the specific load, based on a polygonal line characteristic composed of the first line 601b and the second line 602b in the individual characteristic that are specified.

The program memory 113B or the data memory 114 further has stored therein, as third standard data, a curvature radius Ra for performing arc interpolation for an intersection portion of the first line 601a and the second line 602a in the standard characteristic.

For an intersection portion of the first line 601b and the second line 602b in the individual characteristic, arc interpolation is performed using the curvature radius Ra stored as the third standard data, as interpolation information.

As described above, the standard characteristic and the individual characteristic of the specific sensor or the specific load are approximated by a polygonal line composed of the first line and the second line, and the specific sensor or the specific load is provided with two label resistors, whereby the difference between the standard characteristic based on a plurality of samples and the actual target product characteristic is represented by one selection parameter per each line.

Therefore, a feature is obtained that a complicated detection characteristic or a complicated output characteristic can be represented by the resistance value of the label resistor and the individual data of the specific sensor or the specific load that is applied can be obtained with a simple configuration.

In addition, for the intersection portion of a polygonal line in the individual characteristic, arc interpolation is performed using a curvature radius in the standard characteristic stored as the third standard data. Therefore, a significant feature is obtained that characteristic error caused by polygonal line approximation can be reduced without designation of a curvature radius by the label resistor.

The standard characteristic is approximated by the standard polygonal line characteristic composed of the first line 315a, the second line 325a, and the third line 335a positioned at the middle between the first line 315a and the second line 325a.

The standard characteristic data is composed of first standard data with respect to the first line 315a and second standard data with respect to the second line 325a.

The first standard data at least includes: the coordinates of an intersection position of the first line 315a and the third line 335a; and the coordinates of a predetermined comparison adjustment point corresponding to one of the 14 selection parameters and a gradient of the first line 315a at the predetermined comparison adjustment point, or the coordinates of a pair of predetermined comparison adjustment points corresponding to one of the 14 selection parameters.

The second standard data at least includes: the coordinates of an intersection position of the second line 325a and the third line 335a; and the coordinates of a predetermined comparison adjustment point corresponding to one of the 14 selection parameters and a gradient of the first line 325a at the predetermined comparison adjustment point, or the coordinates of a pair of predetermined comparison adjustment points corresponding to one of the 14 selection parameters.

The individual characteristic is approximated by the individual polygonal line characteristic composed of the first line 315b, the second line 325b, and the third line 335b positioned at the middle between the first line 315b and the second line 325b.

The individual characteristic data is composed of first individual data with respect to the first line 315b and second individual data with respect to the second line 325b.

The first individual data includes the coordinates of a predetermined comparison adjustment point corresponding to the selection parameter applied in the first standard data and a gradient of the first line 315b at the predetermined comparison adjustment point, or the coordinates of a pair of comparison adjustment points corresponding to the selection parameter applied in the first standard data.

The second individual data includes the coordinates of a predetermined comparison adjustment point corresponding to the selection parameter applied in the second standard data and a gradient of the second line 325b at the predetermined comparison adjustment point, or the coordinates of a pair of comparison adjustment points corresponding to the selection parameter applied in the second standard data.

The label resistor is composed of: a first label resistor adjusted to have a resistance value for specifying the selection parameter, by comparison between the first line 315b in the individual characteristic and the first line 315a in the standard characteristic; and a second label resistor adjusted to have a resistance value for specifying the selection parameter, by comparison between the second line 325b in the individual characteristic and the second line 325a in the standard characteristic.

The microprocessor 111 reads the resistance values of the first and second label resistors, extracts as a first correction constant the selection parameter with respect to the first line 315b in the individual characteristic, extracts as a second correction constant the selection parameter with respect to the second line 325b in the individual characteristic, specifies an arithmetic expression of the first line 315b in the individual characteristic, based on the first standard data and the first correction constant, specifies an arithmetic expression of the second line 325b in the individual characteristic, based on the second standard data and the second correction constant, generates as interpolation information an arithmetic expression of the third line 335b in the individual characteristic from the specified arithmetic expressions of the first line 315b and the second line 325b in the individual characteristic, and restores and generates individual characteristic data of the specific sensor or the specific load, based on a polygonal line characteristic composed of the first line 315b and the second line 325b in the individual characteristic that are specified and the generated third line 335b.

As described above, the standard characteristic and the individual characteristic of the specific sensor or the specific load are approximated by a polygonal line composed of the first line, the second line, and the third line, and the specific sensor or the specific load is provided with two label resistors, whereby the difference between the standard characteristic based on a plurality of samples and the actual target product characteristic is represented by respective selection parameters for the first line and the second line.

Therefore, a feature is obtained that a complicated detection characteristic or a complicated output characteristic can be represented by the resistance value of the label resistor, and that the individual data of the specific sensor or the specific load that is applied can be obtained with a simple configuration.

It is noted that the position of intersection coordinates of the first line and the third line or the second line and the third line can differ two-dimensionally between the standard characteristic and the individual characteristic, while only one-dimensional correction can be performed in the case of the adjustment coefficient or the bias adjustment value previously described. However, in the case where a standard characteristic curve and an individual characteristic curve are curves having similar shapes, a significant feature is obtained that the arithmetic expression of the third line in the individual characteristic can be calculated from the specified arithmetic expressions of the first line and the second line and utilized as interpolation information, and that a three-stage polygonal line characteristic can be obtained by two label resistors.

The standard characteristic is approximated by the standard polygonal line characteristic composed of the first line 315a and the second line 325a.

The standard characteristic data is composed of first standard characteristic data with respect to the first line 315a and second standard characteristic data with respect to the second line 325a.

At least one of the first line 315a and the second line 325a is a first line 315a obtained by synthesizing the first segment 313a and the second segment 314a at the preceding stage, or is the second line 325a obtained by synthesizing the first segment 323a and the second segment 324a at the subsequent stage.

The first standard characteristic data is composed of: first standard data including the coordinates of a predetermined comparison adjustment point corresponding to one of the 14 selection parameters and a gradient $\theta10$ of the first line 315a at the predetermined comparison adjustment point, or the coordinates of a pair of predetermined comparison adjustment points corresponding to one of the 14 selection parameters; and first differential data $\Delta Vi1$ which is error between the first line 315a and each of the first segment 313a and the second segment 314a, corresponding to a plurality of large and small dispersion adjustment values Pi1.

The second standard characteristic data is composed of: second standard data including the coordinates of a predetermined comparison adjustment point corresponding to one of the 14 selection parameters and a gradient $\theta20$ of the second line 325a at the predetermined comparison adjustment point, or the coordinates of a pair of predetermined comparison adjustment points corresponding to one of the 14 selection parameters; and second differential data $\Delta Vi2$ which is error between the second line 325a and each of the first segment 323a and the second segment 324a, corresponding to a plurality of large and small dispersion adjustment values Pi2.

The individual characteristic is approximated by the individual polygonal line characteristic composed of the first line 315b obtained by synthesizing the first segment 313b and the second segment 314b at the preceding stage, and the second line 325b obtained by synthesizing the first segment 323b and the second segment 324b at the subsequent stage.

The individual characteristic data is composed of first individual data with respect to the first line 315b and second individual data with respect to the second line 325b.

The first individual data includes the coordinates of a predetermined comparison adjustment point corresponding to the selection parameter applied in the first standard data and a gradient $\theta1n$ of the first line 315b at the predetermined comparison adjustment point, or the coordinates of a pair of comparison adjustment points corresponding to the selection parameter applied in the first standard data.

The second individual data includes the coordinates of a predetermined comparison adjustment point corresponding to the selection parameter applied in the second standard data and a gradient θ2n of the second line 325b at the predetermined comparison adjustment point, or the coordinates of a pair of comparison adjustment points corresponding to the selection parameter applied in the second standard data.

The label resistor is composed of: a first label resistor adjusted to have a resistance value for specifying the selection parameter, by comparison between the first line 315b in the individual characteristic and the first line 315a in the standard characteristic; and a second label resistor adjusted to have a resistance value for specifying the selection parameter, by comparison between the second line 325b in the individual characteristic and the second line 325a in the standard characteristic.

The microprocessor 111 reads the resistance values of the first and second label resistors, extracts as a first correction constant the selection parameter with respect to the first line 315b in the individual characteristic, extracts as a second correction constant the selection parameter with respect to the second line 325b in the individual characteristic, specifies an arithmetic expression of the first line 315b in the individual characteristic, based on the first standard data and the first correction constant, specifies an arithmetic expression of the second line 325b in the individual characteristic, based on the second standard data and the second correction constant, algebraically adds the first differential data $\Delta Vi1$ as interpolation information to the specified first line 315b, thereby specifying a preceding stage polygonal line characteristic composed of the first segment 313c and the second segment 314c at the preceding stage that are corrected, algebraically adds the second differential data $\Delta Vi2$ as interpolation information to the specified second line 325b, thereby specifying a subsequent stage polygonal line characteristic composed of the first segment 323c and the second segment 324c at the subsequent stage that are corrected, and restores and generates individual characteristic data of the specific sensor or the specific load, based on the preceding stage polygonal line characteristic and the subsequent stage polygonal line characteristic that are specified.

As described above, the standard characteristic and the individual characteristic of the specific sensor or the specific load are approximated by a polygonal line composed of the first line and the second line, and the specific sensor or the specific load is provided with two label resistors, whereby the difference between the standard characteristic based on a plurality of samples and the actual target product characteristic is represented by a selection parameter for each line. In addition, at least one of the first line and the second line is further divided into the first segment and the second segment, and the differential data from the standard characteristic is added as interpolation information.

Therefore, a significant feature is obtained that a complicated detection characteristic or a complicated output characteristic can be represented highly accurately by the resistance value of the label resistor, and that, even if the detection characteristic of the applied specific sensor or the output characteristic of the applied specific load is a complicated polygonal line characteristic, accurate individual characteristic data can be easily obtained.

The placement environment of the specific sensor 106A or 106B or the specific load 107A or 107B, which is exemplified by the temperature or the atmospheric pressure, is measured by the environment sensor 105a or 105b.

The individual characteristic data is data measured in a predetermined reference environment condition, and the standard characteristic data is composed of a plurality of pieces of standard characteristic data measured in the predetermined reference environment condition and other environment conditions and stored in the program memory 113A or 113B or the data memory 114.

The correction constant is composed of a plurality of combinations of the adjustment coefficient, the gradient coefficient, the bias adjustment value, and the gradient adjustment value that are calculated based on the standard characteristic data and the individual characteristic data measured in the reference environment condition.

The microprocessor 111 generates, as interpolation information, standard characteristic data in the present environment obtained through interpolation calculation based on the plurality of pieces of standard characteristic data and placement environment information about the specific sensor 106A or 106B or the specific load 107A or 107B measured by the environment sensor 105a or 105b, restores and generates individual characteristic data in the present environment, based on the correction constant in the reference environment and the standard characteristic data in the present environment, and performs drive control for the electric load group 108 by referring to individual detection characteristic data in the present environment or performs drive control for the specific load 107A or 107B by referring to individual output characteristic data or an individual synthesized characteristic in the present environment.

As described above, in the case where the detection characteristic of the specific sensor or the output characteristic of the specific load changes depending on the placement environment represented by the temperature, the atmospheric pressure, or the like, the environment sensor for measuring the placement environment of the specific sensor or the specific load is provided, and standard characteristic data converted for the present environment is calculated by using the standard characteristic data measured in advance in a plurality of environment conditions, and the present environment condition that is detected. Then, individual characteristic data in the present environment is generated based on a correction constant in a reference environment and the standard characteristic data in the present environment.

Therefore, a feature is obtained that if an environmental change characteristic is measured in advance upon experimental measurement using a plurality of samples, adjustment work can be easily performed in a predetermined reference environment upon shipping inspection of each individual product, and at the operation phase, individual characteristic data corresponding to the present environment can be obtained, thereby enabling highly accurate control.

It is noted that, within the scope of the present invention, the above embodiments may be freely combined with each other, or each of the above embodiments may be modified or abbreviated as appropriate.

Various modifications and alterations of this invention will be apparent to those skilled in the art without departing from the scope and spirit of this invention, and it should be understood that this is not limited to the illustrative embodiments set forth herein.

What is claimed is:

1. An electronic control apparatus comprising:
   a microprocessor which performs drive control for an electric load group in accordance with an operation state of an input sensor group and a content of a program memory, in which a specific sensor of the input sensor group has a label resistor for calibrating a device-variability variation in a detection characteristic of the specific sensor, or a specific load of the electric load group has a label resistor for calibrating a device-variability variation in an output characteristic of the specific load, wherein the microprocessor is further connected to a RAM memory for arithmetic processing, a non-volatile data memory which is a certain area of the program memory or is separately provided, and an analog to digital (AD) converter, and operates in cooperation therewith, the program memory or the data memory has stored therein, in a predetermined data form, standard characteristic data which is standard detection characteristic data of the specific sensor or standard output characteristic data of the specific load, which is average characteristic data of experimental data based on a plurality of samples thereof, the detection characteristic or the output characteristic has a monotonic increase property or a monotonic decrease property in which a second differential value thereof does not reverse between positive and negative, and is approximated by a polygonal line characteristic, the program memory or the data memory further has stored therein interpolation information for compensating error between the standard characteristic data approximated by the polygonal line characteristic and actual standard characteristic data, the program memory includes a control program functioning as label resistor reading conversion means, the label resistor reading conversion means calculates the resistance value of the label resistor by referring to the resistance value of a series resistor connected in series to the label resistor, the both-end voltage of the label resistor, and a control voltage which is a voltage applied to a series circuit, calculates a correction constant for correcting the device-variability variation in the detection characteristic of the specific sensor or the output characteristic of the specific load, based on the calculated resistance value, and stores the correction constant in the data memory or the RAM memory, the correction constant is a pair of adjustment factors, a pair of adjustment addition values, or a complex combination of an adjustment factor and an adjustment addition value for specifying individual characteristic data which is individual detection characteristic data of the specific sensor or individual output characteristic data of the specific load, based on the standard characteristic data, the interpolation information is applied for, based on the individual characteristic data obtained by approximating one polygonal line composed of a pair of segments by one synthesized line, restoring the synthesized line to the one polygonal line, the adjustment factor is a correction constant to be multiplied by the standard characteristic data, thereby obtaining the individual characteristic data, the adjustment factor being an adjustment coefficient which is a relative ratio between the individual characteristic data and the standard characteristic data at a predetermined adjustment comparison point, or being a gradient coefficient which is a relative ratio with respect to change rate between the individual characteristic data and the standard characteristic data at a predetermined adjustment comparison point, the adjustment addition value is a correction constant to be algebraically added to the standard characteristic data, thereby obtaining the individual characteristic data, the adjustment addition value being a bias adjustment value which is a relative deviation between the individual characteristic data and the standard characteristic data at a predetermined adjustment comparison point, or being a gradient adjustment value which is a relative deviation with respect to change rate between the individual characteristic data and the standard characteristic data at a predetermined adjustment comparison point, the label resistor reading conversion means is executed at the start of operation when a power supply switch is turned on, or when the specific sensor or the specific load is replaced upon maintenance, to identify what combination the correction constant includes, of the adjustment coefficient, the gradient coefficient, the bias adjustment value, and the gradient adjustment value, and restore and generate the individual characteristic data by combining the identified correction constant, the standard characteristic data of the specific sensor or the specific load, and the interpolation information, and the microprocessor performs drive control for the electric load group by referring to the generated individual detection characteristic data, or performs drive control for the specific load by referring to the generated individual output characteristic data.

2. The electronic control apparatus according to claim 1, wherein:

auxiliary data for selecting the data form is stored in the program memory or the data memory, in addition to the standard characteristic data, a standard characteristic of the standard characteristic data and an individual characteristic of the individual characteristic data are approximated in a polygonal-line fashion in a two-dimensional coordinate system having an adjustment input axis indicating a common comparison adjustment value that is inputted and a monitoring output axis indicating a different comparison monitoring value that is outputted, or having an adjustment output axis indicating a common comparison adjustment value that is outputted and a monitoring input axis indicating a different comparison monitoring value that is inputted, by the auxiliary data, one option is selected from some or all of options A1 to A7 as a selection parameter composing the correction constant, so that (1) the option A1 for selecting a combination of the adjustment coefficient and the gradient coefficient or the option A2 for selecting a pair of adjustment coefficients composed of a combination of the first and the second adjustment coefficients, is selected, (2) the option A3 for selecting a combination of the bias adjustment value and the gradient adjustment value or the option A4 for selecting a pair of bias adjustment values composed of the first and the second bias adjustment values, is selected, or (3) the option A5 for selecting a complex combination of the bias adjustment value and the adjustment coefficient, the option A6 for selecting a complex combination of the adjustment coefficient and the gradient adjustment value, or the option A7 for selecting a combination of the bias adjustment value and the gradient coefficient, is selected, further, (4) one of an option B1 for selecting two-dimensional coordinate axes of adjustment input axis-to-monitoring output axis as the coordinate axes of the polygonal line characteristic, and an option B2 for selecting two-dimensional coordinate axes of adjustment output axis-to-monitoring input axis as the coordinate axes of the polygonal line characteristic, is selected, so that one of a total of 14 options is designated as the selection parameter, the adjustment coefficient is a parameter determined by a ratio (yn0/y0) based on comparison between a comparison monitoring output yn0 in the individual characteristic and a comparison monitoring output y0 in the standard characteristic with respect to a common comparison adjustment input x0, or a ratio (xn0/x0) based on comparison between a comparison monitoring input xn0 in the individual characteristic and a comparison monitoring input x0 in the standard characteristic with respect to a common comparison adjustment output y0, the gradient coefficient is a parameter determined by a ratio ($\theta n/\theta 0$ or $\tan \theta n/\tan \theta 0$) based on comparison between the slope angle or tangent of a segment which is the change rate of the individual characteristic, and the slope angle or tangent of a segment which is the change rate of the standard characteristic, at a comparison adjustment point for calculating the adjustment coefficient, the bias adjustment value is a parameter determined by a comparison deviation (y1n–y1) between a comparison monitoring output y1n in the individual characteristic and a comparison monitoring output y1 in the standard characteristic with respect to a common comparison adjustment input x1, or a comparison deviation (x1n–x1) between a comparison monitoring input x1n in the individual characteristic and a comparison monitoring input x1 in the standard characteristic with respect to a common comparison adjustment output y1, and the gradient adjustment value is a parameter determined by a comparison deviation ($\theta n - \theta 1$ or $\tan \theta n - \tan \theta 1$) between the slope angle or tangent of a segment which is the change rate of the individual characteristic, and the slope angle or tangent of a segment which is the change rate of the standard characteristic, at a comparison adjustment point for calculating the bias adjustment value.

3. The electronic control apparatus according to claim 2, wherein the placement environment of the specific sensor or the specific load, which is exemplified by the temperature or the atmospheric pressure, is measured by an environment sensor, the individual characteristic data is data measured in a predetermined reference environment condition, the standard characteristic data is composed of a plurality of pieces of standard characteristic data measured in the predetermined reference environment condition and other environment conditions and stored in the program memory or the data memory, the correction constant is composed of a plurality of combinations of the adjustment coefficient, the gradient coefficient, the bias adjustment value, and the gradient adjustment value that are calculated based on the standard characteristic data and the individual characteristic data measured in the reference environment condition, and the microprocessor generates, as interpolation information, standard characteristic data in a present environment obtained through interpolation calculation based on the plurality of pieces of standard characteristic data and placement environment information about the specific sensor or the specific load measured by the environment sensor, restores and generates individual characteristic data in the present environment, based on the correction constant in the reference environment and the standard characteristic data in the present environment, and performs drive control for the electric load group by referring to individual detection characteristic data in the present environment or performs drive control for the specific load by referring to individual output characteristic data or an individual synthesized characteristic in the present environment.

4. An electronic control apparatus comprising:

a microprocessor which performs drive control for an electric load group in accordance with an operation state of an input sensor group and a content of a program memory, in which a specific load of the electric load group has a specific sensor which detects output of the specific load, and the specific sensor has a label resistor for calibrating a device-variability variation in a synthesized output characteristic obtained by synthesizing an output characteristic of the specific load and a detection characteristic of the specific sensor, wherein:

the microprocessor is further connected to a RAM memory for arithmetic processing, a non-volatile data memory which is a certain area of the program memory or is separately provided, and an analog to digital (AD) converter, and operates in cooperation therewith, the program memory or the data memory has stored therein, in a predetermined data form, standard synthesized characteristic data of the specific load and the specific sensor, which is average characteristic data of experiment data based on a plurality of samples thereof, the synthesized output characteristic has a monotonic increase property or a monotonic decrease property in which a second differential value thereof does not reverse between positive and negative, and is approximated by a polygonal line characteristic, the program memory or the data memory further has stored therein interpolation information for compensating error between the standard synthesized characteristic data approximated by a polygonal line characteristic and actual standard synthesized characteristic data, the program memory includes a control program functioning as label resistor reading conversion means, the label resistor reading conversion means calculates the resistance value of the label resistor by referring to the resistance value of a series resistor connected in series to the label resistor, the both-end voltage of the label resistor, and a control voltage which is a voltage applied to a series circuit, calculates a correction constant for correcting the device-variability variation in the synthesized output characteristic of the specific load, based on the calculated resistance value, and stores the correction constant in the data memory or the RAM memory, the correction constant, is a pair of adjustment factors, a pair of adjustment addition values, or a complex combination of an adjustment factor and an adjustment addition value for specifying individual characteristic data which is individual synthesized characteristic data of the specific load, based on standard characteristic data which is the standard synthesized characteristic data, the interpolation information is applied for, based on the individual characteristic data obtained by approximating one polygonal line composed of a pair of segments by one synthesized line, restoring the synthesized line to the one polygonal line, the adjustment factor is a correction constant to be multiplied by the standard characteristic data, thereby obtaining the individual characteristic data, the adjustment factor being an adjustment coefficient which is a relative ratio between the individual characteristic data and the standard characteristic data at a predetermined adjustment comparison point, or being a gradient coefficient which is a relative ratio with respect to change rate between the individual characteristic data and the standard characteristic data at a predetermined adjustment comparison point, the adjustment addition value is a correction constant to be algebraically added to the standard characteristic data, thereby obtaining the individual characteristic data, the adjustment addition value being a bias adjustment value which is a relative deviation between the individual characteristic data and the standard characteristic data at a predetermined adjustment comparison point, or being a gradient adjustment value which is a relative deviation with respect to change rate between the individual characteristic data and the standard characteristic data at a predetermined adjustment comparison point, the label resistor reading conversion means is executed at the start of operation when a power supply switch is turned on, or when the specific sensor or the specific load is replaced upon maintenance, to identify what combination the correction constant includes, of the adjustment coefficient, the gradient coefficient, the bias adjustment value, and the gradient adjustment value, and restore and generate the individual characteristic data by combining the identified correction constant, the interpolation information, and the standard characteristic data of the specific load, and the microprocessor performs drive control for the specific load by referring to the generated individual synthesized characteristic data.

5. The electronic control apparatus according to claim 4, wherein the program memory or the data memory has stored therein, in a predetermined data form, standard output characteristic data of the specific load, in addition to the standard synthesized characteristic data of the specific load and the specific sensor, and the microprocessor, in order for the specific load to generate a target control output, generates a control instruction signal by referring to the standard output characteristic data, and as a result, when there is a control deviation between detection output of the specific sensor obtained by referring to the individual synthesized characteristic data of the specific load, and the target control output, performs negative feedback control such that the control instruction signal is corrected to increase or decrease so as to obtain the target control output.

6. The electronic control apparatus according to claim 1, wherein the label resistor is composed of a plurality of series resistors sequentially connected in series, among the series resistors, the resistance value of a subsequent one is two times as high as that of a previous one, the series resistors are short-circuited or open-circuited by a plurality of short-circuit or open-circuit terminals provided in an adjustment window, and the short-circuit or open-circuit terminals correspond to binary values of a target resistance value of the label resistor, and are short-circuited or open-circuited depending on logical states of respective bits.

7. The electronic control apparatus according to claim 1, wherein for the label resistor, a thin-film resistor is used that allows the resistance value thereof to be adjusted by laser trimming through an adjustment window such that the resistance value becomes a target value by a cutting dimension in a width direction and a cutting dimension in a length direction while the resistance value is measured and monitored.

8. The electronic control apparatus according to claim 1, wherein series resistors composing the label resistor are composed of a thin-film resistor body formed in spiral shape and having a plurality of connection terminals provided thereon, and the connection terminals are used as short-circuit or open-circuit terminals by which the series resistors are short-circuited or open-circuited through an adjustment window, and resistors between the short-circuit or open-circuit terminals are adjusted so as to have resistance values progressively increasing in multiples of the smallest resistance value by laser trimming sequentially performed from the smallest resistor.

9. The electronic control apparatus according to claim 1, wherein a digital converted value of the label resistor measured by the microprocessor is divided into a high-order bit group and a low-order bit group, the high-order bit group and the low-order bit group are each allocated to a setting value of one of the adjustment coefficient, the gradient coefficient, the bias adjustment value, and the gradient adjustment value, the allocated setting values, and the minimum value with respect to the bias adjustment value or the gradient adjustment value are stored in the program memory or the data memory, and the bias adjustment value or the gradient adjustment value is set as a factor for the minimum value.

10. The electronic control apparatus according to claim 1, wherein a digital converted value of the label resistor measured by the microprocessor corresponds to serial numbers provided on a two-dimensional map for allocating setting values of the adjustment coefficient, the gradient coefficient, the bias adjustment value, or the gradient adjustment value, rank numbers of the setting values are designated by the serial numbers, when the serial numbers are divided into a lower number group and a higher number group or into an odd number group and an even number group, two of the serial numbers are allocated to each rank number, and the setting values for fine adjustment or coarse adjustment allocated to respective rank numbers, and the minimum value with respect to the bias adjustment value or the gradient adjustment value are stored in the program memory or the data memory, and the bias adjustment value or the gradient adjustment value is set as a factor for the minimum value.

11. The electronic control apparatus, according to claim 2, wherein the standard characteristic is approximated by a standard polygonal line characteristic composed of a first line and a second line, the standard characteristic data is composed of first standard characteristic data with respect to the first line and second standard characteristic data with respect to the second line, at least one of the first line and the second line is a first line obtained by synthesizing a first segment and a second segment at a preceding stage, or is a second line obtained by synthesizing a first segment and a second segment at a subsequent stage, the first standard characteristic data is composed of: first standard data including the coordinates of a predetermined comparison adjustment point corresponding to one of the 14 selection parameters and a gradient θ10 of the first line at the predetermined comparison adjustment point, or the coordinates of a pair of predetermined comparison adjustment points corresponding to one of the 14 selection parameters; and first differential data ΔVi1 which is error between the first line and each of the first segment and the second segment, corresponding to a plurality of large and small dispersion adjustment values Pi1, the second standard characteristic data is composed of: second standard data including the coordinates of a predetermined comparison adjustment point corresponding to one of the 14 selection parameters and a gradient θ20 of the second line at the predetermined comparison adjustment point, or the coordinates of a pair of predetermined comparison adjustment points corresponding to one of the 14 selection parameters; and second differential data ΔVi2 which is error between the second line and each of the first segment and the second segment, corresponding to a plurality of large and small dispersion adjustment values Pi2, the individual characteristic is approximated by an individual polygonal line characteristic composed of a first line obtained by synthesizing a first segment and a second segment at a preceding stage, and a second line obtained by synthesizing a first segment and a second segment at a subsequent stage, the individual characteristic data is composed of first individual data with respect to the first line and second individual data with respect to the second line, the first individual data includes the coordinates of a predetermined comparison adjustment point corresponding to the selection parameter applied in the first standard data and a gradient θ1n of the first line at the predetermined comparison adjustment point, or the coordinates of a pair of comparison adjustment points corresponding to the selection parameter applied in the first standard data, the second individual data includes the coordinates of a predetermined comparison adjustment point corresponding to the selection parameter applied in the second standard data and a gradient θ2n of the second line at the predetermined comparison adjustment point, or the coordinates of a pair of comparison adjustment points corresponding to the selection parameter applied in the second standard data, the label resistor is composed of: a first label resistor adjusted to have a resistance value for specifying the selection parameter, by comparison between the first line in the individual characteristic and the first line in the standard characteristic; and a second label resistor adjusted to have a resistance value for specifying the selection parameter, by comparison between the second line in the individual characteristic and the second line in the standard characteristic, and the microprocessor reads the resistance values of the first and second label resistors, extracts as a first correction constant the selection parameter with respect to the first line in the individual characteristic, extracts as a second correction constant the selection parameter with respect to the second line in the individual characteristic, specifies an arithmetic expression of the first line in the individual characteristic, based on the first standard data and the first correction constant, specifies an arithmetic expression of the second line in the individual characteristic, based on the second standard data and the second correction constant, algebraically adds the first differential data ΔVi1 as interpolation information to the specified first line, thereby specifying a preceding stage polygonal line characteristic composed of a first segment and a second segment at a preceding stage that are corrected, algebraically adds the second differential data ΔVi2 as interpolation information to the specified second line, thereby specifying a subsequent stage polygonal line characteristic composed of a first segment and a second segment at a subsequent stage that are corrected, and restores and generates individual characteristic data of the specific sensor or the specific load, based on the preceding stage polygonal line characteristic and the subsequent stage polygonal line characteristic that are specified.

12. The electronic control apparatus, according to claim 2, wherein the standard characteristic is approximated by a standard polygonal line characteristic composed of a first segment and a second segment, and a synthesized line is calculated so as to minimize relative error between the synthesized line and each of the first segment and the second segment, the standard characteristic data is composed of: standard data including the coordinates of a predetermined comparison adjustment point corresponding to one of the 14 selection parameters and a gradient θ0 of the synthesized line at the predetermined comparison adjustment point, or the coordinates of a pair of comparison adjustment points corresponding to one of the 14 selection parameters; and differential data ΔVi0 which is an error between the synthesized line and each of the first segment and the second segment, corresponding to a plurality of large and small dispersion adjustment values Pi, the individual characteristic is approximated by an individual polygonal line characteristic composed of a first segment and a second segment, and a synthesized line is calculated so as to minimize relative error between the synthesized line and each of the first segment and the second segment, the individual characteristic data is composed of individual data including the coordinates of a predetermined comparison adjustment point corresponding to the selection parameter applied in the standard characteristic data and a gradient θn of the synthesized line at the predetermined comparison adjustment point, or the coordinates of a pair of comparison adjustment points corresponding to the selection parameter applied in the standard characteristic data, the label resistor is adjusted to have a resistance value for specifying the selection parameter, by comparison between the synthesized line in the individual characteristic and the synthesized line in the standard characteristic, and the microprocessor reads the resistance value of the label resistor, and extracts, as a primary correction constant, the selection parameter that is designated, specifies a synthesized line that is the same as the synthesized line in the individual characteristic, based on the standard data and the primary correction constant, algebraically adds the differential data $\Delta Vi0$ as interpolation information to the specified synthesized line, thereby specifying a primary correction polygonal line characteristic composed of a first segment and a second segment that are corrected, and restores and generates individual characteristic data of the specific sensor or the specific load, based on the specified primary correction polygonal line characteristic.

13. The electronic control apparatus, according to claim 12, wherein a selection parameter as a secondary correction constant is calculated from the value of the selection parameter as the primary correction constant, the secondary correction constant is calculated by correcting one of the adjustment coefficient, the gradient coefficient, the bias adjustment value, and the gradient adjustment value composing the selection parameter so as to minimize relative error between the first segment and the second segment in the primary correction polygonal line characteristic obtained when the one of the adjustment coefficient, the gradient coefficient, the bias adjustment value, and the gradient adjustment value is increased or decreased, and the first segment and the second segment in the individual polygonal line characteristic, the label resistor is adjusted to have a resistance value for specifying the one of the adjustment coefficient, the gradient coefficient, the bias adjustment value, and the gradient adjustment value that is corrected and calculated, and the microprocessor specifies a synthesized line based on the standard data and the secondary correction constant read from the resistance value of the label resistor, algebraically adds the differential data $\Delta Vi0$ as interpolation information to the specified synthesized line, thereby specifying a secondary correction polygonal line characteristic composed of a first segment and a second segment that are additionally corrected, and restores and generates individual characteristic data of the specific sensor or the specific load, based on the specified secondary correction polygonal line characteristic.

14. The electronic control apparatus, according to claim 2, wherein the standard characteristic is approximated by a standard polygonal line characteristic composed of a first line and a second line, the standard characteristic data is composed of first standard data with respect to the first line and second standard data with respect to the second line, the first standard data includes the coordinates of a predetermined comparison adjustment point corresponding to one of the 14 selection parameters and a gradient $\theta 10$ of the first line at the predetermined comparison adjustment point, or the coordinates of a pair of predetermined comparison adjustment points corresponding to one of the 14 selection parameters, the second standard data includes the coordinates of a predetermined comparison adjustment point corresponding to one of the 14 selection parameters and a gradient $\theta 20$ of the second line at the predetermined comparison adjustment point, or the coordinates of a pair of predetermined comparison adjustment points corresponding to one of the 14 selection parameters, the individual characteristic is approximated by an individual polygonal line characteristic composed of a first line and a second line, the individual characteristic data is composed of first individual data with respect to the first line and second individual data with respect to the second line, the first individual data includes the coordinates of a predetermined comparison adjustment point corresponding to the selection parameter applied in the first standard data and a gradient $\theta 1n$ of the first line at the predetermined comparison adjustment point, or the coordinates of a pair of comparison adjustment points corresponding to the selection parameter applied in the first standard data, the second individual data includes the coordinates of a predetermined comparison adjustment point corresponding to the selection parameter applied in the second standard data and a gradient $\theta 2n$ of the second line at the predetermined comparison adjustment point, or the coordinates of a pair of comparison adjustment points corresponding to the selection parameter applied in the second standard data, wherein the label resistor is composed of: a first label resistor adjusted to have a resistance value for specifying the selection parameter, by comparison between the first line in the individual characteristic and the first line in the standard characteristic; and a second label resistor adjusted to have a resistance value for specifying the selection parameter, by comparison between the second line in the individual characteristic and the second line in the standard characteristic, the microprocessor reads the resistance values of the first and second label resistors, extracts as a first correction constant the selection parameter with respect to the first line in the individual characteristic, extracts as a second correction constant the selection parameter with respect to the second line in the individual characteristic, specifies an arithmetic expression of the first line in the individual characteristic, based on the first standard data and the first correction constant, specifies an arithmetic expression of the second line in the individual characteristic, based on the second standard data and the second correction constant, and restores and generates individual characteristic data of the specific sensor or the specific load, based on a polygonal line characteristic composed of the first line and the second line in the individual characteristic that are specified, the program memory or the data memory further has stored therein, as third standard data, a curvature radius Ra for performing arc interpolation for an intersection portion of the first line and the second line in the standard characteristic, and for an intersection portion of the first line and the second line in the individual characteristic, arc interpolation is performed using the curvature radius Ra stored as the third standard data, as interpolation information.

15. The electronic control apparatus, according to claim 2, wherein the standard characteristic is approximated by a standard polygonal line characteristic composed of a first line, a second line, and a third line positioned at the middle between the first line and the second line, the standard characteristic data is composed of first standard data with respect to the first line and second standard data with respect to the second line, the first standard data at least includes: the coordinates of an intersection position of the first line and the third line; and the coordinates of a predetermined comparison adjustment point corresponding to one of the 14 selection parameters and a gradient of the first line at the predetermined comparison adjustment point, or the coordinates of a pair of predetermined comparison adjustment points corresponding to one of the 14 selection parameters, the second standard data at least includes: the coordinates of an intersection position of the second line and the third line; and the coordinates of a predetermined comparison adjustment point corresponding to one of the 14 selection parameters and a gradient of the second-line at the predetermined comparison adjustment point, or the coordinates of a pair of predetermined comparison adjustment points corresponding to one of the 14 selection parameters, the individual characteristic is approximated by an individual polygonal line characteristic composed of a first line, a second line, and a third line positioned at the middle between the first line and the second line, the individual characteristic data is composed of first individual data with respect to the first line and second individual data with respect to the second line, the first individual data includes the coordinates of a predetermined comparison adjustment point corresponding to the selection parameter applied in the first standard data and a gradient of the first line at the predetermined comparison adjustment point, or the coordinates of a pair of comparison adjustment points corresponding to the selection parameter applied in the first standard data, the second individual data includes the coordinates of a predetermined comparison adjustment point corresponding to the selection parameter applied in the second standard data and a gradient of the second line at the predetermined comparison adjustment point, or the coordinates of a pair of comparison adjustment points corresponding to the selection parameter applied in the second standard data, the label resistor is composed of: a first label resistor adjusted to have a resistance value for specifying the selection parameter, by comparison between the first line in the individual characteristic and the first line in the standard characteristic; and a second label resistor adjusted to have a resistance value for specifying the selection parameter, by comparison between the second line in the individual characteristic and the second line in the standard characteristic, and the microprocessor reads the resistance values of the first and second label resistors, extracts as a first correction constant the selection parameter with respect to the first line in the individual characteristic, extracts as a second correction constant the selection parameter with respect to the second line in the individual characteristic, specifies an arithmetic expression of the first line in the individual characteristic, based on the first standard data and the first correction constant, specifies an arithmetic expression of the second line in the individual characteristic, based on the second standard data and the second correction constant, generates as interpolation information an arithmetic expression of the third line in the individual characteristic from the specified arithmetic expressions of the first line and the second line in the individual characteristic, and restores and generates individual characteristic data of the specific sensor or the specific load, based on a polygonal line characteristic composed of the first line and the second line in the individual characteristic that are specified and the generated third line.

16. The electronic control apparatus according to claim 4, wherein auxiliary data for selecting the data form is stored in the program memory or the data memory, in addition to the standard characteristic data, a standard characteristic of the standard characteristic data and an individual characteristic of the individual characteristic data are approximated in a polygonal-line fashion in a two-dimensional coordinate system having an adjustment input axis indicating a common comparison adjustment value that is inputted and a monitoring output axis indicating a different comparison monitoring value that is outputted, or having an adjustment output axis indicating a common comparison adjustment value that is outputted and a monitoring input axis indicating a different comparison monitoring value that is inputted, by the auxiliary data, one option is selected from some or all of options A1 to A7 as a selection parameter composing the correction constant, so that (1) the option A1 for selecting a combination of the adjustment coefficient and the gradient coefficient or the option A2 for selecting a pair of adjustment coefficients composed of a combination of the first and the second adjustment coefficients, is selected, (2) the option A3 for selecting a combination of the bias adjustment value and the gradient adjustment value or the option A4 for selecting a pair of bias adjustment values composed of the first and the second bias adjustment values, is selected, or (3) the option A5 for selecting a complex combination of the bias adjustment value and the adjustment coefficient, the option A6 for selecting a complex combination of the adjustment coefficient and the gradient adjustment value, or the option A7 for selecting a combination of the bias adjustment value and the gradient coefficient, is selected, further, (4) one of an option B1 for selecting two-dimensional coordinate axes of adjustment input axis-to-monitoring output axis as the coordinate axes of the polygonal line characteristic, and an option B2 for selecting two-dimensional coordinate axes of adjustment output axis-to-monitoring input axis as the coordinate axes of the polygonal line characteristic, is selected, so that one of a total of 14 options is designated as the selection parameter, the adjustment coefficient is a parameter determined by a ratio ($yn0/y0$) based on comparison between a comparison monitoring output $yn0$ in the individual characteristic and a comparison monitoring output $y0$ in the standard characteristic with respect to a common comparison adjustment input $x0$, or a ratio ($xn0/x0$) based on comparison between a comparison monitoring input xn0 in the individual characteristic and a comparison monitoring input x0 in the standard characteristic with respect to a common comparison adjustment output y0, the gradient coefficient is a parameter determined by a ratio ($\theta n/\theta 0$ or $\tan \theta n/\tan \theta 0$) based on comparison between the slope angle or tangent of a segment which is the change rate of the individual characteristic, and the slope angle or tangent of a segment which is the change rate of the standard characteristic, at a comparison adjustment point for calculating the adjustment coefficient, the bias adjustment value is a parameter determined by a comparison deviation (y1n−y1) between a comparison monitoring output y1n in the individual characteristic and a comparison monitoring output y1 in the standard characteristic with respect to a common comparison adjustment input x1, or a comparison deviation (x1n−x1) between a comparison monitoring input x1n in the individual characteristic and a comparison monitoring input x1 in the standard characteristic with respect to a common comparison adjustment output y1, and the gradient adjustment value is a parameter determined by a comparison deviation ($\theta n-\theta 1$ or $\tan \theta n-\tan \theta 1$) between the slope angle or tangent of a segment which is the change rate of the individual characteristic, and the slope angle or tangent of a segment which is the change rate of the standard characteristic, at a comparison adjustment point for calculating the bias adjustment value.

17. The electronic control apparatus according to claim 16, wherein the placement environment of the specific sensor or the specific load, which is exemplified by the temperature or the atmospheric pressure, is measured by an environment sensor, the individual characteristic data is data measured in a predetermined reference environment condition, the standard characteristic data is composed of a plurality of pieces of standard characteristic data measured in the predetermined reference environment condition and other environment conditions and stored in the program memory or the data memory, the correction constant is composed of a plurality of combinations of the adjustment coefficient, the gradient coefficient, the bias adjustment value, and the gradient adjustment value that are calculated based on the standard characteristic data and the individual characteristic data measured in the reference environment condition, and the microprocessor generates, as interpolation information, standard characteristic data in a present environment obtained through interpolation calculation based on the plurality of pieces of standard characteristic data and placement environment information about the specific sensor or the specific load measured by the environment sensor, restores and generates individual characteristic data in the present environment, based on the correction constant in the reference environment and the standard characteristic data in the present environment, and performs drive control for the electric load group by referring to individual detection characteristic data in the present environment or performs drive control for the specific load by referring to individual output characteristic data or an individual synthesized characteristic in the present environment.

* * * * *